US012631988B2

(12) United States Patent
Suzuki et al.

(10) Patent No.: US 12,631,988 B2
(45) Date of Patent: May 19, 2026

(54) IMAGE FORMING APPARATUS WITH GAS FLOWING FROM DEVELOPING DEVICE TO SUPPLY DEVICE THROUGH DEVELOPER CHANNEL

(71) Applicant: FUJIFILM Business Innovation Corp., Tokyo (JP)

(72) Inventors: Kenji Suzuki, Kanagawa (JP); Kazuya Umekubo, Kanagawa (JP); Mizue Sekine, Kanagawa (JP); Atsushi Funada, Kanagawa (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 0 days.

(21) Appl. No.: 18/950,751

(22) Filed: Nov. 18, 2024

(65) Prior Publication Data

US 2025/0370379 A1 Dec. 4, 2025

(30) Foreign Application Priority Data

May 29, 2024 (JP) ................................ 2024-087348

(51) Int. Cl.
*G03G 15/08* (2006.01)
*G03G 15/01* (2006.01)
(Continued)

(52) U.S. Cl.
CPC ..... *G03G 15/0891* (2013.01); *G03G 15/0121* (2013.01); *G03G 15/0887* (2013.01);
(Continued)

(58) Field of Classification Search
CPC .......... G03G 15/0121; G03G 15/0887; G03G 15/0896; G03G 15/0891; G03G 21/0052; G03G 21/206
See application file for complete search history.

(56) References Cited

U.S. PATENT DOCUMENTS 10,261,442 B2 * 4/2019 Shigehiro .......... G03G 15/0887
2010/0172674 A1 7/2010 Suzuki
(Continued)

FOREIGN PATENT DOCUMENTS

JP 2006201528 A 8/2006
JP 4633419 B2 2/2011

OTHER PUBLICATIONS

May 2, 2025 Extended European Search Report issued in European Patent Application No. 24213875.8.

*Primary Examiner* — Joseph S Wong
(74) *Attorney, Agent, or Firm* — OLIFF PLC

(57) ABSTRACT

An image forming apparatus includes: an image carrier; a developing device configured to cause a developer to adhere to the image carrier; and a supply device having a developer channel through which the developer passes, and configured to supply the developer to the developing device. The developer channel includes a filled portion that is filled with the developer over an entire cross section of the developer channel, and a falling portion where the developer falls downward. The falling portion is positioned on a downstream side of the filled portion in a developer movement direction. Gas flowing from the developing device to the supply device moves upstream in the developer movement direction through the developer channel. A sectional area of the falling portion is larger than a sectional area of the filled portion.

7 Claims, 32 Drawing Sheets

(51) Int. Cl.
*G03G 21/00* (2006.01)
*G03G 21/20* (2006.01)

(52) U.S. Cl.
CPC ..... *G03G 15/0896* (2013.01); *G03G 21/0052* (2013.01); *G03G 21/206* (2013.01)

(56) References Cited

U.S. PATENT DOCUMENTS

| | | | | |
|---|---|---|---|---|
| 2020/0257221 | A1* | 8/2020 | Akaike .............. | G03G 15/0896 |
| 2023/0305438 | A1 | 9/2023 | Okuno | |
| 2024/0329566 | A1* | 10/2024 | Tamai ................ | G03G 15/6558 |

* cited by examiner

IMAGE FORMING APPARATUS WITH GAS FLOWING FROM DEVELOPING DEVICE TO SUPPLY DEVICE THROUGH DEVELOPER CHANNEL

CROSS-REFERENCE TO RELATED APPLICATIONS

This application is based on and claims priority under 35 USC 119 from Japanese Patent Application No. 2024-087348 filed May 29, 2024.

BACKGROUND

(i) Technical Field

The present disclosure relates to an image forming apparatus.

(ii) Related Art

Japanese Patent No. 4633419 discloses a structure of a developer container of a developing device in which a partition plate that partitions the developer container into two parts is disposed between a first screw and a second screw and openings are provided at both ends of the partition plate.

SUMMARY

The image forming apparatus may include a developing device that causes a developer to adhere to an image carrier. The image forming apparatus may also include a supply device that has a developer channel through which the developer passes and supplies the developer to the developing device.

It is assumed that gas discharged from the developing device flows into the supply device and passes through the developer channel of the supply device. In this case, the gas hardly flows through a portion of the developer channel where the developer is dense.

Aspects of non-limiting embodiments of the present disclosure relate to facilitation of a gas flow through a developer channel compared with a case where the sectional area of the developer channel does not change depending on positions in a developer flow direction.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus comprising: an image carrier; a developing device configured to cause a developer to adhere to the image carrier; and a supply device having a developer channel through which the developer passes, and configured to supply the developer to the developing device. The developer channel includes a filled portion that is filled with the developer over an entire cross section of the developer channel, and a falling portion where the developer falls downward. The falling portion is positioned on a downstream side of the filled portion in a developer movement direction. Gas flowing from the developing device to the supply device moves upstream in the developer movement direction through the developer channel. A sectional area of the falling portion is larger than a sectional area of the filled portion.

BRIEF DESCRIPTION OF THE DRAWINGS

Exemplary embodiments of the present disclosure will be described in detail based on the following figures, wherein.

DETAILED DESCRIPTION

Exemplary embodiments of the present disclosure are described with reference to the accompanying drawings.

Figure 1:
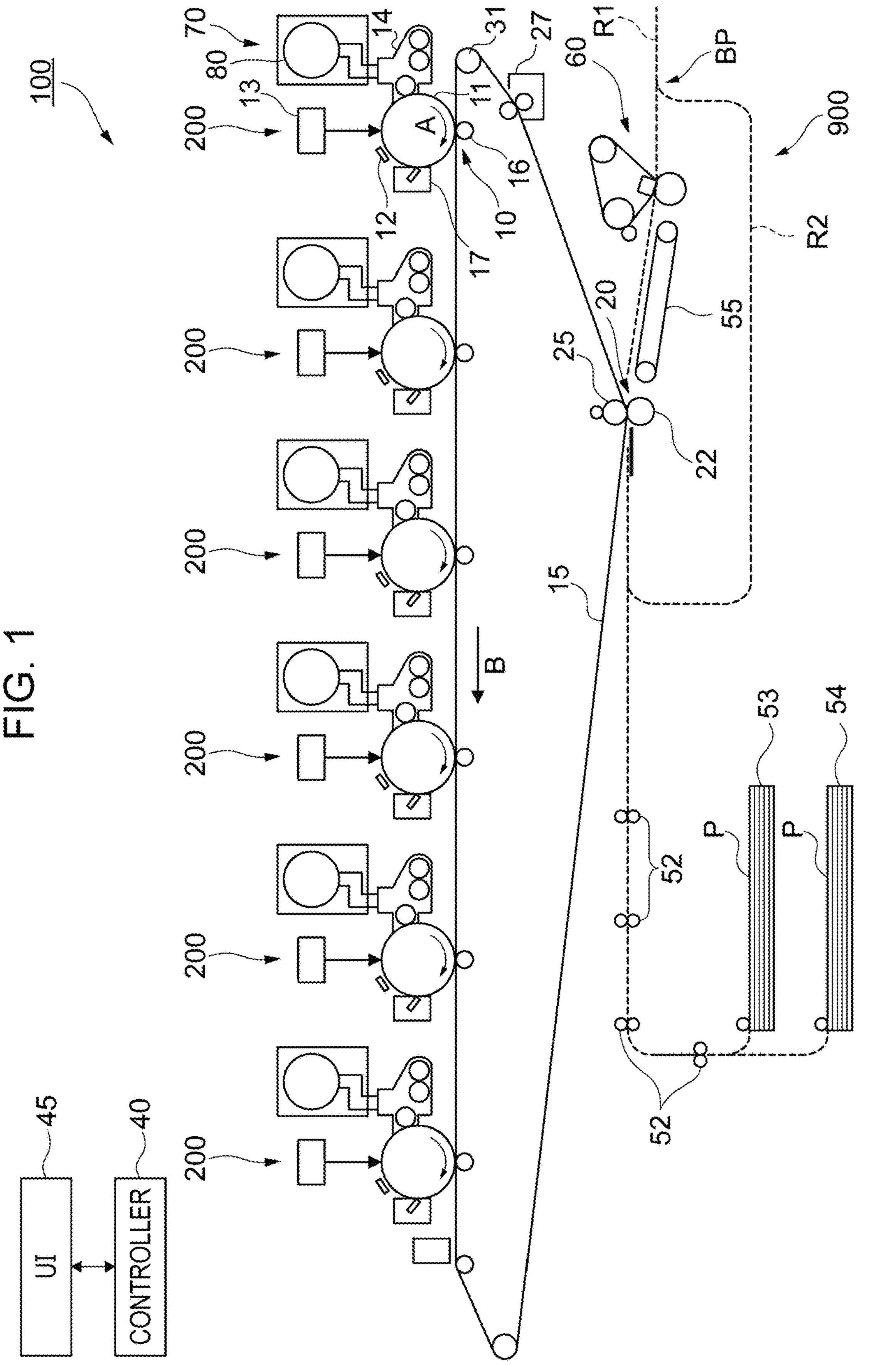
FIG. 1 illustrates an image forming apparatus.

FIG. 1 illustrates an image forming apparatus 100 according to an exemplary embodiment. FIG. 1 is a front view of the image forming apparatus 100.

The image forming apparatus 100 uses a tandem intermediate transfer system.

The image forming apparatus 100 includes a plurality of image forming units 200. Each image forming unit 200 forms an image to be transferred onto paper P that is an example of a recording medium.

Each image forming unit 200 includes a photoreceptor drum 11 as an example of an image carrier.

Each image forming unit 200 uses a developer containing a toner to form, on the photoreceptor drum 11, a toner image to be transferred onto the paper P. In other words, each image forming unit 200 uses a powdery developer to form a toner image on the photoreceptor drum 11.

The developer of this exemplary embodiment is composed of a dry carrier and a dry toner. Each image forming unit 200 uses the carrier and the toner to form a toner image on the photoreceptor drum 11.

Six image forming units 200 use different types of developer to form toner images on the photoreceptor drums 11.

Four image forming units 200 out of the six image forming units 200 form toner images using primary color developers. More specifically, the four image forming units 200 form toner images using yellow, magenta, cyan, and black developers.

The two remaining image forming units 200 form toner images using developers other than the primary color developers.

The two remaining image forming units 200 form toner images using, for example, clear, white, gold, or silver developers. Alternatively, the two remaining image forming units 200 form toner images using, for example, pink, green, or orange developers.

Examples of the developers other than the primary color developers also include a developer containing a magnetic toner. Examples of the developers other than the primary color developers also include a developer containing a conductive toner. Examples of the developers other than the primary color developers also include a developer containing a toner that emits light by being irradiated with ultraviolet rays, infrared rays, etc.

In this exemplary embodiment, the developer is a so-called two-component developer containing a carrier and a toner mixed together. The developer may be a so-called one-component developer composed only of a toner.

The image forming apparatus 100 includes an intermediate transfer belt 15. The image forming apparatus 100 includes first transferrers 10. The toner image formed by each image forming unit 200 is transferred onto the intermediate transfer belt 15 by the first transferrer 10.

The image forming apparatus 100 includes a second transferrer 20. The toner image transferred onto the intermediate transfer belt 15 is transferred onto the paper P by the second transferrer 20.

The image forming apparatus 100 includes a fixing device 60 that fixes, onto the paper P, the toner image transferred onto the paper P.

The image forming apparatus 100 includes a controller 40 including a CPU that executes programs. The controller 40 controls various parts in the image forming apparatus 100.

The image forming apparatus 100 includes a user interface (UI) 45. The UI 45 includes a display panel. The UI 45 receives users' instructions. The UI 45 displays information for users.

Each image forming unit 200 includes a developing device 14. Each image forming unit 200 includes a supply device 70.

The developing device 14 causes the developer to adhere onto the photoreceptor drum 11. The supply device 70 supplies the developer to the developing device 14.

When the developing device 14 causes the developer to adhere onto the photoreceptor drum 11, an electrostatic latent image on the photoreceptor drum 11 is visualized by the toner. The developing device 14 develops the photoreceptor drum 11 that is the image carrier. In this way, a toner image is formed on the photoreceptor drum 11.

The supply device 70 supplies a new developer to the developing device 14.

The image forming apparatus 100 includes a developer container 80. The supply device 70 transports the developer from the developer container 80 to the developing device 14. In this way, the developer is supplied to the developing device 14.

As described above, the developer is composed of the carrier and the toner. The supply device 70 supplies the carrier and the toner to the developing device 14 as the developer. In this exemplary embodiment, the carrier has a positive charging polarity, and the toner has a negative charging polarity.

In each image forming unit 200, the photoreceptor drum 11 that is an example of the image carrier rotates in an arrow A direction.

Each image forming unit 200 includes a charger 12. Each image forming unit 200 includes an exposing device 13.

The charger 12 charges the photoreceptor drum 11. The exposing device 13 forms an electrostatic latent image on the photoreceptor drum 11.

The exposing device 13 includes a light source such as an LED. The exposing device 13 irradiates the photoreceptor drum 11 with light to form an electrostatic latent image on the photoreceptor drum 11.

Each image forming unit 200 includes a first transfer roller 16. The first transfer roller 16 is provided to the first transferrer 10. The first transfer roller 16 is used for transferring a toner image from the photoreceptor drum 11 to the intermediate transfer belt 15.

Each image forming unit 200 includes a drum cleaner 17 that removes the developer remaining on the photoreceptor drum 11.

The intermediate transfer belt 15 circulates in an arrow B direction in FIG. 1 at a predetermined speed by a drive roller 31. The drive roller 31 is driven by a motor (not illustrated) to rotate counterclockwise in FIG. 1.

The first transferrer 10 includes the first transfer roller 16 that faces the photoreceptor drum 11 across the intermediate transfer belt 15. The toner image on the photoreceptor drum 11 moves to the intermediate transfer belt 15 at the first transferrer 10. In this way, the toner image is formed on the intermediate transfer belt 15.

The second transferrer 20 that is an example of a transferrer includes a second transfer roller 22 disposed on an outer side of the intermediate transfer belt 15. The second transferrer 20 includes a backup roller 25 disposed on an inner side of the intermediate transfer belt 15.

In the second transferrer 20, the toner image formed on the intermediate transfer belt 15 is transferred onto the paper P transported to the second transferrer 20.

A reversing mechanism 900 is provided to reverse the paper P.

The reversing mechanism 900 reverses the paper P having a toner image transferred onto the first side by the second transferrer 20. The reversing mechanism 900 feeds the reversed paper P to the second transferrer 20 again.

In this way, toner images are formed on both sides of the paper P.

The reversing mechanism 900 sends the paper P having passed through the fixing device 60 to a branch path R2 that branches from a sheet transport path R1.

After the paper P passes through a branch point BP, the reversing mechanism 900 transports the paper P in a reverse direction. The reversing mechanism 900 sends the paper P to the branch path R2.

The branch path R2 joins the sheet transport path R1 on an upstream side of the second transferrer 20. The paper P sent to the branch path R2 is fed to the second transferrer 20 again. The reversed paper P is fed to the second transferrer 20 again.

In this case, toner images are formed not only on the first side of the paper P but also on the second side thereof. Thus, the toner images are formed on both sides of the paper P.

A flow of a process performed by the image forming apparatus 100 is described.

The image forming apparatus 100 receives image data output from, for example, an image reading apparatus or a computer (not illustrated). The image forming apparatus 100 performs image processing on the image data. Thus, pieces of image data corresponding to the plurality of image forming units 200 are generated.

Specifically, pieces of image data corresponding to four primary colors, namely yellow, magenta, cyan, and black, are generated. In addition, image data corresponding to a color other than the primary colors is generated.

The pieces of generated image data are output to the exposing devices 13 of the image forming units 200.

The exposing device 13 irradiates the photoreceptor drum 11 with light emitted from the light source based on the input image data.

Before the exposing device 13 radiates light, the surface of each photoreceptor drum 11 is charged by the charger 12. After the charging, the exposing device 13 irradiates the surface with light. In this way, an electrostatic latent image is formed on the surface of the photoreceptor drum 11.

Then, the developing device 14 performs development so that the toner contained in the developer adheres onto the photoreceptor drum 11. In this way, a toner image is formed on the photoreceptor drum 11. The toner image is transferred onto the intermediate transfer belt 15 by the first transferrer 10.

The toner images transferred onto the intermediate transfer belt 15 move to the second transferrer 20 along with movement of the intermediate transfer belt 15.

At this time, paper P from a first paper container 53 or a second paper container 54 is transported to the second transferrer 20 by transport rollers 52 etc. The toner images on the intermediate transfer belt 15 are electrostatically transferred collectively onto the paper P by the second transferrer 20.

Then, the paper P where the toner images are transferred is released from the intermediate transfer belt 15 and transported to a transport belt 55. The transport belt 55 transports the paper P to the fixing device 60.

The paper P transported to the fixing device 60 is heated and pressurized by the fixing device 60. In this way, the toner images on the paper P are fixed onto the paper P. The paper P is output from the image forming apparatus 100.

When toner images are formed on both sides of the paper P, the paper P having passed through the fixing device 60 is transported to the branch path R2. At this time, the toner image is formed on the first side of the paper P. The paper P passes through the second transferrer 20 again.

In the second transferrer 20, the toner image is transferred onto the second side of the paper P. Then, the paper P passes through the fixing device 60 again, and the toner image transferred onto the second side is fixed onto the paper P.

The developing device 14 is described.

Figure 2:
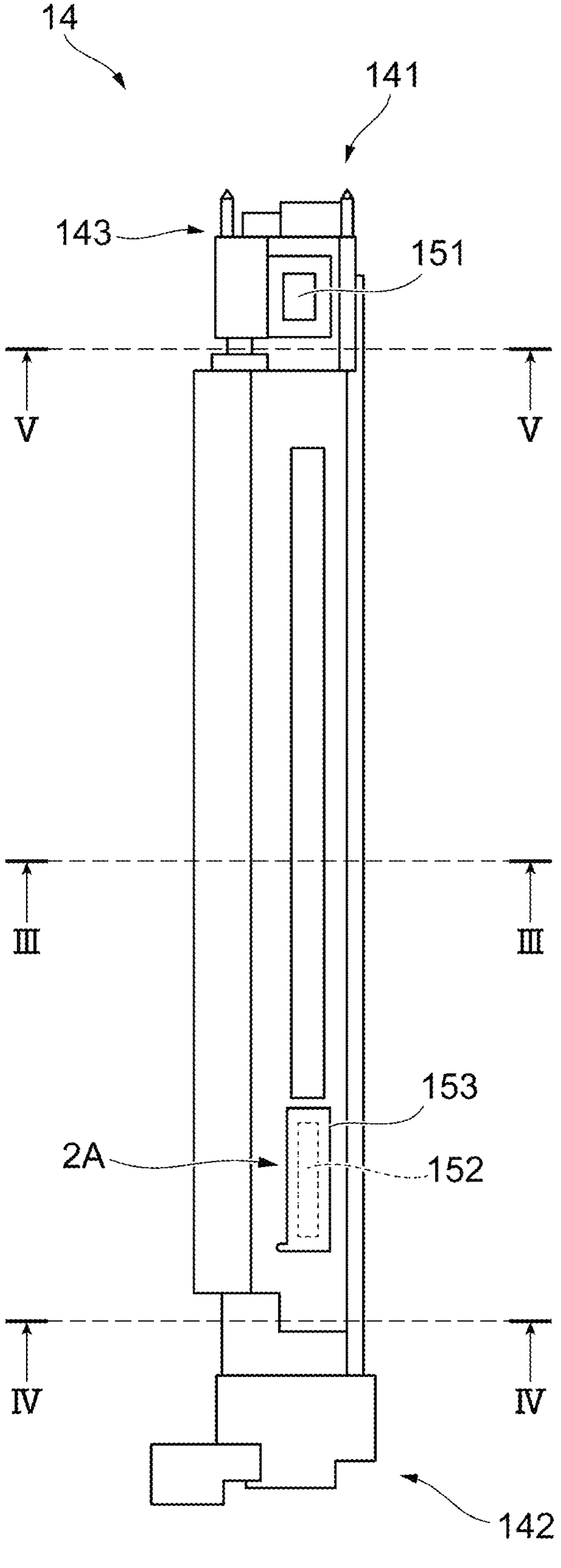
FIG. 2 is a top view of a developing device.

FIG. 2 is a top view of the developing device 14.

When mounted on the image forming apparatus 100, the developing device 14 is disposed along a depth direction of the image forming apparatus 100. The developing device 14 has a first end 141 and a second end 142 that are positionally different in a longitudinal direction.

When the developing device 14 is mounted on the image forming apparatus 100, the first end 141 is positioned on a rear side of the image forming apparatus 100. The second end 142 is positioned on a front side of the image forming apparatus 100.

The first end 141 of the developing device 14 has a drive force receiver 143 that receives a drive force. A drive force from a drive source (not illustrated) such as a motor provided to the body of the image forming apparatus 100 is transmitted to the drive force receiver 143.

The drive force receiver 143 operates in conjunction with a transport member etc. (described later) provided inside the developing device 14. The transport member etc. rotate when the drive force from the drive source is transmitted to the drive force receiver 143.

Figure 3:
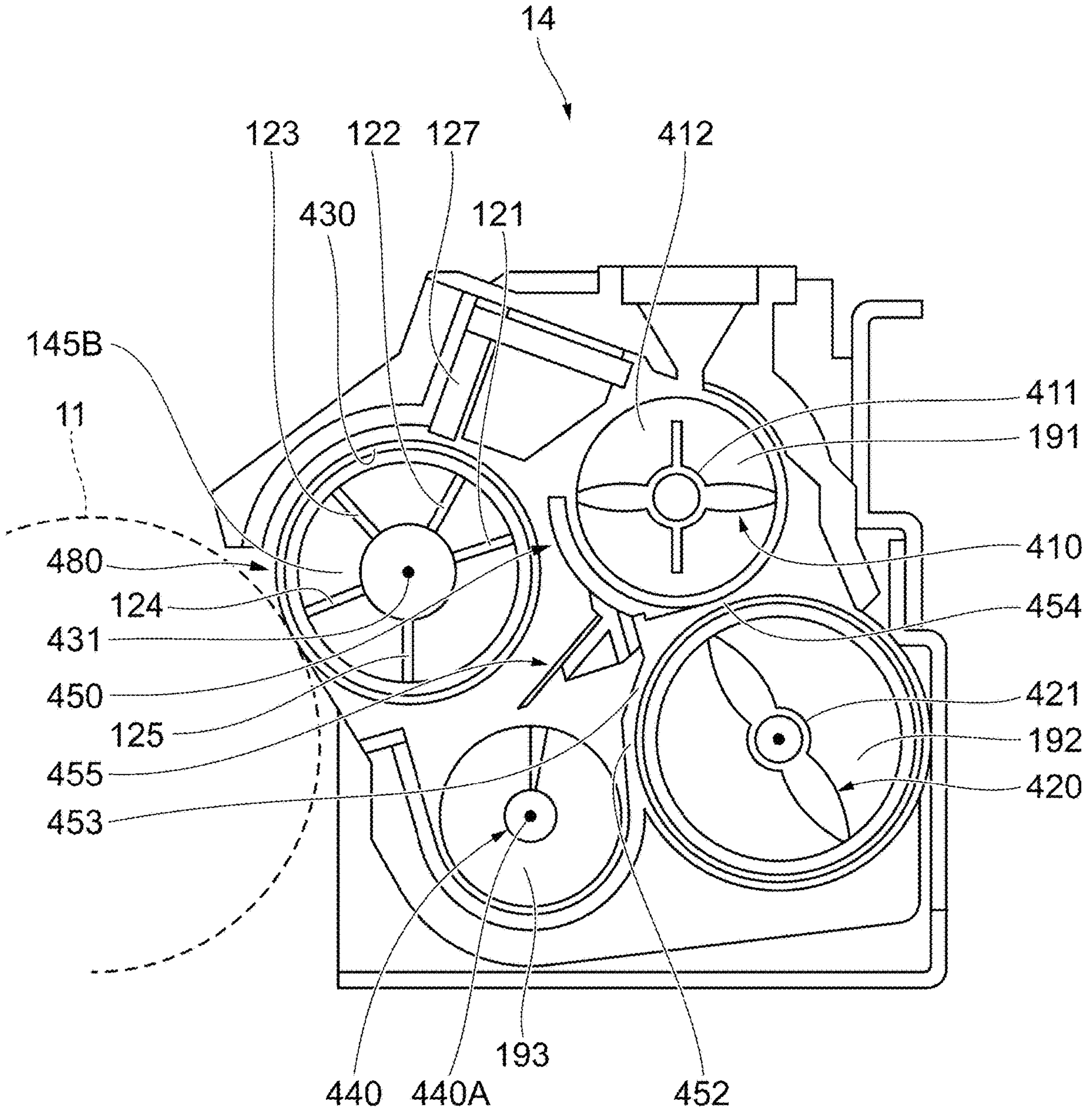
FIG. 3 is a sectional view of the developing device taken along the line III-III in FIG. 2.

FIG. 3 is a sectional view of the developing device 14 taken along the line III-III in FIG. 2. FIG. 3 illustrates the state of a cross section at the center of the developing device 14 in the longitudinal direction.

The developing device 14 has a first-direction movement path 191 through which the developer moves in a first direction.

The developing device 14 has a second-direction movement path 192 through which the developer moves in a second direction opposite to the first direction. The second-direction movement path 192 is disposed below the first-direction movement path 191.

In the first-direction movement path 191, the developer moves to a far side of the drawing sheet of FIG. 3 in a direction perpendicular to the drawing sheet. In the second-direction movement path 192, the developer moves to a near side of the drawing sheet of FIG. 3 in a direction perpendicular to the drawing sheet.

A first-direction transport member 410 is provided in the first-direction movement path 191 to transport the developer.

The first-direction transport member 410 rotates about a rotation shaft 411 extending along the first-direction movement path 191. Through the rotation of the first-direction transport member 410, the developer moves to the far side of the drawing sheet of FIG. 3.

A second-direction transport member 420 is provided in the second-direction movement path 192 to transport the developer. The second-direction transport member 420 is disposed below the first-direction transport member 410.

The second-direction transport member 420 rotates about a rotation shaft 421 extending along the second-direction movement path 192. Thus, the developer transported by the second-direction transport member 420 moves to the near side of the drawing sheet of FIG. 3.

The second-direction transport member 420 transports the developer in the second direction opposite to the first direction.

A rotator 430 is provided on a left side of the first-direction transport member 410. The rotator 430 is used for supplying the developer to the photoreceptor drum 11 that is an example of the image carrier.

The developing device 14 has a facing opening 480. The facing opening 480 is positioned to face the photoreceptor drum 11.

The rotator 430 is disposed at the facing opening 480. In this exemplary embodiment, part of the rotator 430 is exposed through the facing opening 480.

The rotator 430 supplies the photoreceptor drum 11 with the developer that is supplied to the rotator 430 from the first-direction transport member 410. The rotator 430 is supplied with the developer from the first-direction transport member 410, and supplies the developer to the photoreceptor drum 11.

The rotator 430 is a cylinder. The rotator 430 is made of metal such as SUS.

The rotator 430 rotates counterclockwise in FIG. 3 about an axis 431. The rotator 430 moves, to the photoreceptor drum 11, the developer that is supplied from the first-direction transport member 410 and adheres to the outer peripheral surface of the rotator 430.

In this way, the developer is supplied to the photoreceptor drum 11, and the toner contained in the developer adheres to the surface of the photoreceptor drum 11.

A first movement restrictor 450 is provided between the rotator 430 and the first-direction transport member 410. The first movement restrictor 450 restricts movement of part of the developer from the first-direction transport member 410 to the rotator 430.

In this exemplary embodiment, part of the developer in the first-direction movement path 191 moves over the first movement restrictor 450. In this exemplary embodiment, the developer having moved over the first movement restrictor 450 is supplied to the rotator 430.

A lower transport member 440 is provided below the rotator 430.

The lower transport member 440 is a rotary member that rotates about an axis 440A along the first direction. The lower transport member 440 is disposed closer to the photoreceptor drum 11 than is the second-direction transport member 420.

The lower transport member 440 transports the developer separated from the rotator 430 to the far side of the drawing sheet of FIG. 3 in a direction perpendicular to the drawing sheet.

The lower transport member 440 transports the developer separated from the rotator 430 in the first direction. Thus, the developer is supplied toward the first end of the second-direction transport member 420 (detailed later).

A second movement restrictor 452 is provided between the lower transport member 440 and the second-direction transport member 420. The second movement restrictor 452 restricts movement of the developer from the second-direction transport member 420 to the lower transport member 440.

A third movement restrictor 453 is provided between the rotator 430 and the second-direction transport member 420. The third movement restrictor 453 restricts movement of the developer from the second-direction transport member 420 to the rotator 430.

A fourth movement restrictor 454 is provided between the first-direction transport member 410 and the second-direction transport member 420.

The fourth movement restrictor 454 restricts movement of the developer from the first-direction transport member 410 to the second-direction transport member 420. The fourth movement restrictor 454 also restricts movement of the developer from the second-direction transport member 420 to the first-direction transport member 410.

A fifth movement restrictor 455 is provided between the rotator 430 and the lower transport member 440. The fifth movement restrictor 455 restricts movement of the developer from the lower transport member 440 to the rotator 430.

A magnet roller 145B is provided inside the rotator 430.

The magnet roller 145B has five magnetic poles 121 to 125 arranged along a circumferential direction of the magnet roller 145B.

The magnetic pole 121 is a pickup pole that attracts the developer supplied from the first-direction movement path 191. In this way, the developer adheres to the surface of the rotator 430.

The magnetic poles 122 to 124 are transport poles. The magnetic poles 122 to 124 move the developer on the surface of the rotator 430 downstream in the rotation direction of the rotator 430.

A facing restrictor 127 is provided on the downstream side of the magnetic pole 122 and on the upstream side of the magnetic pole 123 in the rotation direction of the rotator 430. The facing restrictor 127 is positioned to face the outer peripheral surface of the rotator 430.

The facing restrictor 127 has a clearance from the rotator 430. The facing restrictor 127 restricts movement of part of the developer adhering to the surface of the rotator 430. Thus, the developer adhering to the surface of the rotator 430 has a predetermined thickness.

The developer on the surface of the rotator 430 moves downstream in the rotation direction of the rotator 430. Then, the developer moves to the surface of the photoreceptor drum 11, and the toner contained in the developer adheres to the photoreceptor drum 11.

In this way, the development is performed and a toner image is formed on the surface of the photoreceptor drum 11.

The toner image is temporarily carried by the photoreceptor drum 11. The toner image moves to the first transferrer 10 (see FIG. 1) by the rotating photoreceptor drum 11. The toner image is transferred onto the intermediate transfer belt 15.

The magnetic pole 125 (see FIG. 3) is a pickoff pole. The magnetic pole 125 forms a repulsive magnetic field to separate, from the rotator 430, the developer adhering to the surface of the rotator 430.

The magnetic pole 125 separates, from the rotator 430, the developer that has not been transferred onto the photoreceptor drum 11.

The developer separated from the rotator 430 moves downward to a lower movement path 193.

The developer having reached the lower movement path 193 moves toward the first end 141 of the developing device 14 (see FIG. 2) by the lower transport member 440. Then, the developer moves to the second-direction movement path 192 (detailed later).

Figure 4:
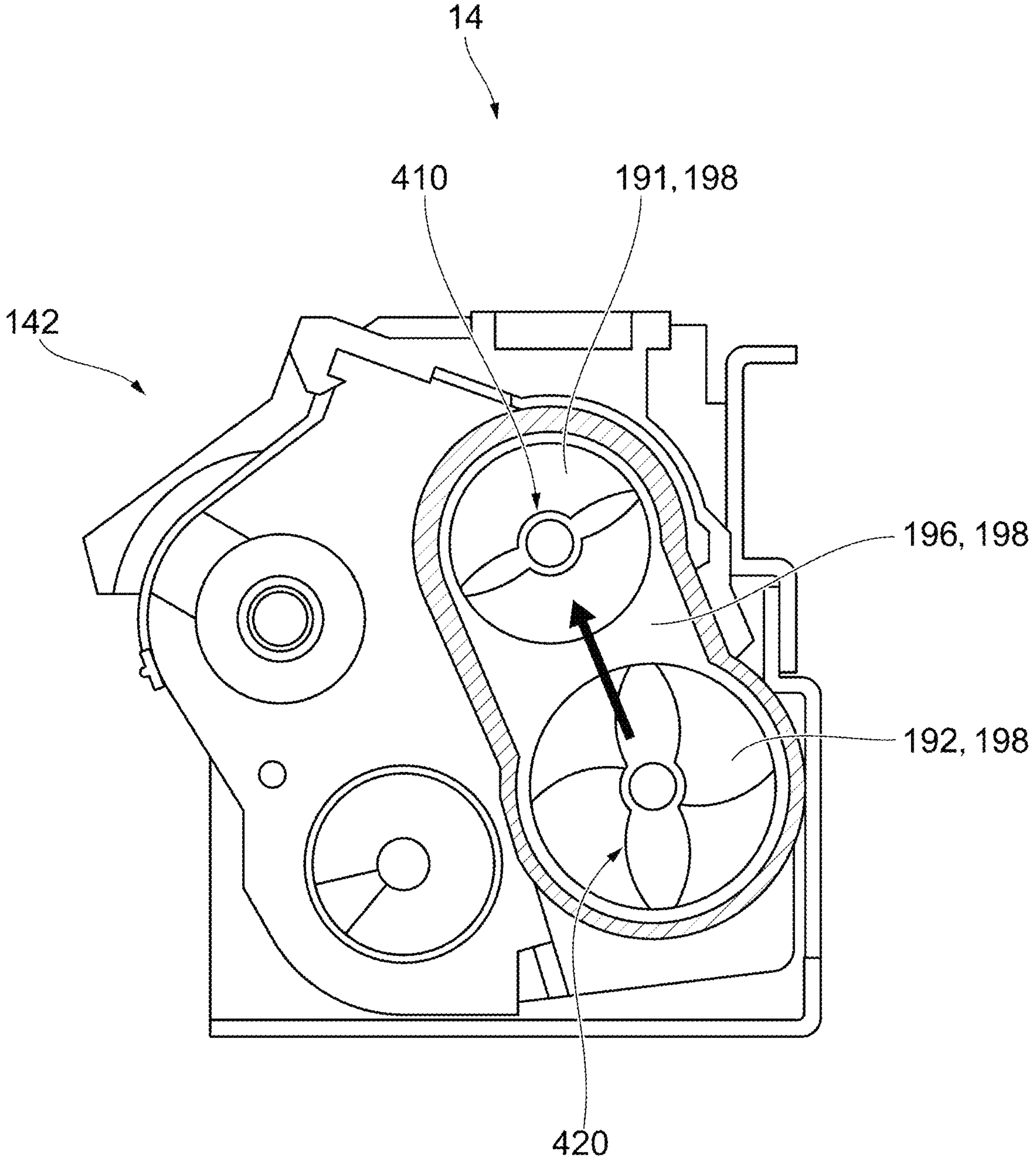
FIG. 4 is a sectional view of the developing device taken along the line IV-IV in FIG. 2.

FIG. 4 is a sectional view of the developing device 14 taken along the line IV-IV in FIG. 2.

FIG. 4 illustrates the state of a cross section at the second end 142 of the developing device 14.

The second end 142 of the developing device 14 has an upward movement path 196 disposed along an up-down direction. The developer having moved through the second-direction movement path 192 moves to the first-direction movement path 191 through the upward movement path 196.

In this exemplary embodiment, the developer stays at the downstream end of the second-direction movement path 192 in the developer movement direction. In this exemplary embodiment, the developer staying at this end is pushed by the developer sequentially transported from the upstream side. In this way, the developer staying at this end moves upward through the upward movement path 196.

As a result, the developer in the second-direction movement path 192 moves to the first-direction movement path 191 through the upward movement path 196.

Figure 5:
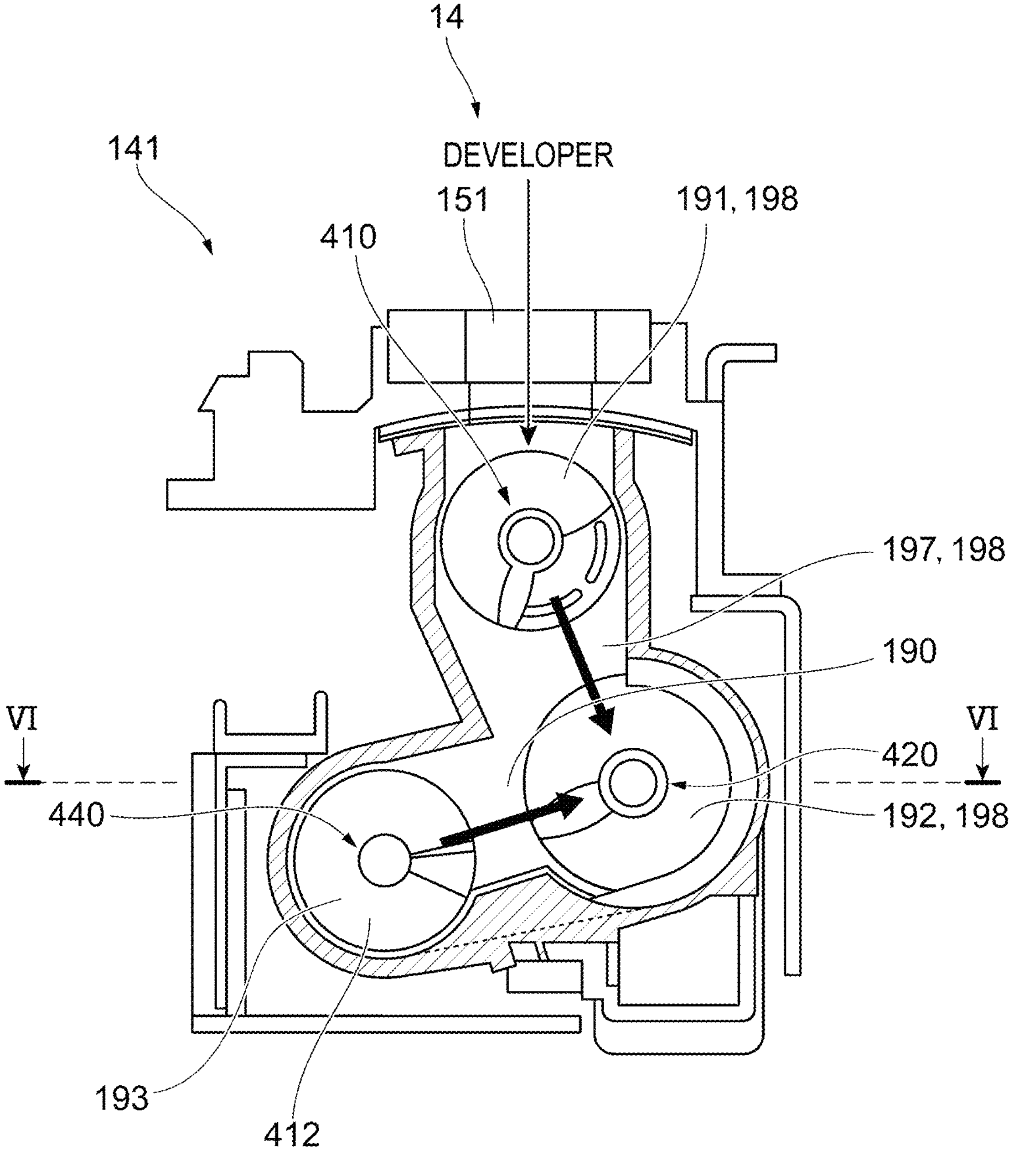
FIG. 5 is a sectional view of the developing device taken along the line V-V in FIG. 2.
Figure 6:
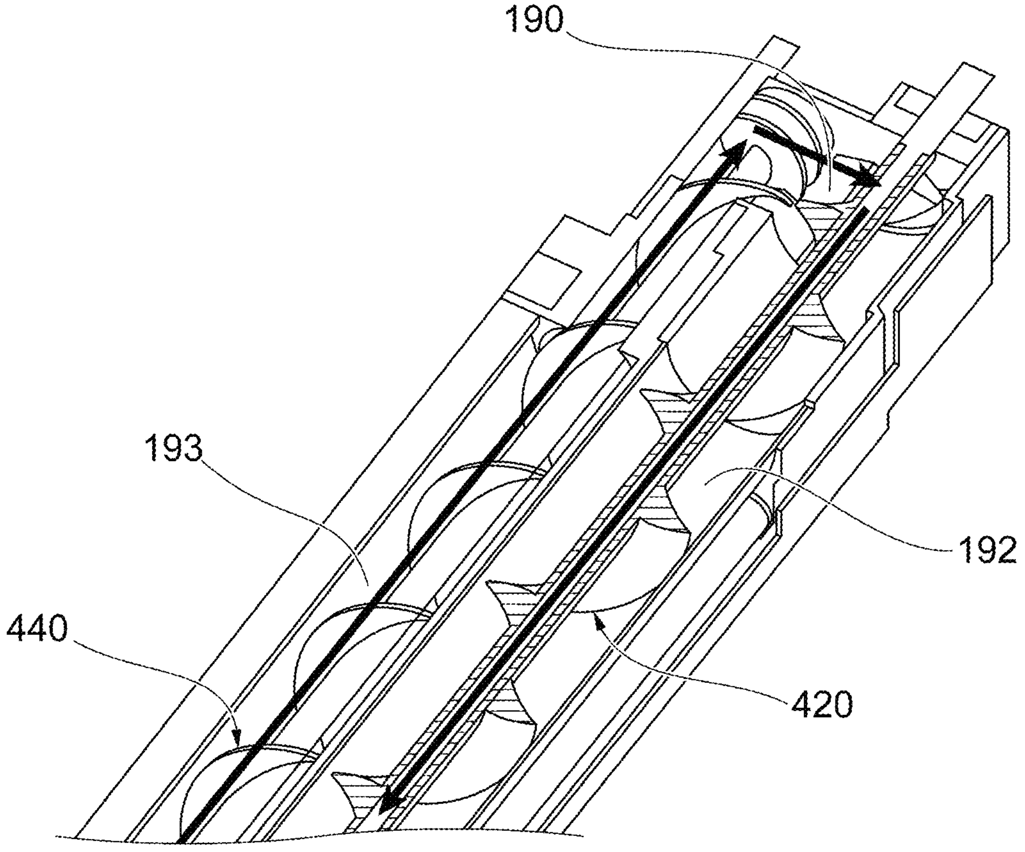
FIG. 6 is a sectional view of the developing device taken along the line VI-VI in FIG. 5.

FIG. 5 is a sectional view of the developing device 14 taken along the line V-V in FIG. 2. FIG. 6 is a sectional view of the developing device 14 taken along the line VI-VI in FIG. 5.

FIG. 5 illustrates the state of a cross section at the first end 141 of the developing device 14.

As illustrated in FIG. 5, the first end 141 of the developing device 14 has a downward movement path 197 disposed along the up-down direction.

The developer having moved through the first-direction movement path 191 moves to the second-direction movement path 192 through the downward movement path 197.

In this exemplary embodiment, a connection path 190 is provided as illustrated in FIGS. 5 and 6. The connection path 190 extends in a lateral direction to connect the lower movement path 193 and the second-direction movement path 192.

In this exemplary embodiment, the developer moves along the lower movement path 193 by the lower transport member 440. The developer having moved along the lower movement path 193 moves to the second-direction movement path 192 through the connection path 190.

In this exemplary embodiment, the developer stays at the downstream end of the lower movement path 193 in the developer movement direction.

In this exemplary embodiment, the developer staying at this end is pushed by the developer sequentially transported from the upstream side. In this way, the developer staying at this end moves to the second-direction movement path 192 through the connection path 190.

In this exemplary embodiment, the developer moves along the first-direction movement path 191 (see FIG. 3) and the second-direction movement path 192. Thus, the developer circulates in this exemplary embodiment.

In this exemplary embodiment, part of the developer moving along the first-direction movement path 191 is supplied to the rotator 430. The developer is supplied to the photoreceptor drum 11 via the rotator 430.

The developer remaining on the surface of the rotator 430 without being supplied to the photoreceptor drum 11 separates from the rotator 430 and moves to the lower movement path 193. The developer moves to the second-direction movement path 192 through the lower movement path 193.

In this exemplary embodiment, as illustrated in FIG. 2, the developing device 14 has a first reception port 151 for receiving the developer. The developing device 14 receives the developer sent from the supply device 70 through the first reception port 151.

As illustrated in FIG. 5, the developer sent from the supply device 70 enters the developing device 14 through the first reception port 151.

In this exemplary embodiment, a second reception port 152 is provided at a part 2A in FIG. 2. The second reception port 152 is closed by a closing member 153.

In this exemplary embodiment, the user may manually supply a new developer to the developing device 14 using a jig (not illustrated).

When the user manually supplies the new developer, the user first removes the closing member 153. The user supplies the developer to the developing device 14 through the second reception port 152 that appears by removing the closing member 153.

As illustrated in FIG. 3, the developing device 14 of this exemplary embodiment has the facing opening 480 where the rotator 430 is disposed.

In this exemplary embodiment, the first reception port 151, the second reception port 152, and the facing opening 480 are provided as openings.

In this exemplary embodiment, the developing device 14 has no other opening than the first reception port 151, the second reception port 152, and the facing opening 480.

The developing device 14 of this exemplary embodiment has connection openings through which the inside and outside of the developing device 14 communicate with each other. In this exemplary embodiment, the developing device 14 has no other connection opening than the first reception port 151, the second reception port 152, and the facing opening 480.

In this exemplary embodiment, the internal pressure of the developing device 14 is released from an opening in the supply device 70 instead of the connection opening in the developing device 14.

In this exemplary embodiment, the developer adhering to the surface of the rotator 430 returns into the developing device 14 without being transferred onto the photoreceptor drum 11. At this time, air outside the developing device 14 enters the developing device 14. Along with this, the internal pressure of the developing device 14 increases.

When the internal pressure of the developing device 14 increases, gas will move from the inside to the outside of the developing device 14. In this exemplary embodiment, the gas that will move from the inside to the outside of the developing device 14 moves to the supply device 70 (see FIG. 1).

The gas is discharged to the outside of the supply device 70 through the opening in the supply device 70 (not illustrated in FIG. 1). Examples of the gas include air.

When the gas is discharged only through the connection opening in the developing device 14, the gas having high pressure is likely to be discharged.

In this exemplary embodiment, the gas is discharged through the opening in the supply device 70 spaced away from the developing device 14. In this case, the gas having low pressure is discharged through the opening.

When the gas having low pressure is discharged, the amount of the developer that will move to the outside through the opening in the supply device 70 decreases.

The provision of the connection opening in the developing device 14 is not precluded. The developing device 14 may have the connection opening and the supply device 70 may further have the opening.

In this case, the gas inside the developing device 14 is discharged to the outside of the developing device 14 through the connection opening.

In this case, the gas inside the developing device 14 is also discharged to the outside of the developing device 14 through the opening in the supply device 70.

Figure 7:
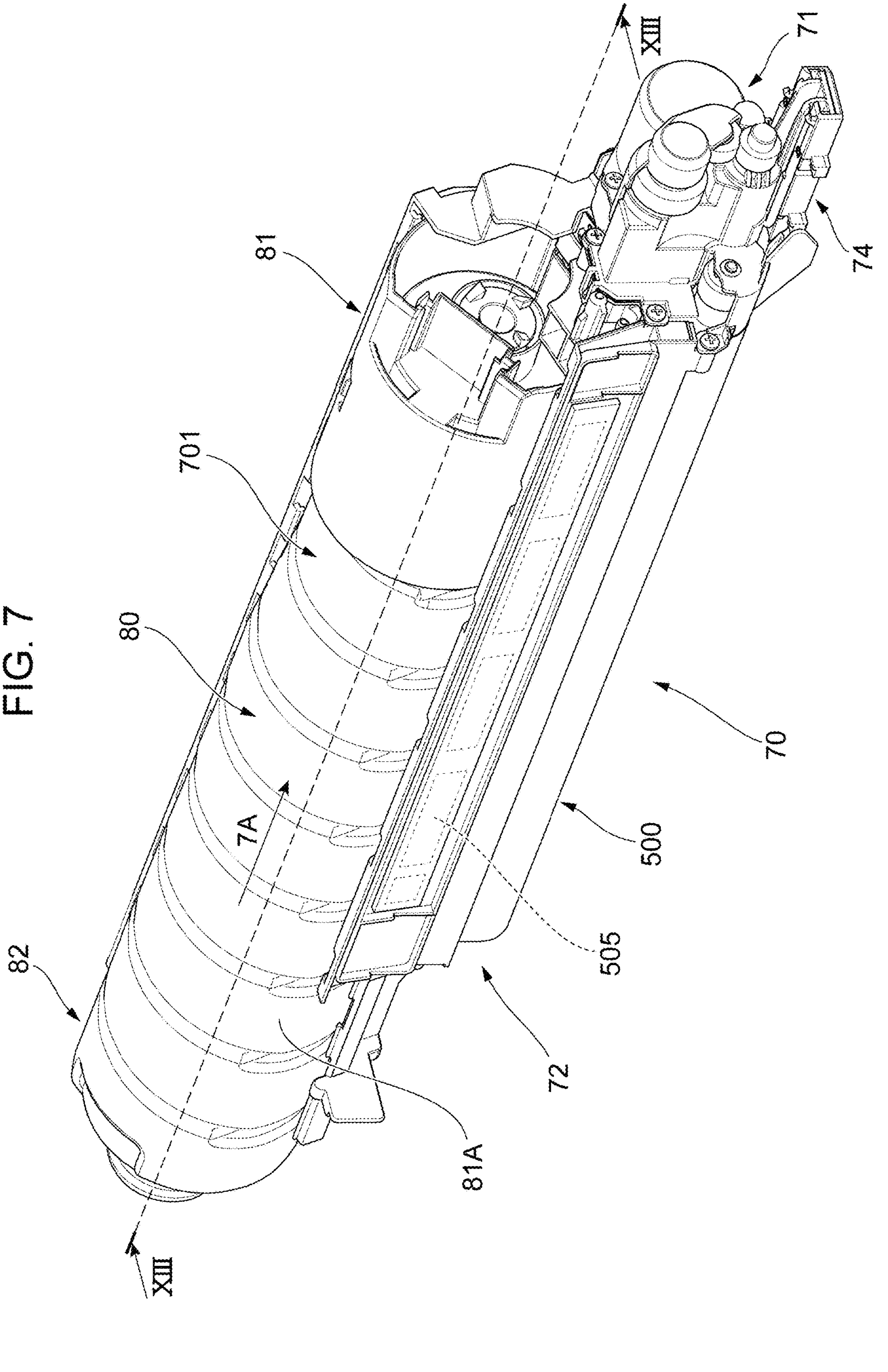
FIG. 7 is a perspective view of a supply device that is viewed from a rear side of the image forming apparatus.

FIG. 7 is a perspective view of the supply device 70 that is viewed from the rear side of the image forming apparatus 100. FIG. 7 illustrates a state in which the developer container 80 is attached.

The developer container 80 contains, for example, the developer for future use. In this exemplary embodiment, the developer container 80 is detachable from the image forming apparatus 100 (see FIG. 1). The developer container 80 is mounted on a mounting portion 701 of the supply device 70.

To mount the developer container 80 on the image forming apparatus 100, the developer container 80 moves in an arrow 7A direction in FIG. 7.

The developer container 80 has a tubular shape. Specifically, the developer container 80 has a cylindrical shape. The shape of the developer container 80 is not limited to the cylindrical shape. The developer container 80 may have a rectangular column shape.

When the developer container 80 is mounted on the image forming apparatus 100, the supply device 70 is located below the developer container 80. In this exemplary embodiment, the supply device 70 supplies the developer from the developer container 80 to the developing device 14 (not illustrated in FIG. 7).

The developer container 80 has a first end 81 located at a leading position when the developer container 80 is mounted on the image forming apparatus 100. The developer container 80 has a second end 82 opposite to the first end 81.

A developer outlet is provided at a lower part of the first end 81 of the developer container 80. The developer in the developer container 80 moves to the supply device 70 located below the developer container 80 through the outlet.

The supply device 70 has a first end 71 and a second end 72.

The first end 71 of the supply device 70 is positioned on the rear side of the image forming apparatus 100. The second end 72 of the supply device 70 is positioned on the front side of the image forming apparatus 100.

The first end 71 of the supply device 70 has a reception port (not illustrated in FIG. 7) that receives the developer from the developer container 80.

In this exemplary embodiment, the developer is transported to the supply device 70 from the upstream side of the supply device 70 in the developer transport direction. The supply device 70 has the reception port that receives the developer transported from the upstream side.

The developer container 80 has a function of sending the internal developer to the outside. The developer container 80 includes members for sending the developer to the outside of the developer container 80.

The developer container 80 is positioned on the upstream side of the supply device 70 in the developer transport direction. The reception port of the supply device 70 receives the developer supplied from the developer container 80 positioned on the upstream side.

The supply device 70 includes a developer accumulator 500 that accumulates the developer having entered the supply device 70 through the reception port.

The developer supplied from the developer container 80 to the supply device 70 is temporarily contained in the developer accumulator 500.

The developer accumulator 500 temporarily accumulates the developer.

The developer moves through the developer accumulator 500 and is then discharged from a discharge port 74 provided at the first end 71 of the supply device 70.

The supply device 70 has the discharge port 74 to be used for discharging the developer received through the reception port. The developer discharged from the discharge port 74 is supplied to the developing device 14 (not illustrated in FIG. 7) positioned below the discharge port 74.

In this exemplary embodiment, the first reception port 151 of the developing device 14 (see FIG. 2) is disposed immediately below the discharge port 74 of the supply device 70.

The developer discharged from the discharge port 74 moves into the developing device 14 through the first reception port 151. In this way, the developer is supplied from the supply device 70 to the developing device 14.

The developer accumulator 500 temporarily contains the developer.

Thus, the developer is supplied from the supply device 70 to the developing device 14 even if the developer container 80 is removed.

The developer container 80 is removed when the developer container 80 is empty.

In this exemplary embodiment, the developer in the developer accumulator 500 is supplied to the developing device 14 even if the developer container 80 is removed.

Thus, the developer is supplied from the supply device 70 to the developing device 14 even if the developer container 80 is removed.

The supply device 70 has an opening 505 through which the inside and outside of the supply device 70 communicate with each other. The opening 505 is positioned to face an outer peripheral surface 81A of the developer container 80 mounted on the mounting portion 701.

The phrase "positioned to face" refers to a state in which the opening 505 is positioned in a space where it faces the outer peripheral surface 81A.

Even if a member is present between the opening 505 and the outer peripheral surface 81A, the positional relationship corresponds to "positioned to face." Even if the opening 505 is oriented opposite to the outer peripheral surface 81A, the positional relationship corresponds to "positioned to face."

Figure 8:
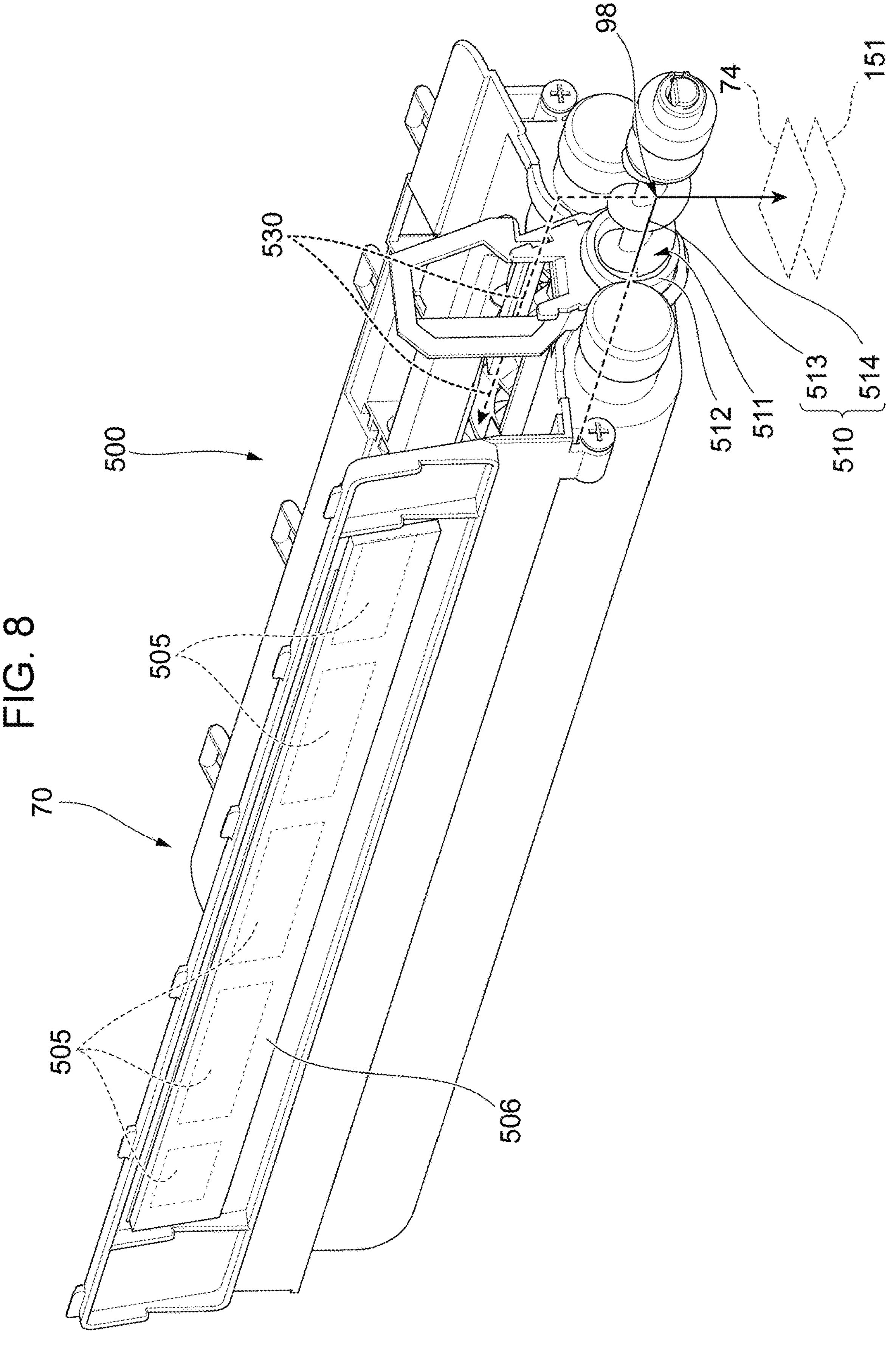
FIG. 8 illustrates a developer accumulator.

FIG. 8 illustrates the developer accumulator 500.

The developer accumulator 500 has a developer channel 510 through which the developer passes toward the developing device 14. The developer channel 510 extends from the inside to the outside of the developer accumulator 500.

A filled portion 511 is present in the developer channel 510. The filled portion 511 is filled with the developer over the entire cross section of the developer channel 510.

The "cross section" of the developer channel 510 herein refers to a cross section of the developer channel 510 in a plane orthogonal to the extending direction of the developer channel 510.

A tubular portion 512 is provided around the filled portion 511. In this exemplary embodiment, the inner part of the tubular portion 512 is the filled portion 511.

On the cross section orthogonal to an axial direction of the tubular portion 512, the entire inner part of the tubular portion 512 is filled with the developer.

Thus, the developer is dense on the cross section orthogonal to the axial direction of the tubular portion 512.

Accordingly, the filled portion 511 that is filled with the developer is present on the inner side of the tubular portion 512 in this exemplary embodiment.

If the filled portion 511 is present, the amount of the developer supplied per unit time from the supply device 70 to the developing device 14 is stable.

If the filled portion 511 is not present, the density of the developer toward the developing device 14 is likely to vary.

In this case, the amount of the developer supplied per unit time from the supply device 70 to the developing device 14 is likely to vary.

On the downstream side of the filled portion 511 in the developer transport direction, the developer channel 510 changes its orientation to extend downward.

The developer channel 510 includes a lateral channel 513 extending in the lateral direction, and an up-down channel 514 extending in the up-down direction.

The developer having passed through the filled portion 511 moves away from the filled portion 511 through the lateral channel 513. Then, the developer moves downward through the up-down channel 514. The developer falls along the up-down channel 514.

The discharge port 74 of the supply device 70 and the first reception port 151 of the developing device 14 are provided below the up-down channel 514. The developer moving downward through the up-down channel 514 is supplied to the developing device 14.

A gas channel 530 is provided as a channel through which gas flowing from the developing device 14 to the supply device 70 passes. The gas channel 530 is provided separately from the developer channel 510.

In this exemplary embodiment, as described above, gas flows from the developing device 14 toward the supply device 70 when the internal pressure of the developing device 14 increases.

The gas flowing from the developing device 14 to the supply device 70 enters the supply device 70 through the discharge port 74 of the supply device 70.

Then, the gas moves upward through the up-down channel 514 that is an example of a falling portion. Then, the gas enters the gas channel 530 that branches from the developer channel 510.

The gas having entered the gas channel 530 moves to the opening 505 in the supply device 70 and is discharged from the opening 505. A filter 506 is disposed at the opening 505. In FIG. 8, the opening 505 is provided behind the filter 506.

Figure 9A:
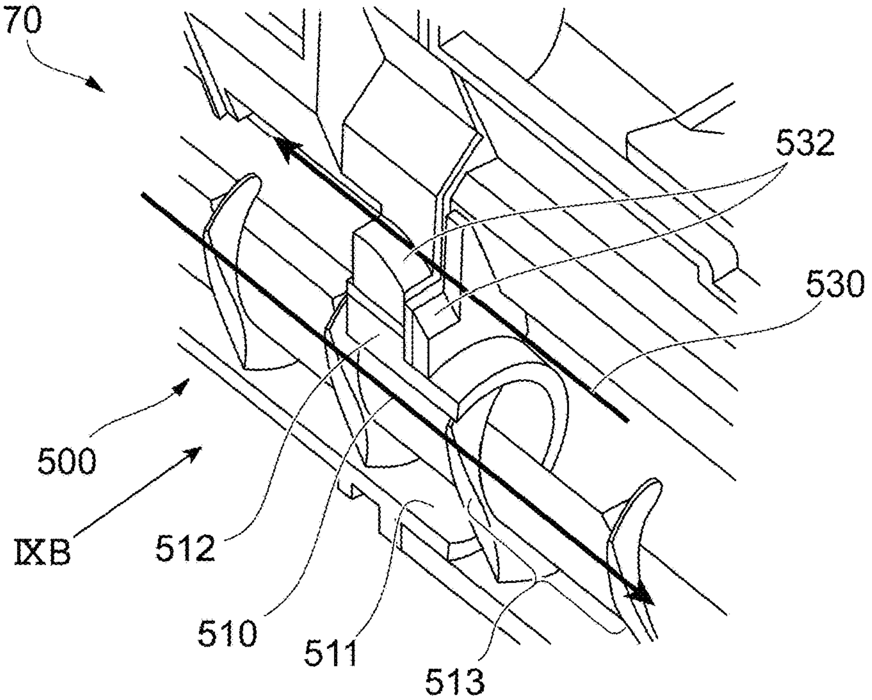
FIGS. 9A and 9B illustrate a filled portion and a gas channel.
Figure 9B:
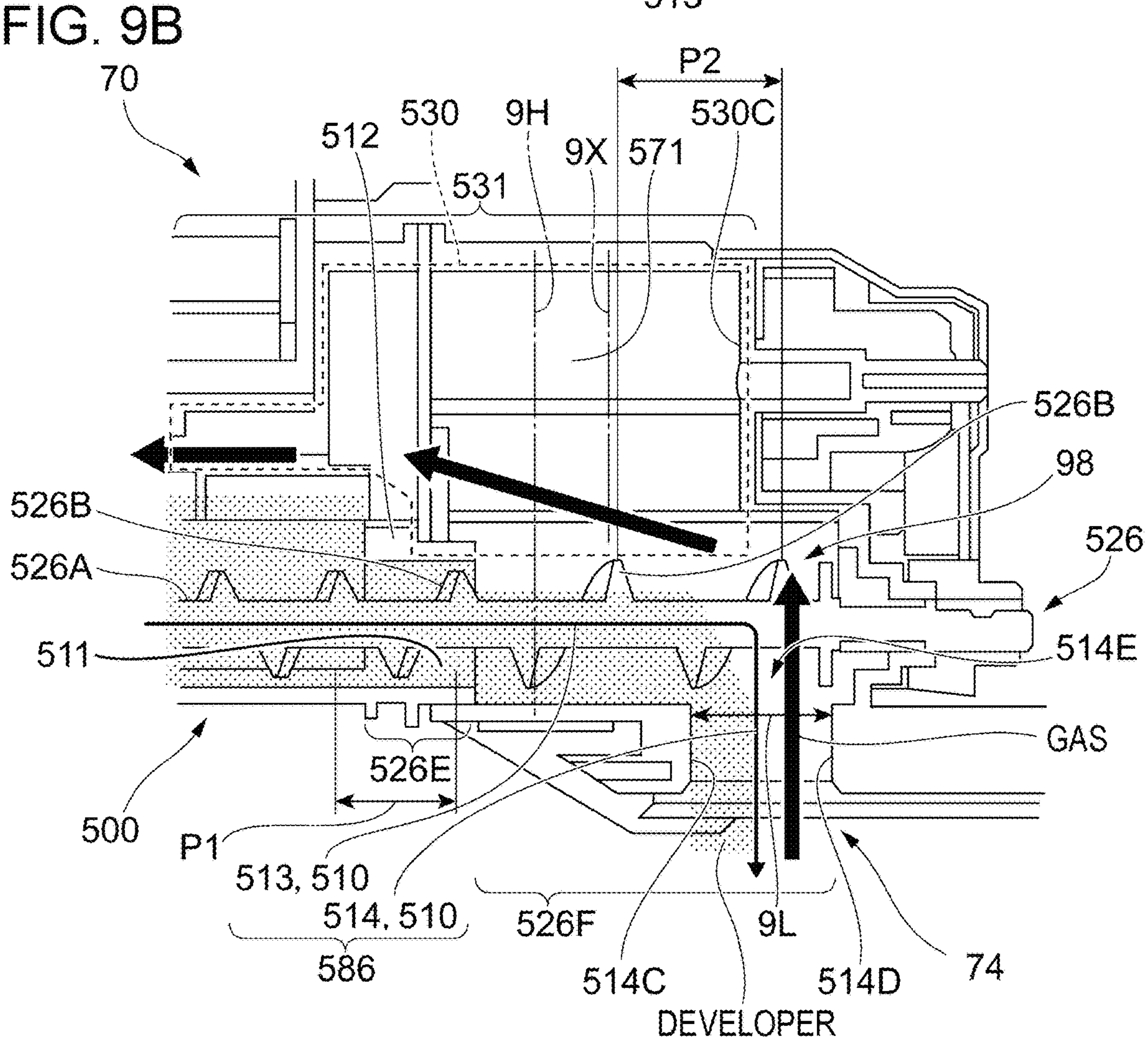

FIGS. 9A and 9B illustrate the filled portion 511 and the gas channel 530.

FIG. 9A is a perspective view of the filled portion 511 and the gas channel 530. FIG. 9B illustrates the filled portion 511 and the gas channel 530 that are viewed in an arrow IXB direction in FIG. 9A.

In this exemplary embodiment, as described above, the developer channel 510 is provided as illustrated in FIG. 9A. The developer channel 510 extends from the inside to the outside of the developer accumulator 500.

In the developer channel 510, the filled portion 511 is present on the inner side of the tubular portion 512. The gas channel 530 is provided above the tubular portion 512 in FIGS. 9A and 9B. The gas channel 530 is provided above the filled portion 511.

As illustrated in FIG. 8, the gas channel 530 branches from the developer channel 510.

A branch point 98 is an example of a branch portion where the gas channel 530 branches from the developer channel 510. The branch point 98 is positioned on the downstream side of the filled portion 511 in the developer transport direction.

The gas channel 530 branches from the developer channel 510 on the downstream side of the filled portion 511 in the developer transport direction.

The gas channel 530 that branches from the developer channel 510 extends above the filled portion 511 as illustrated in FIG. 9A.

Gas in the gas channel 530 passes above the filled portion 511. The gas in the gas channel 530 moves upstream in the developer movement direction through a portion other than the filled portion 511.

In the filled portion 511, the developer is dense and the gas hardly passes. Therefore, the gas channel 530 through which the gas passes is provided at the portion other than the filled portion 511 in this exemplary embodiment.

As illustrated in FIG. 8, the gas channel 530 extends from the branch point 98 to the side where the tubular portion 512 is provided. The gas channel 530 extends upstream in the developer movement direction above the tubular portion 512.

As described later, the gas channel 530 is connected to the internal space of the supply device 70 again. In other words, the gas channel 530 enters the internal space of the supply device 70.

The gas channel 530 is connected to the internal space of the supply device 70 again on the upstream side of the filled portion 511 in the developer movement direction.

The gas channel 530 is connected to the internal space of the supply device 70 again at a point other than the branch point 98.

In this exemplary embodiment, the gas channel 530 branches from the developer channel 510 at the branch point 98. The gas channel 530 is connected to the internal space of the supply device 70 again at the point other than the branch point 98.

As illustrated in FIG. 9B, the gas from the developing device 14 first passes through the up-down channel 514 that is part of the developer channel 510. The up-down channel 514 that is part of the developer channel 510 is the falling portion where the developer falls.

The gas from the developing device 14 passes through the up-down channel 514 that is an example of the falling portion. The gas moves upstream in the developer movement direction through the up-down channel 514.

The gas flowing from the developing device 14 to the supply device 70 passes through the developer channel 510. The gas in the developer channel 510 moves upstream in the developer movement direction.

The filled portion 511 is provided in the developer channel 510. As described above, the filled portion 511 is filled with the developer over the entire cross section of the developer channel 510.

The developer channel 510 includes the up-down channel 514 that is an example of the falling portion.

The up-down channel 514 is positioned on the downstream side of the filled portion 511 in the developer movement direction.

A direction that intersects the vertical direction may be hereinafter referred to as "intersecting direction."

The filled portion 511 and the up-down channel 514 are disposed at different positions in the intersecting direction.

The developer having passed through the filled portion 511 moves in the intersecting direction to the up-down channel 514. In the up-down channel 514, the developer falls downward.

The gas flowing from the developing device 14 to the supply device 70 first moves upward through the up-down channel 514 illustrated in FIG. 9B.

Then, the gas temporarily enters the lateral channel 513, and then enters the gas channel 530 positioned above the lateral channel 513. The gas moves leftward in FIG. 9B through the gas channel 530.

As illustrated in FIG. 9B, the gas channel 530 extends in the lateral direction. In other words, the gas channel 530 extends in the intersecting direction. The gas channel 530 includes a lateral portion 531 extending in the lateral direction.

As illustrated in FIG. 9A, the bottom of the lateral portion 531 has a slope 532 inclined from the horizontal direction. The slope 532 is inclined upward to the upstream side in the gas movement direction in the gas channel 530.

With the slope 532 at the bottom, the developer hardly stays at the bottom. The developer on the slope 532 at the bottom of the gas channel 530 slides. Thus, the developer moves in a right-downward direction in FIG. 9A.

The lateral channel 513 is located on the downstream side in the right-downward direction. The developer on the bottom of the gas channel 530 moves to the lateral channel 513.

In this exemplary embodiment, the sectional area of the up-down channel 514 that is an example of the falling portion is larger than the sectional area of the filled portion 511 illustrated in FIG. 9B. In this exemplary embodiment, the sectional area of the up-down channel 514 is 1.1 times or more as large as the sectional area of the filled portion 511.

When the sectional area of the up-down channel 514 is larger than the sectional area of the filled portion 511, the area of the developer in the cross section of the up-down channel 514 decreases.

In this case, the area of the developer in the cross section of the up-down channel 514 is smaller than in the case where the sectional areas are the same.

As illustrated in FIG. 9B, a space 571 is present between the filled portion 511 and the up-down channel 514 in the intersecting direction that intersects the vertical direction. Both the developer and the gas pass through the space 571.

The developer moving from the filled portion 511 toward the up-down channel 514 passes through the space 571. The gas moving from the up-down channel 514 toward the filled portion 511 also passes through the space 571.

In this exemplary embodiment, the sectional area of the space 571 is larger than the sectional area of the filled portion 511. The sectional area of the space 571 is also larger than the sectional area of the up-down channel 514.

The sectional area of the space 571 refers to a sectional area in an imaginary plane 9H along the vertical direction.

The sectional area of the filled portion 511 refers to a sectional area of an inner region located on the inner side of the inner peripheral surface of the tubular portion 512. The sectional area of the filled portion 511 refers to the sectional area of the inner region in an imaginary plane orthogonal to the axial direction of the tubular portion 512.

In this exemplary embodiment, a central transport member 526 having a rotation shaft 526A is provided in the filled portion 511.

In this case, a value obtained by subtracting the sectional area of the rotation shaft 526A is the sectional area of the filled portion 511. A value obtained by subtracting the sectional area of the rotation shaft 526A from the sectional area of the inner region is the sectional area of the filled portion 511.

Details of the central transport member 526 are described later.

Figure 21A:
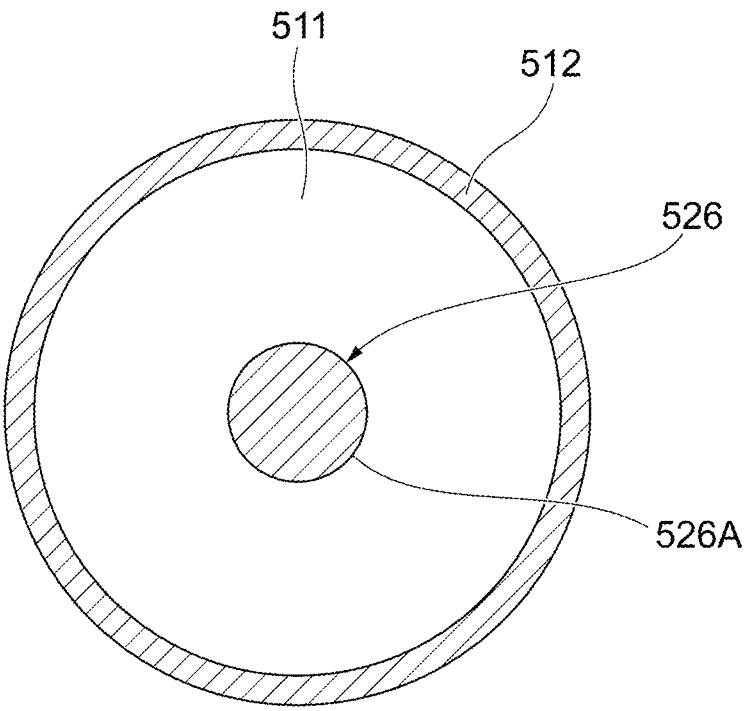
FIGS. 21A and 21B illustrate the states of cross sections.
Figure 21B:
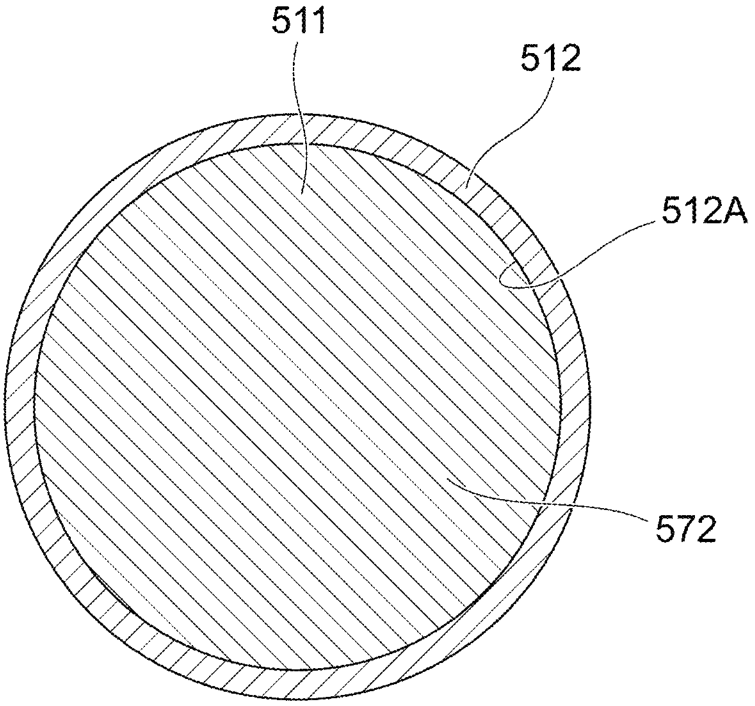

FIGS. 21A and 21B illustrate the states of cross sections.

FIG. 21A illustrates the state of the cross section of the filled portion 511. In FIG. 21A, illustration is omitted for protrusions 526B of the central transport member 526.

FIG. 21B illustrates the state of a cross section without the central transport member 526.

The central transport member 526 may be omitted from the filled portion 511. If the central transport member 526 is not provided in the filled portion 511, the state of the cross section of the filled portion 511 is the state illustrated in FIG. 21B.

The "sectional area of the filled portion 511" basically refers to the sectional area of an inner region 572 as illustrated in FIG. 21B. More specifically, the sectional area of the filled portion 511 refers to the sectional area of the inner region 572 in the imaginary plane orthogonal to the axial direction of the tubular portion 512.

The inner region 572 is a region positioned on the inner side of an inner peripheral surface 512A of the tubular portion 512 and enclosed by the inner peripheral surface 512A.

If the central transport member 526 is provided as illustrated in FIG. 21A, the sectional area of the rotation shaft 526A is taken into consideration.

If the central transport member 526 is provided, the sectional area of the rotation shaft 526A is subtracted from the area of the inner region 572 (see FIG. 21B). A value obtained by subtracting the sectional area of the rotation shaft 526A is the sectional area of the filled portion 511.

In this exemplary embodiment, the sectional area of the up-down channel 514 is larger than the sectional area of the filled portion 511 obtained as described above.

The sectional area of the up-down channel 514 (see FIG. 9B) refers to a sectional area in an imaginary plane orthogonal to the extending direction of the up-down channel 514. In this exemplary embodiment, the imaginary plane orthogonal to the extending direction of the up-down channel 514 is a horizontal plane. In this exemplary embodiment, the sectional area of the up-down channel 514 refers to a sectional area in the horizontal plane.

In other words, the sectional area of the up-down channel 514 refers to a sectional area in an imaginary plane orthogonal to the developer movement direction. The "movement direction" refers to the developer movement direction in the up-down channel 514.

In this exemplary embodiment, the up-down channel 514 extends along the vertical direction. The up-down channel 514 may be inclined from the vertical direction. The up-down channel 514 includes a channel inclined from the vertical direction.

Figure 10:
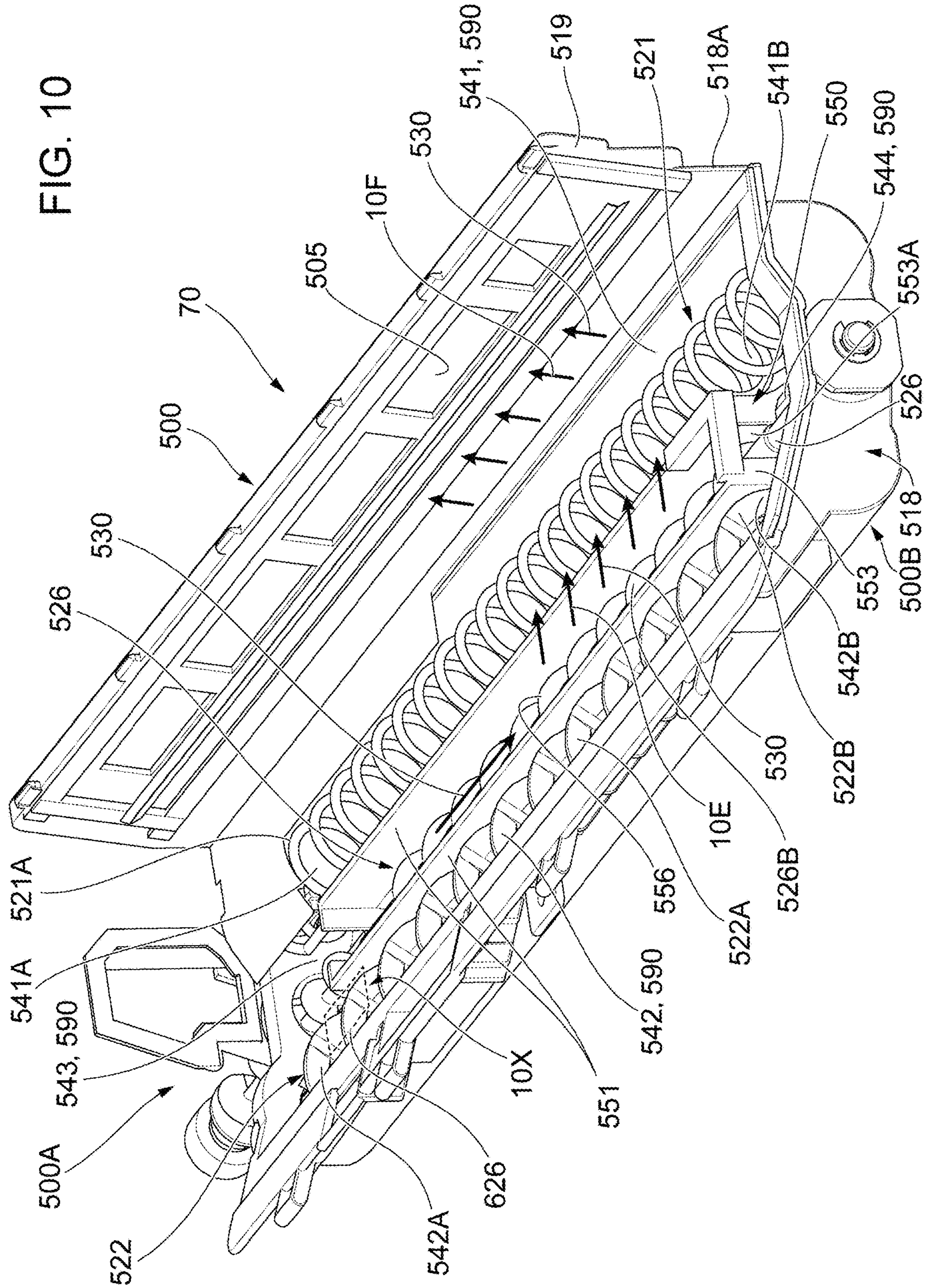
FIG. 10 is a perspective top view of the developer accumulator.
Figure 11:
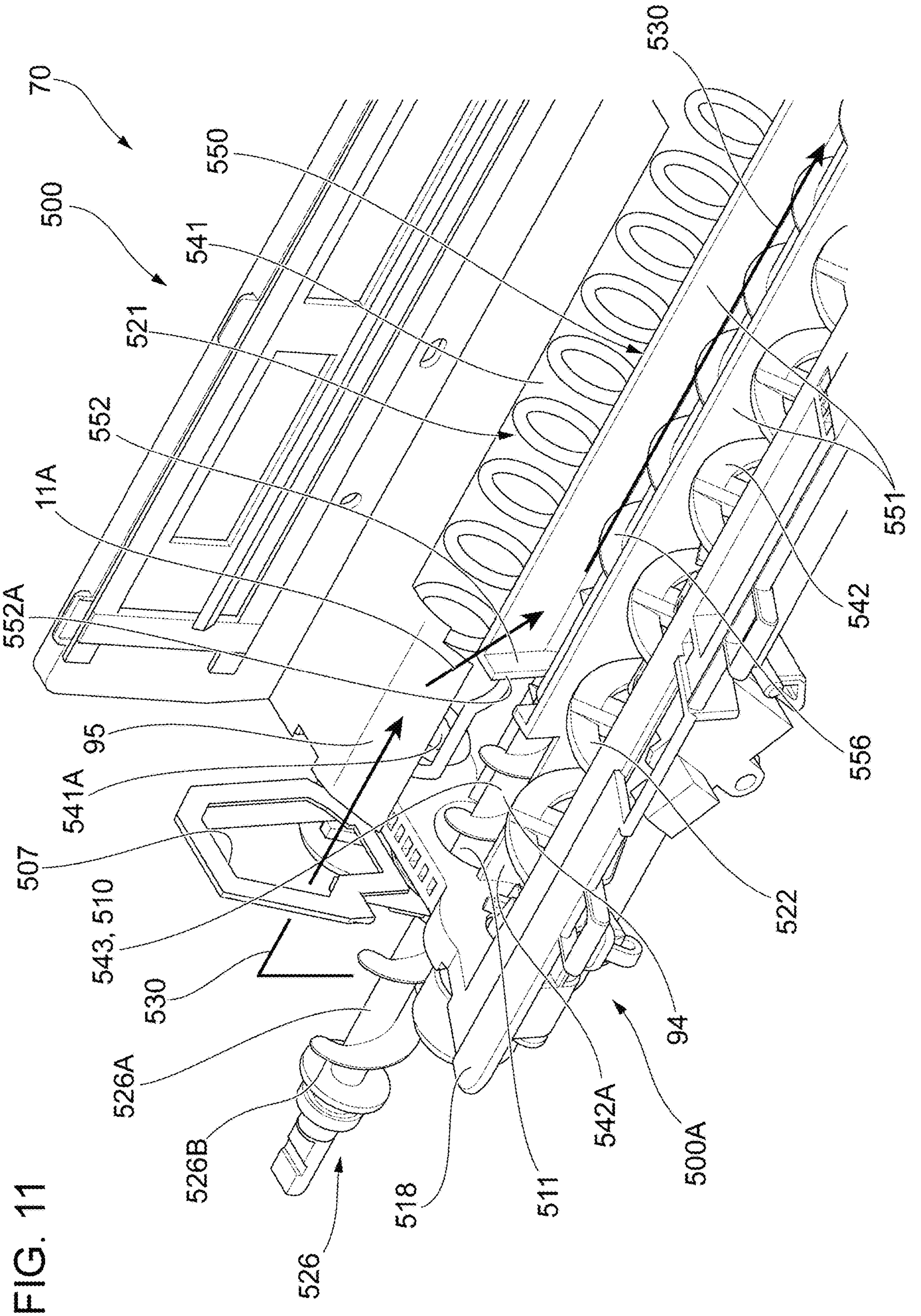
FIG. 11 is an enlarged view of a first end of the developer accumulator.

FIG. 10 is a perspective top view of the developer accumulator 500. FIG. 11 is an enlarged view of a first end 500A of the developer accumulator 500.

FIG. 10 illustrates the developer accumulator 500 that is viewed from a second end 500B of the developer accumulator 500.

As illustrated in FIG. 10, the developer accumulator 500 includes a lower container 518 having a rectangular parallelepiped shape. The developer supplied from the developer container 80 (not illustrated in FIG. 10) is first contained in the lower container 518.

The lower container 518 includes a first-direction transport member 521 that transports the developer in the first direction. The lower container 518 includes a second-direction transport member 522 that transports the developer in the second direction opposite to the first direction.

The first-direction transport member 521 and the second-direction transport member 522 are parallel to each other. The first-direction transport member 521 and the second-direction transport member 522 are provided along a longitudinal direction of the lower container 518.

A drive source (not illustrated) such as a motor is provided to drive the first-direction transport member 521. A drive source (not illustrated) such as a motor is also provided to drive the second-direction transport member 522.

The first-direction transport member 521 is made of a coil. In other words, the first-direction transport member 521 is formed by helically bending a wire rod.

The second-direction transport member 522 has a rod-shaped rotation shaft (not illustrated). The rotation shaft is provided along the longitudinal direction of the lower container 518.

The second-direction transport member 522 has protrusions 522A that protrude from the outer peripheral surface of the rotation shaft. The protrusions 522A are helically provided around the rotation shaft.

The second-direction transport member 522 may be made of a coil similarly to the first-direction transport member 521.

The first-direction transport member 521 may have a rotation shaft and helical protrusions similarly to the second-direction transport member 522.

Both the first-direction transport member 521 and the second-direction transport member 522 may be made of coils.

Both the first-direction transport member 521 and the second-direction transport member 522 may have rotation shafts and helical protrusions.

In this exemplary embodiment, the coiled first-direction transport member 521 rotates about a rotation axis along an axial direction of the first-direction transport member 521. Thus, the developer gradually moves in the axial direction of the first-direction transport member 521.

More specifically, the developer moves toward a first end 521A of the first-direction transport member 521 in the axial direction.

In this exemplary embodiment, the second-direction transport member 522 rotates about the rotation shaft.

Thus, the protrusions 522A of the second-direction transport member 522 push the developer. In response to this, the developer moves in an axial direction of the second-direction transport member 522.

More specifically, the developer moves toward a second end 522B of the second-direction transport member 522 in the axial direction.

The lower container 518 has a first-direction channel 541 through which the developer moves in the first direction.

The lower container 518 has a second-direction channel 542 through which the developer moves in the second direction opposite to the first direction.

The first-direction channel 541 and the second-direction channel 542 are parallel to each other. The first-direction channel 541 and the second-direction channel 542 are provided along the longitudinal direction of the lower container 518.

The first-direction transport member 521 is disposed in the first-direction channel 541. The developer transported by the first-direction transport member 521 moves through the first-direction channel 541.

The second-direction transport member 522 is disposed in the second-direction channel 542. The developer transported by the second-direction transport member 522 moves through the second-direction channel 542.

A first-end connection channel 543 is provided.

The first-end connection channel 543 is provided in the lower container 518 at the first end 500A of the developer accumulator 500. The first-end connection channel 543 connects a first end 541A of the first-direction channel 541 and a first end 542A of the second-direction channel 542.

A second-end connection channel 544 is provided.

The second-end connection channel 544 is provided in the lower container 518 at the second end 500B of the developer accumulator 500. The second-end connection channel 544 connects a second end 541B of the first-direction channel 541 and a second end 542B of the second-direction channel 542.

As illustrated in FIG. 10, an annular wall 550 is provided in the lower container 518.

The annular wall 550 has an annular shape when the lower container 518 is viewed from the top. The annular wall 550 has a rectangular shape when the lower container 518 is viewed from the top.

The annular wall 550 is provided between the first-direction channel 541 and the second-direction channel 542. The annular wall 550 is provided between the first-end connection channel 543 and the second-end connection channel 544.

As illustrated in FIG. 10, the annular wall 550 protrudes upward from the bottom of the lower container 518. The annular wall 550 is provided along the longitudinal direction of the lower container 518.

The first-direction channel 541 and the second-direction channel 542 are provided around the annular wall 550. The first-end connection channel 543 and the second-end connection channel 544 are also provided around the annular wall 550.

In this exemplary embodiment, the first-direction transport member 521 and the second-direction transport member 522 transport the developer. The transported developer moves through a space located around the annular wall 550 in the internal space of the lower container 518.

The transported developer passes through the first-direction channel 541 and then reaches the first-end connection channel 543. Then, the developer moves from the first-end connection channel 543 to the second-direction channel 542. Then, the developer moves to the second-end connection channel 544 through the second-direction channel 542. The developer moves to the first-direction channel 541 through the second-end connection channel 544.

The transported developer circulates along the periphery of the annular wall 550. In this exemplary embodiment, an annular circulation channel 590 along which the developer circulates is provided around the annular wall 550.

The circulation channel 590 that is an example of an annular channel is constituted by the first-direction channel 541, the first-end connection channel 543, the second-direction channel 542, and the second-end connection channel 544.

The developer transported by the first-direction transport member 521 moves toward the first end 541A of the first-direction channel 541.

The developer reaches the first end 541A. The first-direction transport member 521 sequentially transports the developer from the upstream side to the first end 541A.

The developer having reached the first end 541A is pushed by the developer transported from the upstream side. Thus, the developer having reached the first end 541A moves to the first-end connection channel 543.

The developer moves to the second-direction channel 542 through the first-end connection channel 543.

The developer having moved to the second-direction channel 542 moves toward the second end 542B of the second-direction channel 542.

The developer having moved to the second-direction channel 542 moves toward the second end 542B by the second-direction transport member 522. Thus, the developer reaches the second end 542B.

The developer having reached the second end 542B of the second-direction channel 542 moves to the second-end connection channel 544.

In this exemplary embodiment, the second-direction transport member 522 sequentially transports the developer from the upstream side to the second end 542B. The developer having reached the second end 542B is pushed by the developer sequentially transported from the upstream side to the second end 542B.

Thus, the developer enters the second-end connection channel 544. Then, the developer reaches the first-direction channel 541.

In this exemplary embodiment, the developer moves around the annular wall 550. In other words, the developer moves along the circulation channel 590. As a result, the developer circulates in this exemplary embodiment.

The annular wall 550 is constituted by four walls.

The annular wall 550 includes two axial walls 551.

The two axial walls 551 extend along the axial direction of the first-direction transport member 521. The two axial walls 551 extend along the axial direction of the second-direction transport member 522.

The two axial walls 551 face each other. The two axial walls 551 are parallel to each other.

As illustrated in FIG. 11, the annular wall 550 includes a first-end wall 552. The first-end wall 552 is positioned at the first end of the annular wall 550 in the longitudinal direction. The first-end wall 552 connects the two axial walls 551.

As illustrated in FIG. 10, the annular wall 550 includes a second-end wall 553. The second-end wall 553 is positioned at the second end of the annular wall 550 in the longitudinal direction. The second-end wall 553 connects the two axial walls 551.

As illustrated in FIG. 11, the first end 500A of the developer accumulator 500 has an opening 507 through which the gas channel 530 extends. The gas passing through the gas channel 530 from the developing device 14 passes through the opening 507.

As illustrated in FIG. 10, a wall 519 extends upward.

The wall 519 is provided above one side wall 518A extending along the longitudinal direction of the lower container 518.

The side wall 518A extending along the longitudinal direction of the lower container 518 is provided as one of the four side walls of the lower container 518. The wall 519 is provided above the side wall 518A extending along the longitudinal direction of the lower container 518.

The wall 519 extends along the longitudinal direction of the lower container 518.

The wall 519 has the opening 505 to be used for discharging the gas flowing from the developing device 14. The inside and outside of the supply device 70 communicate with each other through the opening 505.

A plurality of openings 505 is provided. The plurality of openings 505 is arranged in the longitudinal direction of the lower container 518.

Each opening 505 extends in the axial direction of the developer container 80 mounted on the mounting portion 701 (see FIG. 7).

The gas passing through the gas channel 530 (see FIG. 11) is finally discharged to the outside of the supply device 70 from the opening 505.

As illustrated in FIG. 11, an intra-wall space 556 is provided on the inner side of the annular wall 550.

In this exemplary embodiment, the gas flowing through the gas channel 530 then enters the intra-wall space 556 as indicated by an arrow 11A.

Then, the gas moves toward the second end 500B of the developer accumulator 500 (see FIG. 10) through the intra-wall space 556.

Then, the gas moves toward the first-direction channel 541 as indicated by arrows 10E in FIG. 10.

Then, the gas moves along the wall 519 as indicated by arrows 10F, and moves toward the openings 505 in the wall 519. The gas moves to the outside of the supply device 70 through the openings 505.

As illustrated in FIG. 11, the filled portion 511 is provided at the first end 500A of the developer accumulator 500.

The central transport member 526 passes through the filled portion 511. The central transport member 526 is provided at the center of the lower container 518 in a transverse direction of the lower container 518.

The central transport member 526 is disposed between the first-direction transport member 521 and the second-direction transport member 522. The central transport member 526 is provided along the longitudinal direction of the lower container 518.

A drive source (not illustrated) such as a motor is provided to drive the central transport member 526.

The central transport member 526 has the rod-shaped rotation shaft 526A and the protrusions 526B.

The protrusions 526B are helically provided around the rotation shaft 526A. The protrusions 526B protrude from the outer peripheral surface of the rotation shaft 526A.

In this exemplary embodiment, the drive source rotates the central transport member 526 about the rotation shaft 526A. Thus, the protrusions 526B push the developer, and the developer moves in the axial direction of the central transport member 526.

In this exemplary embodiment, the developer in the first-end connection channel 543 is sent to the filled portion 511 by the central transport member 526.

The developer transported by the first-direction transport member 521 stays in the first-end connection channel 543.

A space 94 (hereinafter referred to as "pre-filling space 94") is provided between the filled portion 511 and the first-end wall 552.

The first-end connection channel 543 extends through the pre-filling space 94. The developer transported by the first-direction transport member 521 stays in the pre-filling space 94.

In this exemplary embodiment, the developer staying in the pre-filling space 94 is pushed into the filled portion 511 by the central transport member 526.

Thus, the filled portion 511 is filled with the developer, and the developer is supplied downstream.

The developer having passed through the filled portion 511 moves to the lateral channel 513 (see FIG. 9B) positioned on the downstream side of the filled portion 511. Then, the developer moves to the developing device 14 through the up-down channel 514.

As illustrated in FIG. 10, the central transport member 526 is provided from the first end to the second end in the longitudinal direction of the lower container 518.

The central transport member 526 extends through the annular wall 550. In other words, the central transport member 526 is partially positioned in the intra-wall space 556.

As illustrated in FIG. 11, the first-end wall 552 of the annular wall 550 has a groove 552A. The central transport member 526 extends through the groove 552A.

The first-end wall 552 suppresses entry of the developer into the intra-wall space 556. More specifically, entry of the developer in the pre-filling space 94 into the intra-wall space 556 is suppressed.

As illustrated in FIG. 10, the second-end wall 553 of the annular wall 550 has an opening 553A. The central transport member 526 extends through the opening 553A.

In this exemplary embodiment, the second-end wall 553 suppresses entry of the developer into the intra-wall space 556. More specifically, entry of the developer in the second-end connection channel 544 into the intra-wall space 556 is suppressed.

Figure 12:
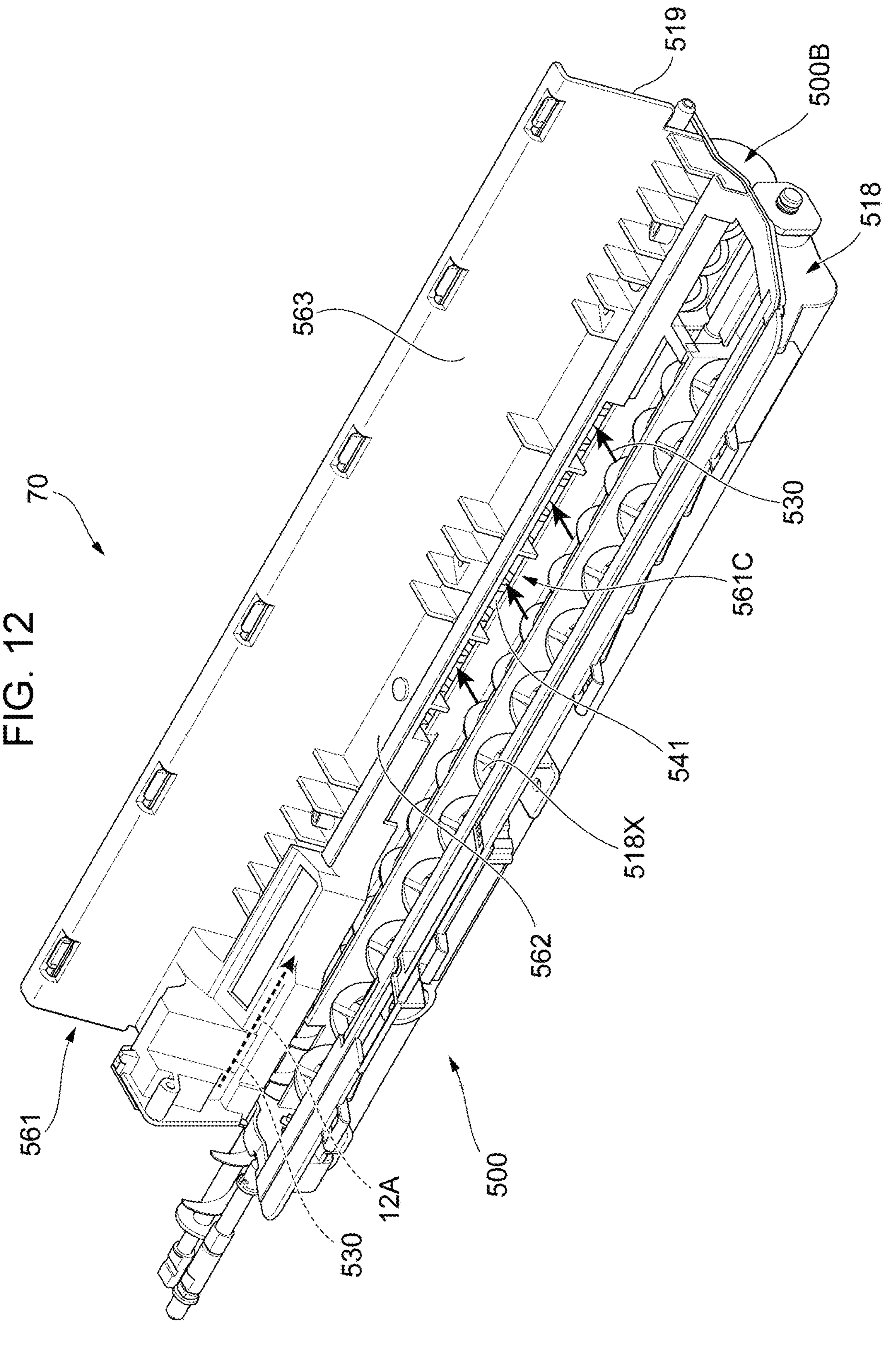
FIG. 12 illustrates an upper member attached onto a lower container.

FIG. 12 illustrates an upper member 561 attached onto the lower container 518.

In the supply device 70, the upper member 561 is attached onto the lower container 518.

The upper member 561 includes a closer 562. The closer 562 extends in the horizontal direction. The closer 562 closes part of an opening 518X above the lower container 518.

The upper member 561 includes a wall 563.

The wall 563 is connected to the closer 562. The wall 563 extends upward from the closer 562.

The wall 563 faces the wall 519 of the lower container 518. A clearance through which gas passes is provided between the wall 563 and the wall 519.

In other words, a space (described later) through which gas passes is provided between the wall 563 and the wall 519.

The gas passes through the opening 507 at the first end 500A of the developer accumulator 500 (see FIG. 11).

The gas having passed through the opening 507 moves as indicated by an arrow 12A in FIG. 12.

The gas having passed through the opening 507 passes through a clearance between the lower container 518 and the upper member 561 as indicated by the arrow 12A. The gas moves toward the second end 500B of the developer accumulator 500.

The gas channel 530 (see FIG. 11) is provided between the lower container 518 and the upper member 561 (not illustrated in FIG. 11).

The gas having passed through the opening 507 passes through the gas channel 530 positioned between the lower container 518 and the upper member 561. The gas moves toward the second end 500B of the developer accumulator 500 as indicated by the arrow 12A in FIG. 12.

Then, the gas enters the intra-wall space 556 as indicated by the arrow 11A in FIG. 11. The gas moves toward the second end 500B of the developer accumulator 500 (see FIG. 12) through the intra-wall space 556.

Then, the gas moves to the first-direction channel 541 through a recess 561C on the lower side of the upper member 561 (see FIG. 12).

The gas passes above the first-direction channel 541 and moves to the space between the wall 563 and the wall 519.

The gas moves upward through the space. Then, the gas moves to the outside of the supply device 70 through the opening 505 (see FIG. 10) in the wall 519.

Figure 13:
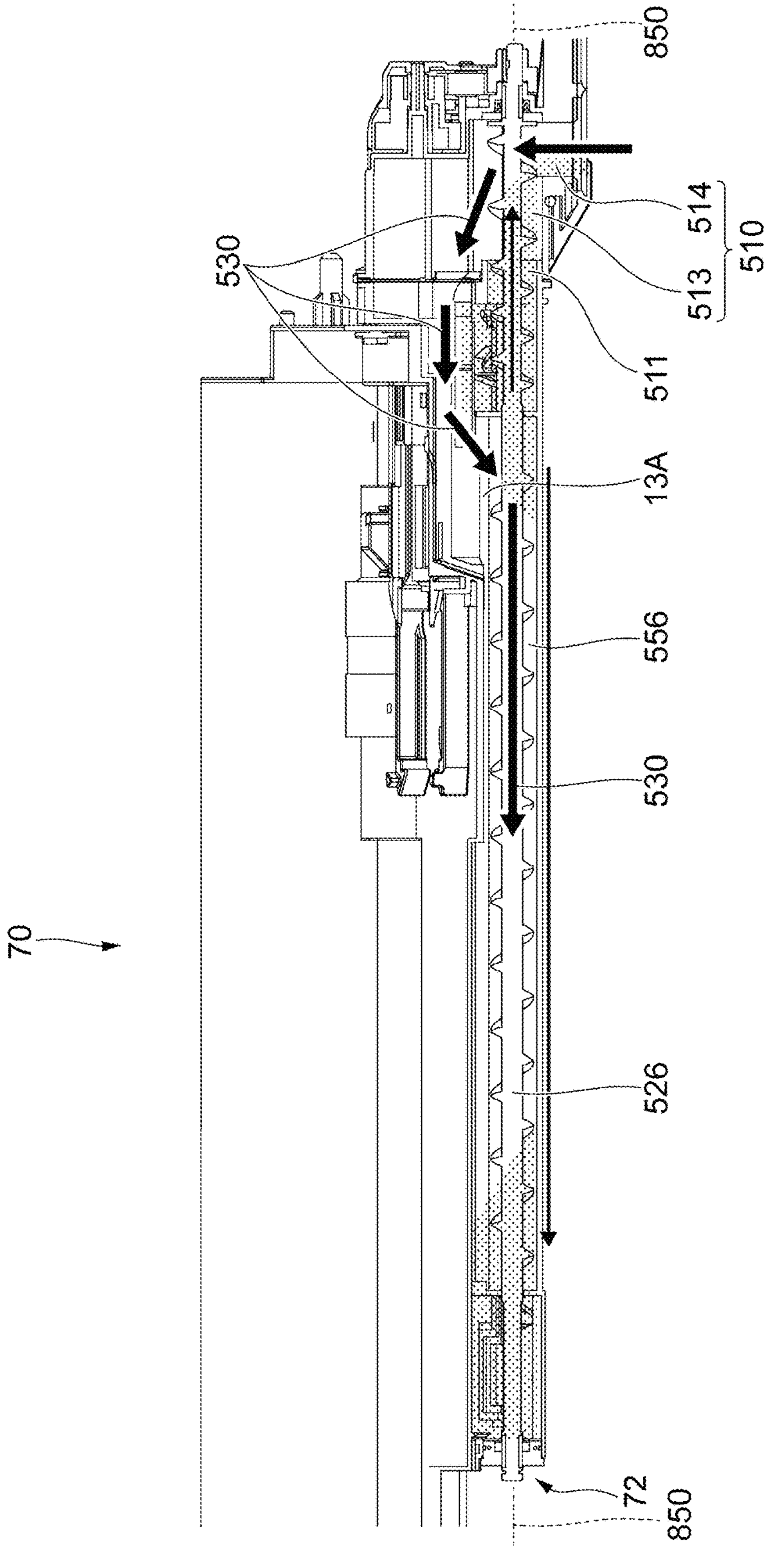
FIG. 13 is a sectional view of the supply device taken along the line XIII-XIII in FIG. 7.

FIG. 13 is a sectional view of the supply device 70 taken along the line XIII-XIII in FIG. 7. In FIG. 13, illustration is omitted for the developer container 80 illustrated in FIG. 7.

The gas flow in the supply device 70 is further described with reference to FIG. 13.

In this exemplary embodiment, the gas from the developing device 14 (not illustrated in FIG. 13) first enters the supply device 70. The gas moves upward through the up-down channel 514 that constitutes the developer channel 510.

Then, the gas moves toward the second end 72 of the supply device 70 through the gas channel 530 that branches from the developer channel 510.

The gas channel 530 is connected to the internal space of the supply device 70 again at a part 13A.

The intra-wall space 556 is present on the inner side of the annular wall 550 (not illustrated in FIG. 13) below the part 13A.

The gas channel 530 is connected to the intra-wall space 556 positioned on the inner side of the annular wall 550 at the part 13A. The intra-wall space 556 is positioned inside the supply device 70.

The gas channel 530 extends through the intra-wall space 556.

The intra-wall space 556 is not positioned on the developer channel 510. The intra-wall space 556 is positioned outside the developer channel 510.

The gas channel 530 is connected to the intra-wall space 556 that is not the developer channel 510 in the internal space of the supply device 70. The gas channel 530 extends through the intra-wall space 556.

The intra-wall space 556 may be regarded as a non-channel portion that is not the developer channel 510.

The gas channel 530 is connected to the non-channel portion that is not the developer channel 510 in the supply device 70. The gas channel 530 extends through the non-channel portion.

In this exemplary embodiment, as illustrated in FIG. 10, the circulation channel 590 is provided as part of the developer channel 510.

In this exemplary embodiment, the gas channel 530 may be connected to an enclosed space. In this exemplary embodiment, the gas channel 530 extends through the enclosed space.

The "enclosed space" refers to a space enclosed by the circulation channel 590 in the internal space of the supply device 70. In this exemplary embodiment, the intra-wall space 556 corresponds to the enclosed space.

The gas channel 530 is connected to the intra-wall space 556 that is the internal space of the supply device 70.

The circulation channel 590 is positioned in an imaginary plane 850 extending along the intersecting direction that intersects the vertical direction (see FIG. 13).

As indicated by the arrow 11A in FIG. 11, the gas channel 530 is connected to the intra-wall space 556 from above the intra-wall space 556.

The gas having entered the intra-wall space 556 moves along the longitudinal direction of the intra-wall space 556.

The gas channel 530 extends through the intra-wall space 556. The gas channel 530 extends in the longitudinal direction of the intra-wall space 556. Therefore, the gas having entered the intra-wall space 556 moves along the longitudinal direction of the intra-wall space 556.

The gas channel 530 extends to the recess 561C (see FIG. 12) through the intra-wall space 556. The gas passing through the gas channel 530 moves to the recess 561C.

The gas channel 530 extends above the first-direction channel 541 to the opening 505 (see FIG. 10). The gas channel 530 extends above the first-direction channel 541 to the opening 505 through the space between the wall 563 and the wall 519.

The gas in the intra-wall space 556 reaches the upper side of the first-direction channel 541 through the recess 561C (see FIG. 12). Then, the gas reaches the opening 505 in the wall 519 (see FIG. 10). The gas moves to the outside of the supply device 70 through the opening 505.

Figure 14:
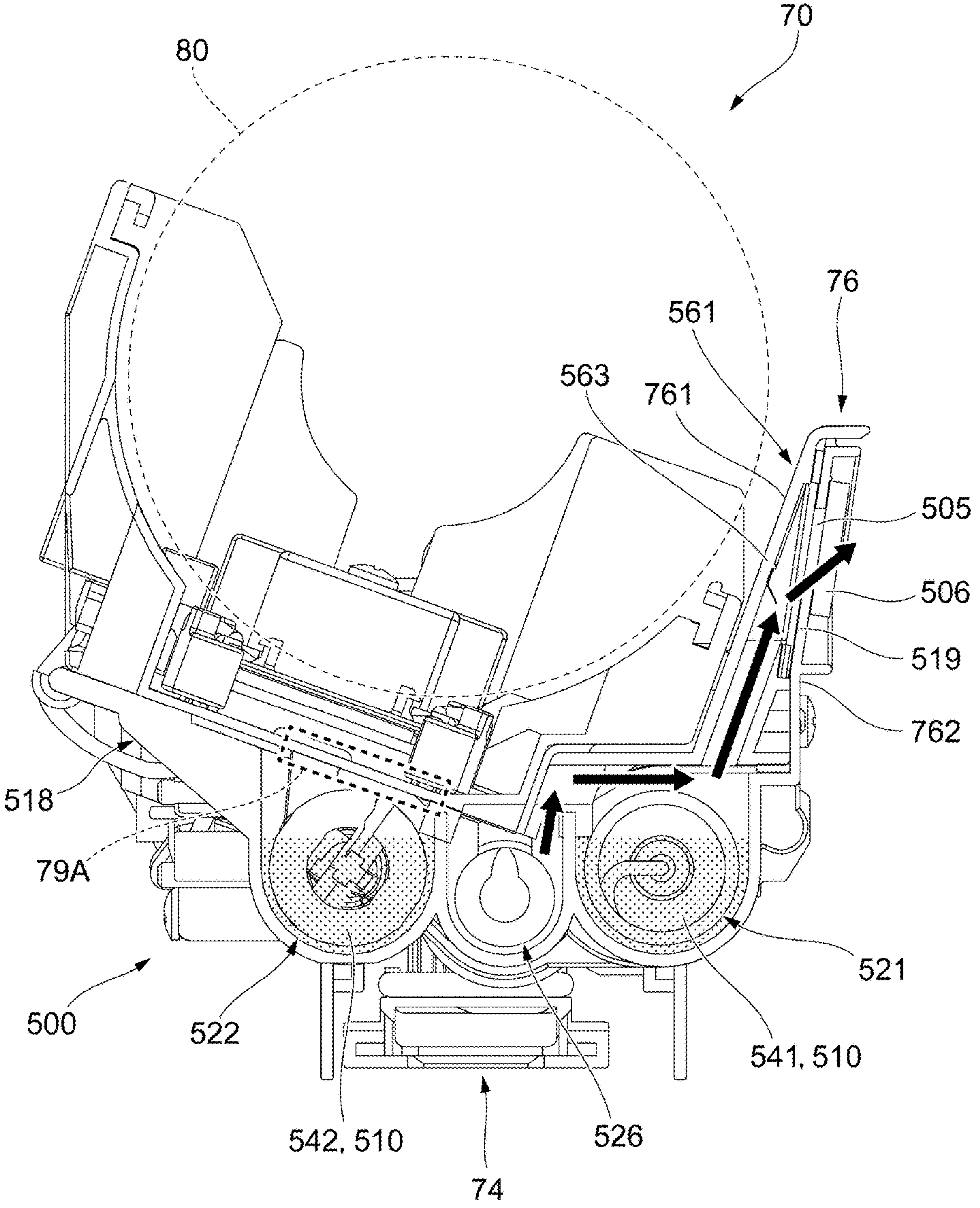
FIG. 14 is a sectional view of the supply device in a plane orthogonal to a longitudinal direction of a developer container.

FIG. 14 is a sectional view of the supply device 70 in a plane orthogonal to the longitudinal direction of the developer container 80. In FIG. 14, the developer container 80 is indicated by a broken line.

The supply device 70 includes a hollow protrusion 76 extending obliquely upward. In this exemplary embodiment, the protrusion 76 has the opening 505.

In this exemplary embodiment, the lower container 518 includes the wall 519. The upper member 561 includes the wall 563.

In this exemplary embodiment, the wall 519 and the wall 563 constitute the protrusion 76. The wall 563 and the wall 519 protrude upward. The wall 563 and the wall 519 face each other.

In this exemplary embodiment, part of the protrusion 76 extending upward is positioned on the side of the developer container 80.

The protrusion 76 has a facing surface 761 that faces the developer container 80. The protrusion 76 has an opposite surface 762 positioned opposite to the facing surface 761.

The opposite surface 762 out of the plurality of surfaces of the protrusion 76 has the opening 505. The opening 505 is oriented opposite to the side where the developer container 80 is mounted.

As described above, the filter 506 is positioned to face the opening 505.

The supply device 70 has a reception port 79A that receives the developer from the developer container 80. The supply device 70 has the discharge port 74 to be used for discharging the developer.

The opening 505 in the protrusion 76 is provided above the reception port 79A. The opening 505 is provided above the discharge port 74 that is provided below the reception port 79A.

The opening 505 is provided outside the developer channel 510. The developer channel 510 is provided in the developer accumulator 500. The opening 505 is provided outside the developer channel 510 in the developer accumulator 500.

The filled portion 511 (not illustrated in FIG. 14) constitutes the developer channel 510. The portion located on the downstream side of the filled portion 511 in the developer movement direction also constitutes the developer channel 510.

The opening 505 is provided outside the developer channel 510.

The opening 505 is provided above the topmost portions of the developer channel 510.

In this exemplary embodiment, the first-direction channel 541 is the topmost portion of the developer channel 510. The second-direction channel 542 is also the topmost portion of the developer channel 510. The filled portion 511 (not illustrated in FIG. 14) is also the topmost portion of the developer channel 510. The lateral channel 513 (not illustrated in FIG. 14) is also the topmost portion of the developer channel 510.

The opening 505 is positioned above the topmost portions of the developer channel 510.

The inside and outside of the supply device 70 communicate with each other through the opening 505 in the protrusion 76.

The supply device 70 has the opening 505 separately from the reception port 79A and the discharge port 74. The gas flowing from the developing device 14 is discharged to the outside of the supply device 70 through the opening 505.

Figure 15:
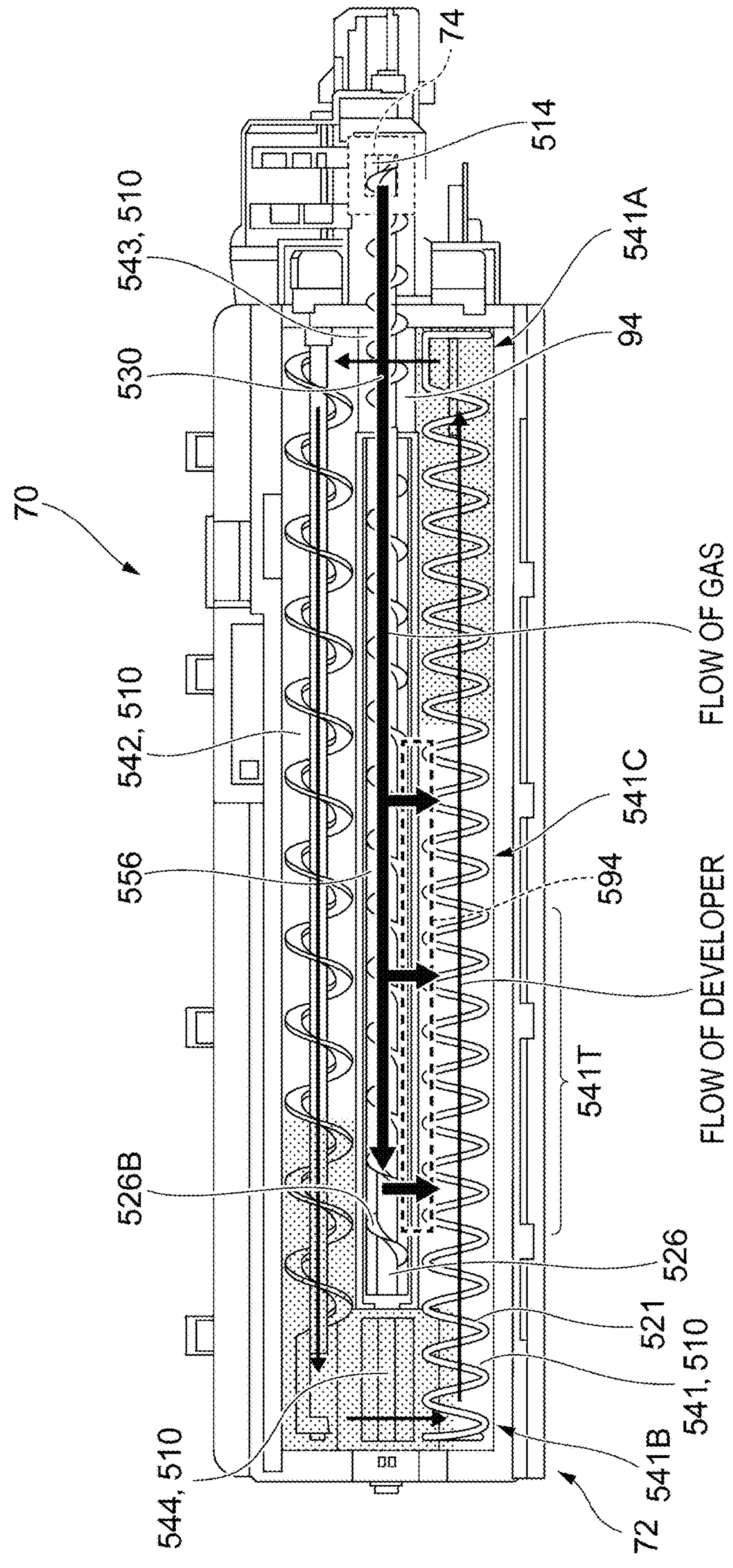
FIG. 15 illustrates a gas flow in a top vie of the supply device.

FIG. 15 illustrates the gas flow in a top vie of the supply device 70. In FIG. 15, illustration is omitted for the upper member 561 etc.

The gas flowing from the developing device 14 enters the supply device 70 through the discharge port 74 of the supply device 70. The gas having entered the supply device 70 enters the gas channel 530 through the up-down channel 514.

The gas moves to the intra-wall space 556 through the gas channel 530. The gas moves toward the second end 72 of the supply device 70 through the intra-wall space 556.

The gas channel 530 extends through the intra-wall space 556. Therefore, the gas moves toward the second end 72 of the supply device 70 through the intra-wall space 556.

In the intra-wall space 556, the developer is not transported. Therefore, the amount of the developer is small in the intra-wall space 556.

Then, the gas moves from the intra-wall space 556 to the first-direction channel 541. More specifically, the gas moves to a portion other than the first end 541A in the first-direction channel 541.

The gas moving to the first-direction channel 541 moves to a portion located on the upstream side of the first end 541A in the first-direction channel 541. The "upstream side" refers to the upstream side in the developer movement direction in the first-direction channel 541.

In this exemplary embodiment, the recess 561C is provided on the lower side of the upper member 561 as illustrated in FIG. 12.

As illustrated in FIG. 15, a connection channel 594 that constitutes the gas channel 530 is provided at the portion where the recess 561C is provided. The connection channel 594 connects the intra-wall space 556 and the first-direction channel 541.

As illustrated in FIG. 15, the connection channel 594 is connected to a center 541C of the first-direction channel 541 in the longitudinal direction.

As illustrated in FIG. 15, the connection channel 594 is also connected to a second-end region 541T of the first-direction channel 541. The second-end region 541T is positioned closer to the second end 541B than is the center 541C.

Therefore, the gas passing through the intra-wall space 556 toward the first-direction channel 541 moves to the center 541C. The gas passing through the intra-wall space 556 toward the first-direction channel 541 moves to the second-end region 541T.

Then, the gas moves to the opening 505 in the protrusion 76 through the internal space of the protrusion 76 (see FIG. 14).

The developer transported by the first-direction transport member 521 stays at the first end 541A of the first-direction channel 541 (see FIG. 15). As a result, the height of the upper surface of the developer increases at the first end 541A.

It is conceivable that the gas in the intra-wall space 556 is moved above the first end 541A to the opening 505. In this case, the gas hardly passes above the first end 541A.

When the gas passes above the center 541C and the second-end region 541T, the gas easily flows. In this case, the gas easily flows through the portions where the height of the upper surface of the developer is small.

The central transport member 526 is provided also in the intra-wall space 556.

The central transport member 526 that is an example of a movement member moves the developer staying in the intra-wall space 556.

The gas passing through the gas channel 530 is supplied into the intra-wall space 556. In this case, the developer contained in the gas stays in the intra-wall space 556.

The developer staying in the intra-wall space 556 is transported to the pre-filling space 94 by the central transport member 526. The developer in the intra-wall space 556 is discharged from the intra-wall space 556.

The central transport member 526 transports the developer in the intra-wall space 556 toward the pre-filling space 94 positioned on the developer channel 510.

The first-end wall 552 (see FIG. 11) is provided at the first end of the intra-wall space 556 in the longitudinal direction. The first-end wall 552 has the groove 552A.

The developer transported by the central transport member 526 moves to the pre-filling space 94 through the groove 552A.

The developer in the intra-wall space 556 may be transported to the side where the second-end wall 553 is provided in FIG. 10. In this case, the developer moves to the second-end connection channel 544 through the opening 553A in the second-end wall 553.

The developer in the intra-wall space 556 may be transported toward both the first-end wall 552 and the second-end wall 553.

In this case, the central transport member 526 includes two types of protrusions 526B with different turning directions.

The two types of protrusions 526B are described.

When the two types of protrusions 526B are provided, the first type of protrusions 526B are first provided. The first type of protrusions 526B turn clockwise in the axial direction of the central transport member 526 and in the first direction.

The second type of protrusions 526B are provided. The second type of protrusions 526B turn counterclockwise in the axial direction of the central transport member 526 and in the first direction.

The first type of protrusions 526B are provided near the second-end wall 553. The second type of protrusions 526B are provided near the first-end wall 552 (see FIG. 11).

In this case, the second type of protrusions 526B move the developer toward the first-end wall 552 (see FIG. 11).

The developer located at the portion where the second type of protrusions 526B are provided moves toward the first-end wall 552. Then, the developer moves to the developer channel 510.

The first type of protrusions 526B move the developer toward the second-end wall 553 (see FIG. 10). The developer located at the portion where the first type of protrusions 526B are provided moves toward the second-end wall 553. Then, the developer moves to the developer channel 510.

The central transport member 526 that is an example of the movement member moves the developer in the intra-wall space 556 to the developer channel 510. In other words, the central transport member 526 moves the developer in the gas channel 530 to the developer channel 510.

As illustrated in FIG. 13, the gas channel 530 extends above the filled portion 511 and is connected to the intra-wall space 556. The gas channel 530 extends through the intra-wall space 556.

In this case, the gas containing the developer passes through the intra-wall space 556, and the developer stays in the intra-wall space 556.

The developer staying in the intra-wall space 556 moves to the developer channel 510 by the central transport member 526.

The central transport member 526 is disposed also in the gas channel 530 as well as the developer channel 510. Thus, the developer in the gas channel 530 moves as well.

As illustrated in FIG. 11, part of the central transport member 526 is provided in the first-end connection channel 543 that constitutes the developer channel 510.

In other words, part of the central transport member 526 is provided in the pre-filling space 94 positioned on the developer channel 510.

In this exemplary embodiment, the part of the central transport member 526 moves the developer in the developer channel 510.

The central transport member 526 is provided from the intra-wall space 556 to the developer channel 510. The central transport member 526 extends to the developer channel 510.

In this exemplary embodiment, the central transport member 526 moves the developer in the developer channel 510. The central transport member 526 moves the developer in the developer channel 510 toward the filled portion 511.

In this exemplary embodiment, the single central transport member 526 moves the developers located at two positions.

In this exemplary embodiment, the single central transport member 526 moves the developer in the intra-wall space 556. The single central transport member 526 moves the developer in the pre-filling space 94.

The developer movement method is not limited thereto. For example, a dedicated movement member may be provided for movement of the developer in the intra-wall space 556. Separately from this movement member, another dedicated movement member may be provided for movement of the developer in the pre-filling space 94.

In this exemplary embodiment, as illustrated in FIG. 10, the annular circulation channel 590 is provided as part of the developer channel 510.

The gas channel 530 extends through the enclosed space that is enclosed by the circulation channel 590 in the internal space of the supply device 70. As described above, the intra-wall space 556 corresponds to the enclosed space.

The gas channel 530 extends through the portion where the intra-wall space 556 is provided. In this exemplary embodiment, the central transport member 526 is provided in the intra-wall space 556 that is an example of the enclosed space.

The central transport member 526 is further described with reference to FIG. 9B.

The central transport member 526 includes an intra-tube portion 526E positioned in the tubular portion 512. The central transport member 526 includes an external portion 526F positioned outside the tubular portion 512.

The external portion 526F is positioned on the downstream side of the intra-tube portion 526E in the developer transport direction. The external portion 526F is positioned in the lateral channel 513 that constitutes the developer channel 510.

In this exemplary embodiment, the developer transport ability of the external portion 526F is higher than the developer transport ability of the intra-tube portion 526E.

The filled portion 511 includes an upstream transporter that transports the developer toward the up-down channel 514. In this exemplary embodiment, the intra-tube portion 526E corresponds to the upstream transporter.

A downstream transporter that transports the developer having passed through the filled portion 511 toward the up-down channel 514 is provided on the downstream side of the filled portion 511. In this exemplary embodiment, the external portion 526F corresponds to the downstream transporter.

In this exemplary embodiment, the developer transport ability of the external portion 526F is higher than the developer transport ability of the intra-tube portion 526E.

In other words, in this exemplary embodiment, the developer transport ability of the downstream transporter is higher than the developer transport ability of the upstream transporter.

The intra-tube portion 526E that functions as the upstream transporter has the protrusions 526B. The external portion 526F that functions as the downstream transporter also has the protrusions 526B.

The protrusions 526B of the intra-tube portion 526E are hereinafter referred to as "internal protrusions." The protrusions 526B of the external portion 526F are hereinafter referred to as "external protrusions."

In this exemplary embodiment, comparing the outer diameters of the protrusions 526B, the outer diameter of the external protrusions is larger than the outer diameter of the internal protrusions.

Each of the intra-tube portion 526E and the external portion 526F has the rotation shaft 526A along the developer channel 510.

Each of the intra-tube portion 526E and the external portion 526F has pushers that push the developer.

The pushers of the intra-tube portion 526E are the internal protrusions. The pushers of the external portion 526F are the external protrusions.

The pushers are helically provided around the rotation shaft 526A.

Each of the intra-tube portion 526E and the external portion 526F pushes the developer using the protrusions 526B that are an example of the pushers. The developer is transported by the pushing.

An arrangement pitch of the internal protrusions of the intra-tube portion 526E is referred to as "arrangement pitch P1." An arrangement pitch of the external protrusions of the external portion 526F is referred to as "arrangement pitch P2."

The "arrangement pitch" herein refers to a distance between adjacent protrusions.

In this exemplary embodiment, the arrangement pitch P2 is larger than the arrangement pitch P1. More specifically, the arrangement pitch P2 is 1.1 times or more as large as the arrangement pitch P1 in this exemplary embodiment.

In this exemplary embodiment, the intra-tube portion 526E does not have two adjacent internal protrusions.

In this case, the arrangement pitch P1 is determined using the protrusion 526B located nearest on the upstream side to one internal protrusion of the intra-tube portion 526E.

In this case, the arrangement pitch P1 is a distance between the internal protrusion and the protrusion 526B located nearest on the upstream side to the internal protrusion.

In this exemplary embodiment, the arrangement pitch P2 is larger than the arrangement pitch P1.

In this case, the developer transport speed in the lateral channel 513 is higher than the developer transport speed in the tubular portion 512.

The developer transport speed in the tubular portion 512 is referred to as "internal transport speed." The developer transport speed in the lateral channel 513 is referred to as "external transport speed." In this exemplary embodiment, the external transport speed is higher than the internal transport speed.

The height of the upper surface of the developer in the tubular portion 512 is referred to as "internal height." The height of the upper surface of the developer in the lateral channel 513 is referred to as "external height."

In this exemplary embodiment, the external height is smaller than the internal height.

When the external transport speed is higher than the internal transport speed as in this exemplary embodiment, the external height is smaller than the internal height.

When the external height is smaller than the internal height, the height of the upper surface of the developer decreases compared with the case where the external height is not smaller than the internal height. Specifically, the height of the upper surface of the developer decreases at the portion where the external portion 526F is provided.

When the external height is smaller than the internal height, the area of the developer decreases compared with the case where the external height is not smaller than the internal height. Specifically, the area of the developer in the cross section of the up-down channel 514 decreases.

The structure around the gas channel 530 is further described with reference to FIG. 9B.

The gas channel 530 has an upstream end 530C at the right end in FIG. 9B. The upstream end 530C is located on the most upstream side in the gas movement direction in the gas channel 530.

The up-down channel 514 has an upstream end 514D and a downstream end 514C.

The position of the upstream end 514D differs from the position of the downstream end 514C. The upstream end 514D and the downstream end 514C positionally differ from each other in the gas movement direction in the gas channel 530.

The upstream end 514D and the downstream end 514C positionally differ from each other in the radial direction of the up-down channel 514.

The upstream end 530C is located on the upstream side of the downstream end 514C in the gas movement direction in the gas channel 530.

The position of the upstream end 530C of the gas channel 530 is compared with the position of the downstream end 514C of the up-down channel 514.

In this exemplary embodiment, the upstream end 530C is located on the upstream side of the downstream end 514C. The upstream end 530C is located on the upstream side of the downstream end 514C in the gas movement direction in the gas channel 530.

In FIG. 9B, the gas movement direction in the gas channel 530 is a direction from right to left in FIG. 9B.

For example, it is assumed that the upstream end 530C of the gas channel 530 is located at a part 9X. That is, it is assumed that the upstream end 530C is located on the downstream side of the downstream end 514C of the up-down channel 514.

In this case, the gas flow channel is narrow and the gas hardly flows.

When the upstream end 530C is located on the upstream side of the downstream end 514C, the gas flow channel is wide. In this case, the gas flows more easily.

In the above example, the intra-tube portion 526E and the external portion 526F are defined by the single common member.

Specifically, the intra-tube portion 526E and the external portion 526F are defined by the single central transport member 526.

The intra-tube portion 526E and the external portion 526F may be provided separately. A member serving as the intra-tube portion 526E and a member serving as the external portion 526F may be provided separately.

The arrangement pitch P1 of the protrusions 526B of the intra-tube portion 526E is compared with a dimension 9L of an inlet 514E. In other words, the arrangement pitch P1 of the internal protrusions is compared with the dimension 9L of the inlet 514E.

The "inlet 514E" refers to an inlet of the up-down channel 514. The "dimension 9L of the inlet 514E" refers to a dimension in the developer movement direction when the developer from the filled portion 511 reaches the inlet 514E.

In this exemplary embodiment, the dimension 9L of the inlet 514E is larger than the arrangement pitch P1 of the internal protrusions.

In this exemplary embodiment, the dimension 9L of the inlet 514E is 1.1 times or more as large as the arrangement pitch P1 of the internal protrusions.

In this exemplary embodiment, the separation distance between the downstream end 514C and the upstream end 514D is equal to the dimension 9L.

As described above, the space 571 is present between the filled portion 511 and the up-down channel 514 that is an example of a falling channel. The space 571 is located between the filled portion 511 and the up-down channel 514 in the intersecting direction that intersects the vertical direction.

In this exemplary embodiment, both the developer and the gas pass through the space 571.

The developer moving from the filled portion 511 toward the up-down channel 514 passes through the space 571. The gas moving from the up-down channel 514 toward the filled portion 511 also passes through the space 571.

The sectional area of the space 571 in the plane 9H along the vertical direction is referred to as "sectional area S1."

The sectional area S1 is larger than the sectional area of the filled portion 511. The sectional area S1 of the space is also larger than the sectional area of the up-down channel 514.

The sectional area S1 of the space is larger than a value obtained by adding together the sectional area of the filled portion 511 and the sectional area of the up-down channel 514.

Figure 16:
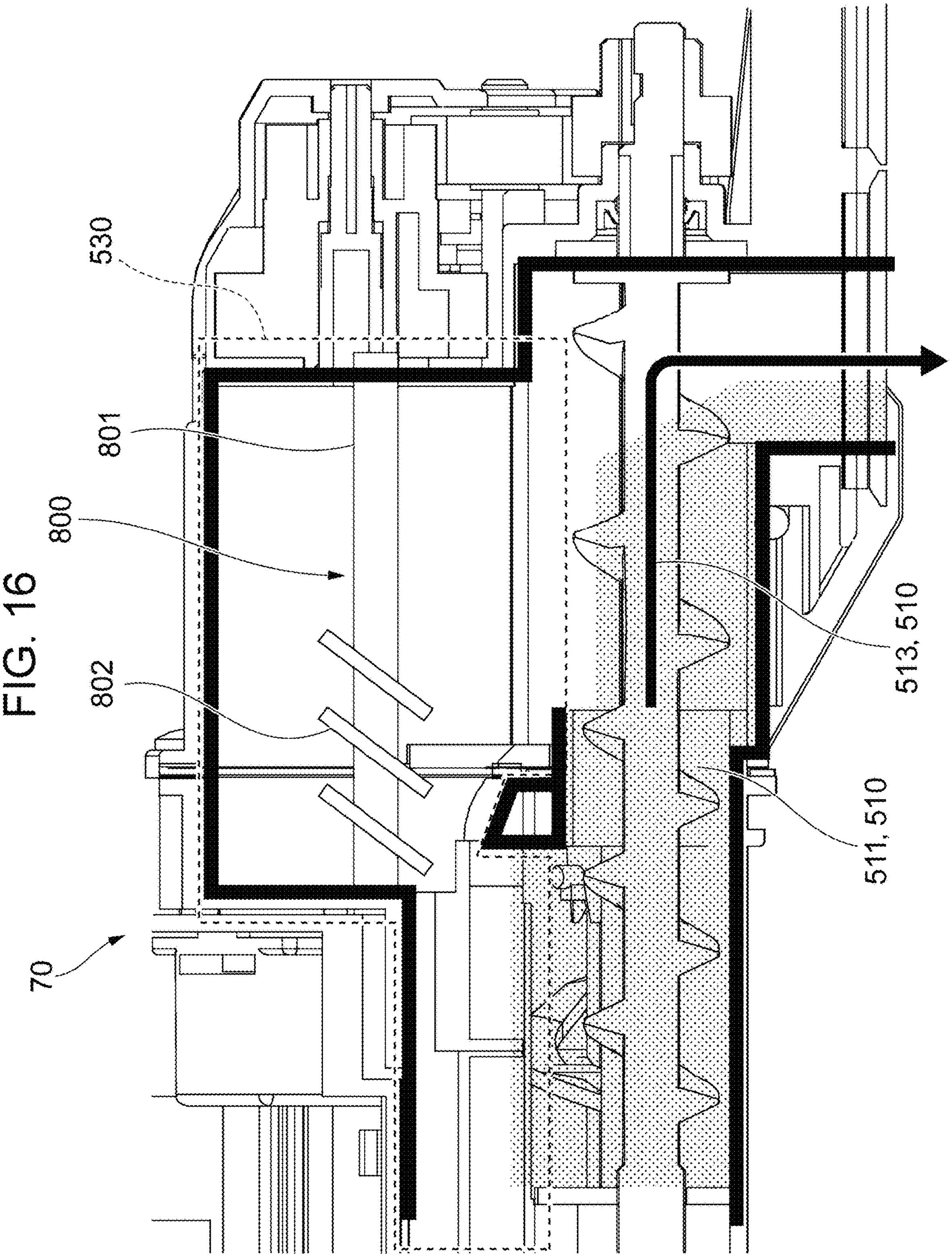
FIG. 16 illustrates another structural example of the supply device.

FIG. 16 illustrates another structural example of the supply device 70.

In the structural example illustrated in FIG. 16, a movement member 800 is provided to move the developer staying in the gas channel 530.

As illustrated in FIG. 16, in this exemplary embodiment, part of the gas channel 530 is located above the filled portion 511 and the lateral channel 513. The gas channel 530 includes an upper portion located above the filled portion 511 and the lateral channel 513.

The movement member 800 moves the developer staying in the upper portion of the gas channel 530.

The movement member 800 is provided in the upper portion of the gas channel 530.

The movement member 800 has a rotation shaft 801 to be rotated by a drive source (not illustrated) such as a motor. The movement member 800 has protrusions 802. The protrusions 802 are helically provided and protrude from the outer peripheral surface of the rotation shaft 801.

The gas passing through the upper portion of the gas channel 530 contains the developer. Therefore, the developer stays in the upper portion of the gas channel 530.

In the structural example illustrated in FIG. 16, the movement member 800 rotates. Thus, the developer staying in the upper portion of the gas channel 530 moves rightward in FIG. 16. The developer moving rightward in FIG. 16 falls downward and is supplied to the lateral channel 513 located below.

The movement member 800 moves the developer in the upper portion to the lateral channel 513 that constitutes the developer channel 510.

The structure of the first end 500A of the developer accumulator 500 is further described with reference to FIG. 11 again.

A restrictor 95 is provided above the first end 541A of the first-direction channel 541. The restrictor 95 is a plate-shaped member. The restrictor 95 restricts upward movement of the developer in the first-direction channel 541.

The developer stays at the first end 541A of the first-direction channel 541. Accordingly, the height of the upper surface of the developer increases at the first end 541A and in the pre-filling space 94.

In this case, the developer is likely to enter the gas channel 530 located above the pre-filling space 94. In this case, the gas may hardly flow in the gas channel 530.

With the restrictor 95, the upper surface of the developer in the pre-filling space 94 hardly moves upward.

The restrictor 95 may be provided not only above the first end 541A of the first-direction channel 541 but also above the pre-filling space 94. In this case, the gas channel 530 is provided above the restrictor 95.

Second Exemplary Embodiment

Figure 17:
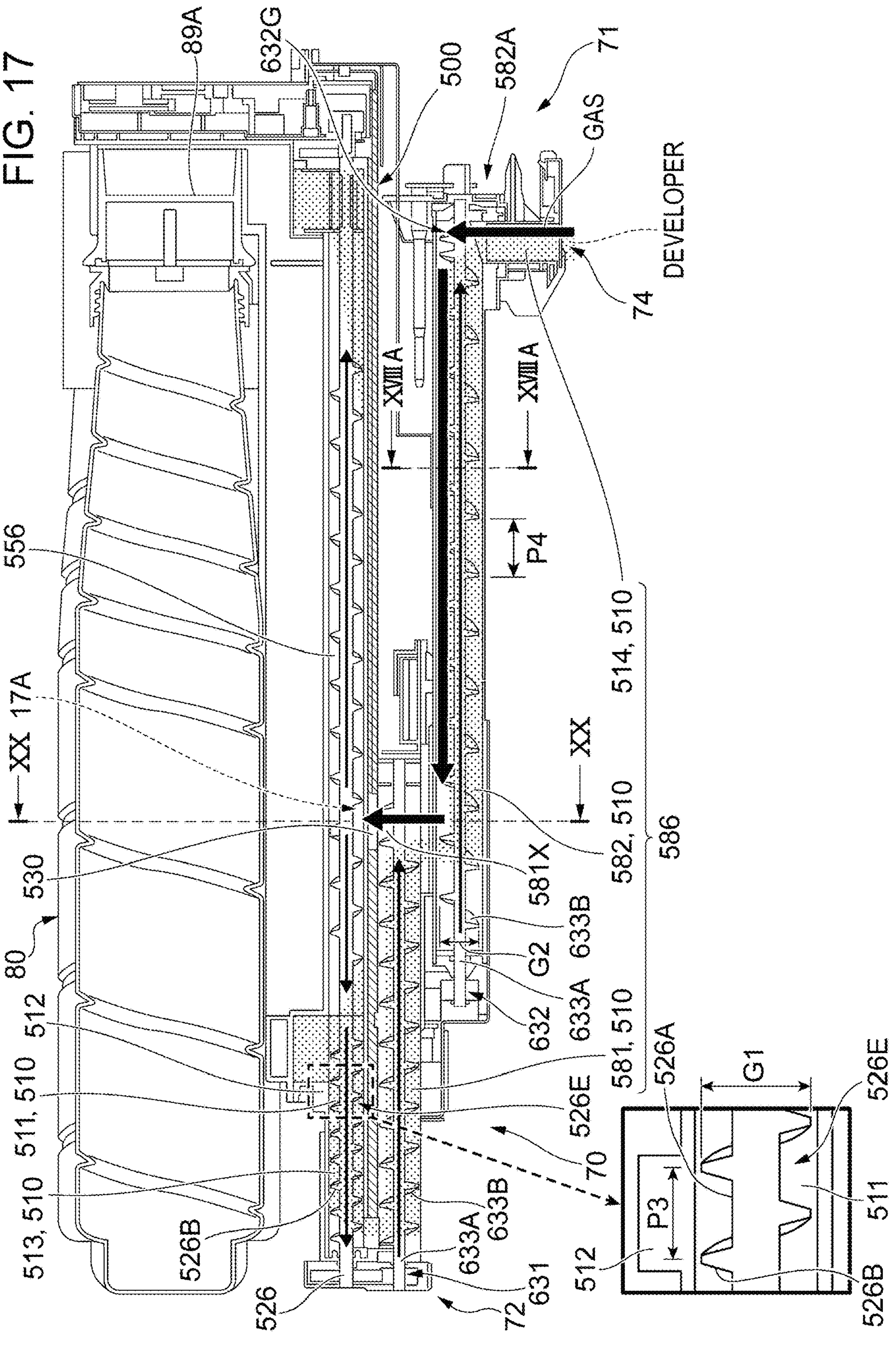
FIG. 17 illustrates a supply device of a second exemplary embodiment.

FIG. 17 illustrates a supply device 70 of a second exemplary embodiment.

Description is made about differences from the first exemplary embodiment illustrated in FIGS. 7 to 16.

In the supply device 70 illustrated in FIG. 17, the filled portion 511 is positioned near the second end 72 of the supply device 70. In other words, the filled portion 511 is positioned on the front side of the image forming apparatus 100.

In the supply device 70, an intermediate channel 581 that constitutes the developer channel 510 is provided below the developer accumulator 500.

A lower channel 582 that also constitutes the developer channel 510 is provided below the intermediate channel 581.

An intermediate transport member 631 that transports the developer in the intermediate channel 581 is provided in the intermediate channel 581. A lower transport member 632 that transports the developer in the lower channel 582 is provided in the lower channel 582.

Each of the intermediate transport member 631 and the lower transport member 632 has a rotation shaft 633A. Each of the intermediate transport member 631 and the lower transport member 632 has protrusions 633B.

The protrusions 633B are helically provided and protrude from the outer peripheral surface of the rotation shaft 633A. The protrusions 633B function as the pushers that push the developer.

The supply device 70 includes a drive source (not illustrated) for driving the intermediate transport member 631 to rotate, and a drive source (not illustrated) for driving the lower transport member 632 to rotate.

In the second exemplary embodiment, the developer having passed through the filled portion 511 moves to the lateral channel 513. Then, the developer reaches the intermediate channel 581 positioned below the developer accumulator 500. The developer moves through the intermediate channel 581 to the lower channel 582 positioned below the intermediate channel 581.

The developer moves through the lower channel 582 to a first end 582A of the lower channel 582.

Then, the developer moves to the discharge port 74 through the up-down channel 514 extending downward from the first end 582A of the lower channel 582.

In the second exemplary embodiment, the gas channel 530 is provided at a part 17A in FIG. 17.

The gas channel 530 branches from the developer channel 510 similarly to the above.

Specifically, the gas channel 530 branches from the intermediate channel 581. The gas channel 530 extends from a branch point 581X where it branches from the intermediate channel 581 toward the developer accumulator 500 positioned above the branch point 581X.

In the second exemplary embodiment, the gas channel 530 has a portion extending in the vertical direction. In other words, the gas channel 530 has a portion extending in the up-down direction.

The gas channel 530 may be inclined from the vertical direction.

Also in the second exemplary embodiment, gas enters the supply device 70 from the discharge port 74.

Then, the gas moves upstream in the developer movement direction through a downstream portion 586 of the developer channel 510.

The gas flowing from the developing device 14 to the supply device 70 moves upstream in the developer movement direction through the developer channel 510.

The "downstream portion 586" refers to a portion of the developer channel 510 that is positioned on the downstream side of the filled portion 511.

A movement direction of the developer that moves through the developer channel 510 is assumed.

The "downstream portion 586" refers to a portion positioned on the downstream side of the filled portion 511 in this movement direction.

In the second exemplary embodiment, the downstream portion 586 includes the lateral channel 513 and the intermediate channel 581. The downstream portion 586 includes the lower channel 582 and the up-down channel 514.

The gas having entered the supply device 70 from the discharge port 74 moves upstream in the developer movement direction. The gas moves upstream in the developer movement direction through the downstream portion 586.

Then, the gas moves upward by entering the gas channel 530 that branches from the downstream portion 586.

The gas channel 530 branches from the intermediate channel 581 that constitutes the downstream portion 586. The gas moves upward by entering the gas channel 530 that branches from the intermediate channel 581.

Then, the gas enters the intra-wall space 556 in the developer accumulator 500.

The gas channel 530 is connected to the intra-wall space 556 from the bottom of the intra-wall space 556 that is an example of the enclosed space. In other words, the gas channel 530 extends into the intra-wall space 556 from the bottom.

The gas channel 530 that extends into the intra-wall space 556 extends leftward in FIG. 17. The gas channel 530 that extends into the intra-wall space 556 also extends rightward in FIG. 17.

In the second exemplary embodiment, the developer transport ability of the downstream portion 586 is higher than the developer transport ability of the filled portion 511.

The central transport member 526 extending through the filled portion 511 is provided in the filled portion 511.

In the second exemplary embodiment, the developer transport ability of the intermediate transport member 631 is higher than the developer transport ability of the central transport member 526. The developer transport ability of the lower transport member 632 is higher than the developer transport ability of the central transport member 526.

The protrusions 526B of the central transport member 526 that are located in the filled portion 511 is hereinafter referred to as "internal protrusions."

In the second exemplary embodiment, the outer diameter of the protrusions 633B of the intermediate transport member 631 is larger than the outer diameter of the internal protrusions. The outer diameter of the protrusions 633B of the lower transport member 632 is larger than the outer diameter of the internal protrusions.

The arrangement pitch of the protrusions 633B of the intermediate transport member 631 is larger than the arrangement pitch of the internal protrusions. The arrangement pitch of the protrusions 633B of the lower transport member 632 is larger than the arrangement pitch of the internal protrusions.

A developer movement speed in the filled portion 511 is hereinafter referred to as "filled-portion movement speed." A developer movement speed in the downstream portion 586 is hereinafter referred to as "post-passage movement speed." In the downstream portion 586, the developer having passed through the filled portion 511 moves at the post-passage movement speed.

A developer movement speed in the intermediate channel 581 is herein referred to as "intermediate-portion movement speed." A developer movement speed in the lower channel 582 is herein referred to as "downstream-portion movement speed."

In the second exemplary embodiment, the post-passage movement speed is higher than the filled-portion movement speed.

In the second exemplary embodiment, the intermediate-portion movement speed is higher than the filled-portion movement speed. The downstream-portion movement speed is higher than the filled-portion movement speed.

In the second exemplary embodiment, the height of the upper surface of the developer decreases in the downstream portion 586. The downstream portion 586 is not filled with the developer over the entire cross section of the downstream portion 586.

In the second exemplary embodiment, the transport ability of the lower transport member 632 is higher than the transport ability of the intermediate transport member 631.

The outer diameter of the protrusions 633B of the lower transport member 632 is compared with the outer diameter of the protrusions 633B of the intermediate transport member 631.

In the second exemplary embodiment, the outer diameter of the protrusions 633B of the lower transport member 632 is larger than the outer diameter of the protrusions 633B of the intermediate transport member 631.

The arrangement pitch of the protrusions 633B of the lower transport member 632 is compared with the arrangement pitch of the protrusions 633B of the intermediate transport member 631.

In the second exemplary embodiment, the arrangement pitch of the lower transport member 632 is larger than the arrangement pitch of the intermediate transport member 631.

In this case, the downstream-portion movement speed is higher than the intermediate-portion movement speed. In this case, the height of the upper surface of the developer further decreases in the lower channel 582.

In the second exemplary embodiment, the developer movement speed in the lower channel 582 is higher than the developer movement speed in the intermediate channel 581. The developer movement speed in the intermediate channel 581 is higher than the developer movement speed in the filled portion 511.

The numbers of rotations of the intermediate transport member 631 and the lower transport member 632 may be larger than the number of rotations of the central transport member 526.

The number of rotations of the lower transport member 632 may be larger than the number of rotations of the intermediate transport member 631.

The following first and second settings may be made.

First setting: the number of rotations of the lower transport member 632 is larger than the number of rotations of the intermediate transport member 631.

Second setting: the number of rotations of the intermediate transport member 631 is larger than the number of rotations of the central transport member 526

In the second exemplary embodiment, the gas having entered the supply device 70 moves upstream in the developer movement direction through the developer channel 510. Then, the gas enters the gas channel 530 that branches from the developer channel 510.

More specifically, the gas having entered the supply device 70 moves upstream in the developer movement direction through the downstream portion 586. The gas enters the gas channel 530 that branches from the downstream portion 586.

Then, the gas passes through the intra-wall space 556 and above the first-direction channel 541 (not illustrated in FIG. 17) similarly to the above. The gas passes through the internal space of the protrusion 76 (not illustrated in FIG. 17). The gas reaches the opening 505 (not illustrated in FIG. 17) and is discharged to the outside of the supply device 70.

The supply device 70 includes a transporter that transports downstream the developer in the developer channel 510.

The intra-tube portion 526E that is an example of the upstream transporter is provided as part of the transporter. As described above, the intra-tube portion 526E refers to a portion of the central transport member 526 that is positioned in the tubular portion 512.

The lower transport member 632 that is an example of the downstream transporter is provided as another part of the transporter.

The intra-tube portion 526E is positioned on the upstream side in the developer transport direction. The lower transport member 632 is positioned on the downstream side of the intra-tube portion 526E in the developer transport direction.

The developer transport ability of the intra-tube portion 526E and the developer transport ability of the lower transport member 632 are described.

A developer transport speed of the intra-tube portion 526E is hereinafter referred to as "upstream transport speed." A developer transport speed of the lower transport member 632 is hereinafter referred to as "downstream transport speed."

In this exemplary embodiment, the developer transport ability of the lower transport member 632 is higher than the developer transport ability of the intra-tube portion 526E. In other words, the downstream transport speed is higher than the upstream transport speed in this exemplary embodiment.

Each of the intra-tube portion 526E and the lower transport member 632 transports the developer by rotating about the rotation shaft along the developer channel 510.

In this exemplary embodiment, the rotational speed of the lower transport member 632 is higher than the rotational speed of the intra-tube portion 526E. Thus, the downstream transport speed is higher than the upstream transport speed in this exemplary embodiment.

The intra-tube portion 526E has the rotation shaft 526A. The intra-tube portion 526E has the rotation shaft 526A positioned in the filled portion 511 as the rotation shaft along the developer channel 510.

The rotation shaft 526A positioned in the filled portion 511 is provided along the filled portion 511. The intra-tube portion 526E has the helical protrusions 526B provided around the rotation shaft 526A.

The intra-tube portion 526E transports the developer by pushing the developer using the protrusions 526B that are an example of the pushers. The intra-tube portion 526E transports the developer in the filled portion 511 using the protrusions 526B.

The lower transport member 632 has the rotation shaft along the developer channel 510. Specifically, the lower transport member 632 has the rotation shaft 633A along the lower channel 582.

The lower transport member 632 has the helical protrusions 633B provided around the rotation shaft 633A.

The lower transport member 632 transports the developer by pushing the developer using the protrusions 633B that are an example of the pushers.

The arrangement pitch of the protrusions 526B of the intra-tube portion 526E is referred to as "arrangement pitch P3."

The arrangement pitch of the protrusions 633B of the lower transport member 632 is referred to as "arrangement pitch P4."

In this exemplary embodiment, the arrangement pitch P4 is larger than the arrangement pitch P3.

In this exemplary embodiment, the number of rotations of the lower transport member 632 is larger than the number of rotations of the intra-tube portion 526E.

The outer diameter of the protrusions 526B of the intra-tube portion 526E is referred to as "outer diameter G1." The outer diameter of the protrusions 633B of the lower transport member 632 is referred to as "outer diameter G2."

In this exemplary embodiment, the outer diameter G2 is larger than the outer diameter G1.

As a result, the developer transport ability of the lower transport member 632 is higher in this exemplary embodiment.

The developer transport ability of the intra-tube portion 526E is referred to as "filled-portion transport ability."

In this exemplary embodiment, the developer transport ability of the lower transport member 632 is higher than the filled-portion transport ability.

In this exemplary embodiment, the developer transport ability of the lower transport member 632 is 3.4 times or more as high as the filled-portion transport ability.

In the case of 3.4 times or more, the lower channel 582 more easily has the space through which the gas passes than in the case of less than 3.4 times. In the case of 3.4 times or more in this exemplary embodiment, the area of the developer in the sectional area of the lower channel 582 is 60% or less.

The value "3.4 times or more" refers to the ratio of the amounts of the developer transported per unit time.

The amount of the developer transported per unit time by the intra-tube portion 526E is assumed as 1. In this exemplary embodiment, the amount of the developer transported per unit time by the lower transport member 632 is 3.4 or more.

In this exemplary embodiment, the branch point 581X is provided on the downstream side of the portion where the intra-tube portion 526E is provided. The downstream side refers to the downstream side in the developer transport direction.

The gas channel 530 branches from the developer channel 510 on the downstream side of the portion where the intra-tube portion 526E is provided.

In this exemplary embodiment, the gas enters the supply device 70 through the discharge port 74. The gas moves upstream in the developer transport direction through the developer channel 510. Then, the gas passes through the gas channel 530.

The lower transport member 632 has a downstream end 632G located on the downstream side in the developer transport direction. The gas channel 530 branches from the developer channel 510 on the upstream side of the downstream end 632G in the developer transport direction.

The portion where the intra-tube portion 526E is provided is filled with the developer over the entire cross section of the developer channel 510. The filled portion 511 where the intra-tube portion 526E is provided is filled with the developer.

In this exemplary embodiment, the gas channel 530 branches from the developer channel 510 on the downstream side of the portion where the intra-tube portion 526E is provided.

In this case, the gas having entered the supply device 70 bypasses the filled portion 511 where the gas hardly passes.

In the above description, the members serving as the upstream transporter and the downstream transporter differ from each other. The member serving as the intra-tube portion 526E that is the upstream transporter is the central transport member 526. The member serving as the downstream transporter is the lower transport member 632.

In this exemplary embodiment, the central transport member 526 and the lower transport member 632 are different members.

A single member may serve as the upstream transporter and the downstream transporter.

The downstream transporter may be provided at a portion extending from the upstream transporter. In this case, a single member may serve as the upstream transporter and the downstream transporter.

In the case of a single member, the arrangement pitch of the protrusions of the downstream transporter is set larger than the arrangement pitch of the protrusions of the upstream transporter, and/or the outer diameter of the protrusions of the downstream transporter is set larger than the outer diameter of the protrusions of the upstream transporter.

In this case, the developer transport ability of the downstream transporter increases.

Also in the first exemplary embodiment illustrated in FIG. 9B, the upstream transporter and the downstream transporter are provided. In the first exemplary embodiment, the single member serves as the upstream transporter and the downstream transporter.

In the first exemplary embodiment illustrated in FIG. 9B, the intra-tube portion 526E corresponds to the upstream transporter. The external portion 526F corresponds to the downstream transporter.

Also in the first exemplary embodiment illustrated in FIG. 9B, the developer transport ability of the downstream transporter is higher than the developer transport ability of the upstream transporter.

In the first exemplary embodiment illustrated in FIG. 9B, the single member serves as the upstream transporter and the downstream transporter.

In the first exemplary embodiment illustrated in FIG. 9B, the central transport member 526 is provided as the single member.

Part of the central transport member 526 is the intra-tube portion 526E that functions as the upstream transporter. Another part of the central transport member 526 is the external portion 526F that functions as the downstream transporter.

In the second exemplary embodiment illustrated in FIG. 17, the downstream portion 586 is provided as described above. As described above, the downstream portion 586 refers to the portion of the developer channel 510 that is positioned on the downstream side of the filled portion 511.

Also in the first exemplary embodiment illustrated in FIG. 9B, the downstream portion 586 is provided.

Also in the first exemplary embodiment, the gas passes through the downstream portion 586. The gas moves upstream in the developer movement direction through the downstream portion 586.

Also in the first exemplary embodiment, as described above, the gas first enters the supply device 70 from the discharge port 74 of the supply device 70. The gas moves upstream in the developer movement direction through the downstream portion 586.

In the first exemplary embodiment illustrated in FIG. 9B, the downstream portion 586 includes the lateral channel 513 and the up-down channel 514.

Also in the first exemplary embodiment illustrated in FIG. 9B, the gas having entered the supply device 70 from the discharge port 74 passes through the downstream portion 586. The gas moves upstream in the developer movement direction through the downstream portion 586.

The gas enters the gas channel 530 that branches from the downstream portion 586, and moves leftward in FIG. 9B.

As described above, the gas reaches the intra-wall space 556 (not illustrated in FIG. 9B). Then, the gas reaches the first-direction channel 541, and then reaches the internal space of the protrusion 76. Then, the gas moves to the opening 505.

In the first exemplary embodiment, the single member serves as the upstream transporter and the downstream transporter as described above. In the first exemplary embodiment, the upstream transporter is the intra-tube portion 526E. The downstream transporter is the external portion 526F.

In the first exemplary embodiment, the arrangement pitch P2 is larger than the arrangement pitch P1 as described above.

The arrangement pitch P1 is the arrangement pitch of the internal protrusions of the intra-tube portion 526E. The arrangement pitch P2 is the arrangement pitch of the external protrusions of the external portion 526F.

Also in the first exemplary embodiment, the transport ability of the downstream transporter is higher than the transport ability of the upstream transporter.

The first exemplary embodiment illustrated in FIG. 9B is further described.

The developer transport ability of the portion of the central transport member 526 that is positioned in the filled portion 511 is hereinafter referred to as "filled-portion transport ability." In other words, the developer transport ability of the intra-tube portion 526E is referred to as "filled-portion transport ability."

The developer transport ability of the portion of the central transport member 526 that is positioned in the downstream portion 586 is referred to as "post-passage transport ability." In other words, the developer transport ability of the external portion 526F is referred to as "post-passage transport ability."

In the first exemplary embodiment, the post-passage transport ability is higher than the filled-portion transport ability.

In the first exemplary embodiment, the post-passage movement speed is higher than the filled-portion movement speed.

In this case, the height of the upper surface of the developer decreases in the lateral channel 513 that constitutes the downstream portion 586.

In this case, the sectional area of the gas channel 530 positioned above the lateral channel 513 increases.

The lateral channel 513 that constitutes the downstream portion 586 is not filled with the developer over the entire cross section of the lateral channel 513.

When the post-passage transport ability is higher than the filled-portion transport ability, the area of the developer in the cross section of the up-down channel 514 decreases.

Figure 18A:
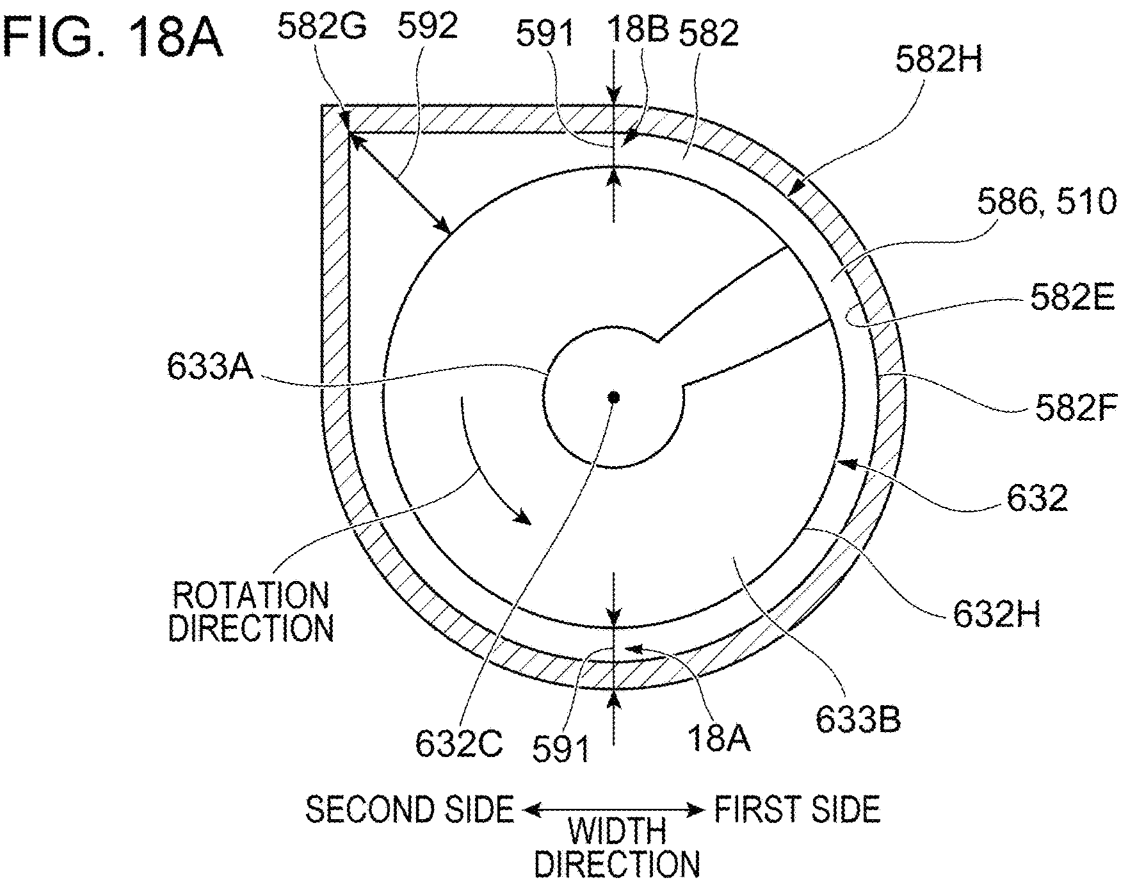
FIGS. 18A and 18B illustrate a lower channel.
Figure 18B:
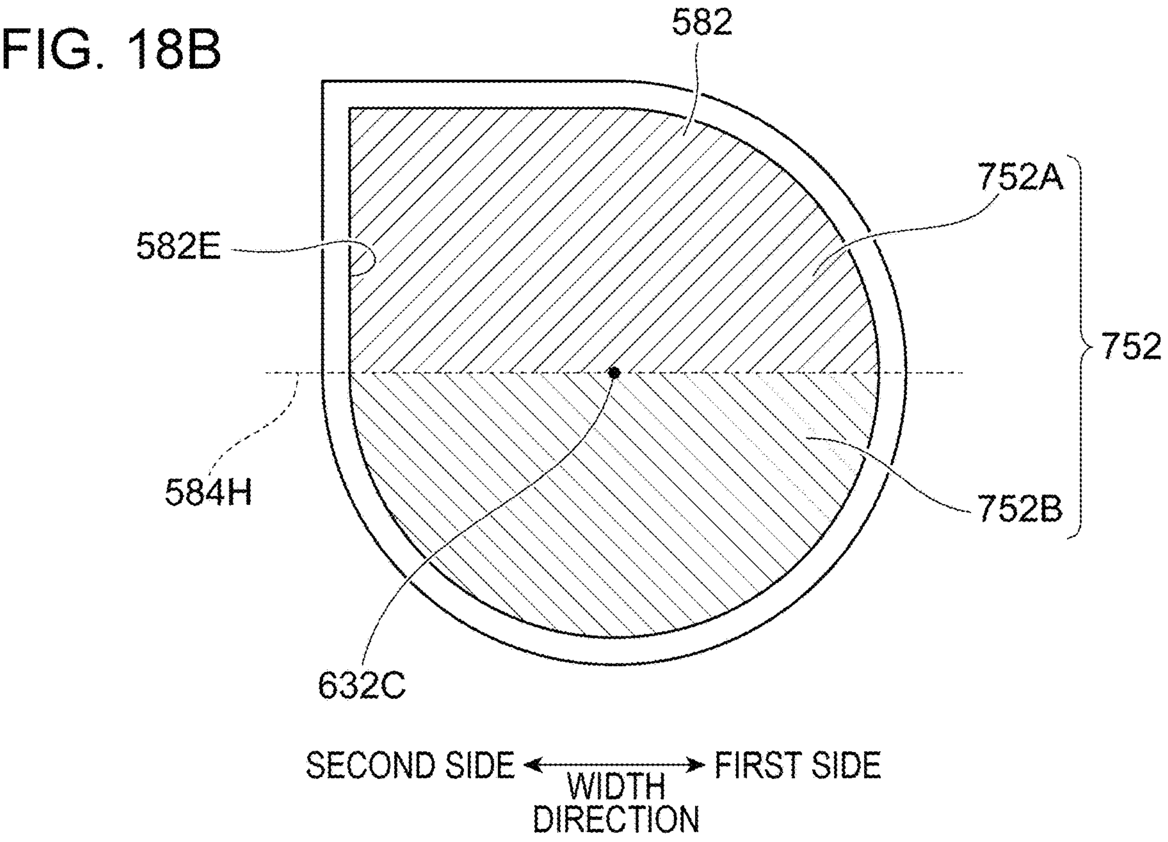

FIGS. 18A and 18B illustrate the lower channel 582.

FIG. 18A illustrates the cross section of the lower channel 582 taken along the line XVIIIA-XVIIIA in FIG. 17. In other words, FIG. 18A illustrates the cross section of the downstream portion 586 of the developer channel 510.

FIG. 18B illustrates the cross section of the lower channel 582 without illustration of the lower transport member 632.

As illustrated in FIG. 18A, the lower transport member 632 that is another example of the movement member is provided in the lower channel 582.

The lower transport member 632 rotates about the rotation shaft 633A along the lower channel 582. Thus, the developer in the lower channel 582 moves downstream.

In this exemplary embodiment, the lower channel 582 has a non-circular sectional shape as illustrated in FIG. 18.

As illustrated in FIG. 17, the lower channel 582 extends in the lateral direction. In other words, the lower channel 582 extends in the horizontal direction. In other words, the lower channel 582 extends in a direction that intersects the vertical direction.

The cross section of the lower channel 582 extending in the lateral direction is as illustrated in FIG. 18A.

In this exemplary embodiment, an upper left portion 582G protrudes away from the rotation shaft 633A of the lower transport member 632. The upper left portion 582G is positioned at the upper left in FIG. 18A on an outer peripheral edge 582F of the lower channel 582.

The protruding portion is not limited to the upper left portion 582G positioned at the upper left on the outer peripheral edge 582F of the lower channel 582. An upper right portion 582H positioned at the upper right may protrude away from the rotation shaft 633A.

Both the upper left portion 582G and the upper right portion 582H may protrude. In other words, the two portions may protrude away from the rotation shaft 633A of the lower transport member 632.

The sectional shape of the lower channel 582 may be a U-shape. In this case, both the upper left portion 582G and the upper right portion 582H protrude.

FIG. 18B illustrates the cross section of the lower channel 582 without illustration of the lower transport member 632.

In the cross section of the lower channel 582, an inner region 752 is present on the inner side of an inner peripheral surface 582E of the lower channel 582. The inner region 752 is located on the inner side of the inner peripheral surface 582E of the lower channel 582, and is enclosed by the inner peripheral surface 582E.

A horizontal line 584H extending along the cross section of the lower channel 582 through a rotational center 632C of the lower transport member 632 is assumed.

The horizontal line 584H extends along a direction orthogonal to the extending direction of the lower channel 582. The horizontal line 584H extends along the radial direction of the lower channel 582.

An upper portion 752A of the inner region 752 that is located above the horizontal line 584H is assumed. A lower portion 752B of the inner region 752 that is located below the horizontal line 584H is assumed.

In this exemplary embodiment, the area of the upper portion 752A is larger than the area of the lower portion 752B.

In the cross section of the lower channel 582, part of the inner peripheral surface 582E of the lower channel 582 protrudes away from the rotational center 632C. Specifically, part of the inner peripheral surface 582E that is located above the horizontal line 584H protrudes.

In this exemplary embodiment, the upper left portion 582G protrudes away from the rotational center 632C. At the position of the upper left portion 582G, part of the inner peripheral surface 582E protrudes away from the rotational center 632C.

In this exemplary embodiment, the area of the upper portion 752A is larger than the area of the lower portion 752B because of the protrusion of part of the inner peripheral surface 582E.

Figure 22:
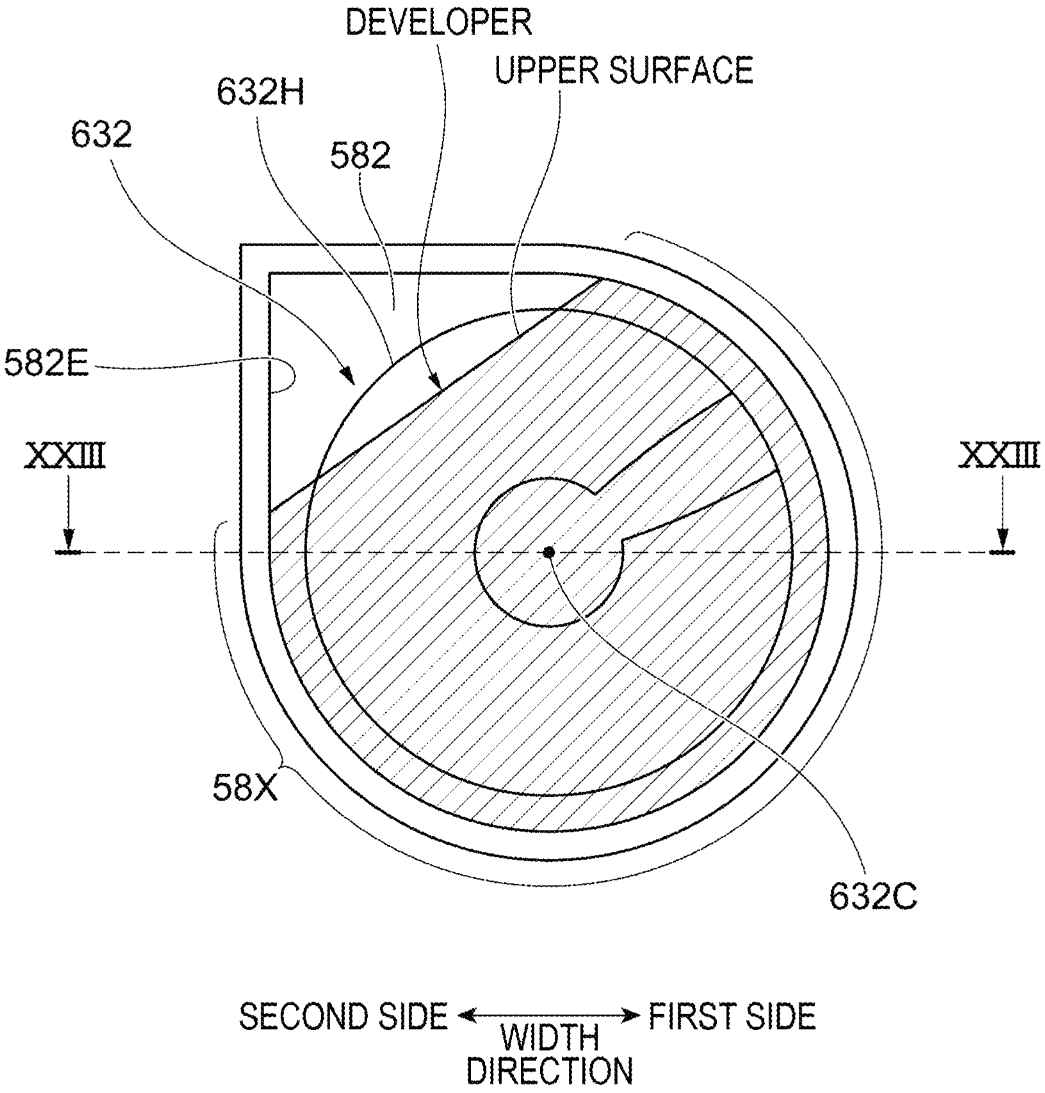
FIG. 22 illustrates how a developer is transported in the lower channel.

FIG. 22 illustrates how the developer is transported in the lower channel 582.

In the lower channel 582, the developer is transported while gathering on one side in a width direction of the lower channel 582. The width direction of the lower channel 582 is a direction orthogonal to the extending direction of the lower channel 582, and is synonymous with a direction parallel to the horizontal direction.

In this exemplary embodiment, the developer is transported while gathering on one side in the width direction of the lower channel 582. In this case, the upper surface of the developer is inclined in the cross section of the lower channel 582.

Figure 23:
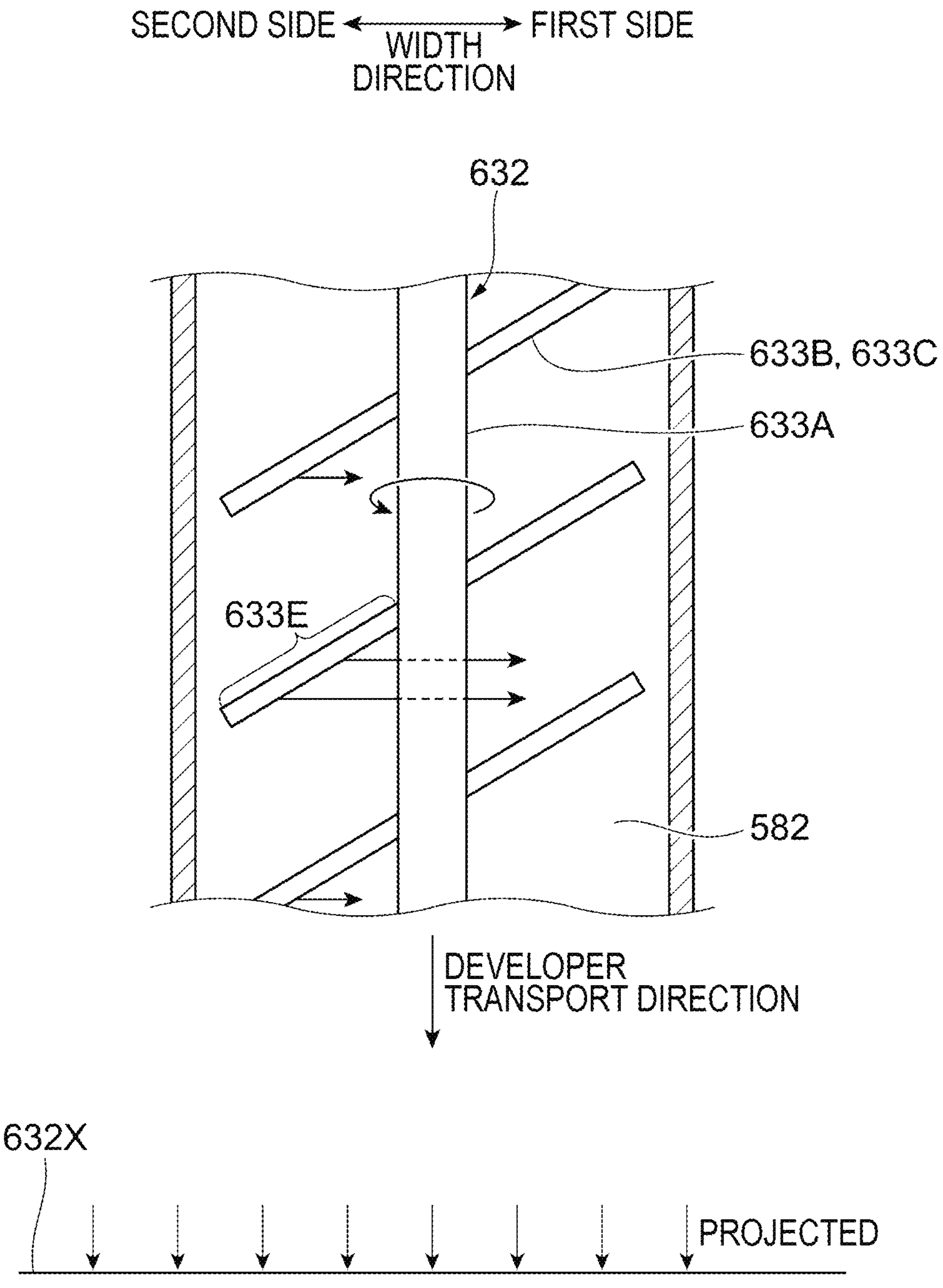
FIG. 23 is a sectional view of the lower channel taken along the line XXIII-XXIII in FIG. 22.

FIG. 23 is a sectional view of the lower channel 582 taken along the line XXIII-XXIII in FIG. 22.

FIG. 23 illustrates portions of the protrusions 633B of the lower transport member 632 that are located below the rotation shaft 633A. The portions of the protrusions 633B that are located below the rotation shaft 633A are hereinafter referred to as "lower portions 633C."

The lower portion 633C is inclined from the axial direction of the lower transport member 632 and the radial direction of the lower transport member 632.

The lower portion 633C is inclined downstream in the developer transport direction to a second side.

In this exemplary embodiment, a part 633E of the lower portion 633C on the second side moves to a first side by passing below the rotation shaft 633A. In this exemplary embodiment, when the lower transport member 632 rotates, the part 633E on the second side moves to the first side.

In this case, the developer is transported while gathering on the first side in the width direction of the lower channel 582.

The description continues with reference to FIG. 18B again.

The protruding portion on the inner peripheral surface 582E of the lower channel 582 is positioned on the second side in the width direction of the lower channel 582. This portion is positioned above the horizontal line 584H.

In other words, the upper left portion 582G illustrated in FIG. 18A is positioned on the second side in the width direction of the lower channel 582. The upper left portion 582G is positioned above the horizontal line 584H.

In this exemplary embodiment, the upper left portion 582G on the second side protrudes away from the rotational center 632C.

As illustrated in FIG. 18A, a first clearance 591 and a second clearance 592 are provided.

The first clearance 591 is provided between an outer peripheral portion 632H of the lower transport member 632 and the inner peripheral surface 582E of the lower channel 582. The second clearance 592 is also provided between the outer peripheral portion 632H of the lower transport member 632 and the inner peripheral surface 582E of the lower channel 582.

As illustrated in FIG. 23, a projection plane 632X orthogonal to the axial direction of the lower transport member 632 is assumed.

It is assumed that the lower transport member 632 and the lower channel 582 are projected toward the projection plane 632X. The lower transport member 632 and the lower channel 582 are projected toward the projection plane 632X in the axial direction of the lower transport member 632.

In this exemplary embodiment, the first clearance 591 and the second clearance 592 are present on the projection plane 632X.

As illustrated in FIG. 18A, the second clearance 592 is larger than the first clearance 591.

In the rotation direction of the lower transport member 632, the first clearance 591 and the second clearance 592 positionally differ from each other.

The larger second clearance 592 is provided above the rotational center 632C of the lower transport member 632. The second clearance 592 is provided above the horizontal line 584H (see FIG. 18B).

The first clearance 591 denoted by reference symbol 18A in FIG. 18A is provided below the rotational center 632C of the lower transport member 632.

As denoted by reference symbol 18B, the first clearance 591 is also provided at a part other than the part below the rotational center 632C. The first clearance 591 denoted by reference symbol 18B is provided above the rotational center 632C of the lower transport member 632.

The second clearance 592 is provided only above the rotational center 632C of the lower transport member 632. In other words, the second clearance 592 is provided only above the horizontal line 584H.

In the structural example illustrated in FIGS. 18A and 18B, the lower channel 582 has the non-circular sectional shape as described above. In other words, the inner peripheral surface 582E has a non-circular shape.

In this exemplary embodiment, as illustrated in FIG. 22, part of the inner peripheral surface 582E is in contact with the transported developer. The portion of the inner peripheral surface 582E in contact with the developer is hereinafter referred to as "contact portion 58X."

The developer is not in contact with the entire inner peripheral surface 582E in the circumferential direction. The developer is in contact with the contact portion 58X that is part of the inner peripheral surface 582E in the circumferential direction.

In this structural example, the contact portion 58X has a shape conforming to the outer peripheral portion 632H of the lower transport member 632.

It is assumed that the contact portion 58X has a protruding portion that protrudes away from the rotational center 632C. In this case, the untransported developer stagnates in the protruding portion.

In this exemplary embodiment, the contact portion 58X has the shape conforming to the outer peripheral portion 632H of the lower transport member 632. More specifically, the contact portion 58X of the inner peripheral surface 582E has an arc shape.

Figure 24:
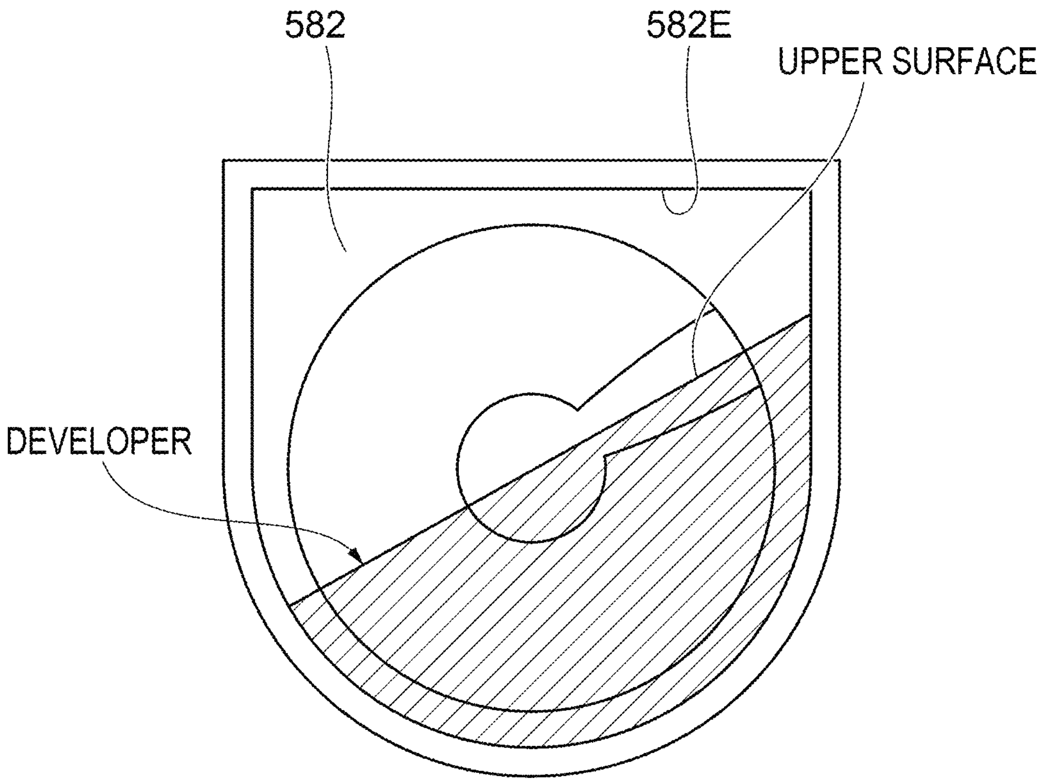
FIG. 24 illustrates another structural example of the lower channel.

FIG. 24 illustrates another structural example of the lower channel 582.

In this structural example, the inner peripheral surface 582E of the lower channel 582 has a U-shape.

In this structural example, the upper surface of the transported developer is lower than that of the transport structure illustrated in FIG. 22. In this case, another part of the inner peripheral surface 582E at the upper right in FIG. 24 may also protrude.

In the structural example illustrated in FIG. 24, the inner peripheral surface 582E has two protruding portions. In this case, the area of the gas channel increases compared with the structural example illustrated in FIG. 22.

Figure 25:
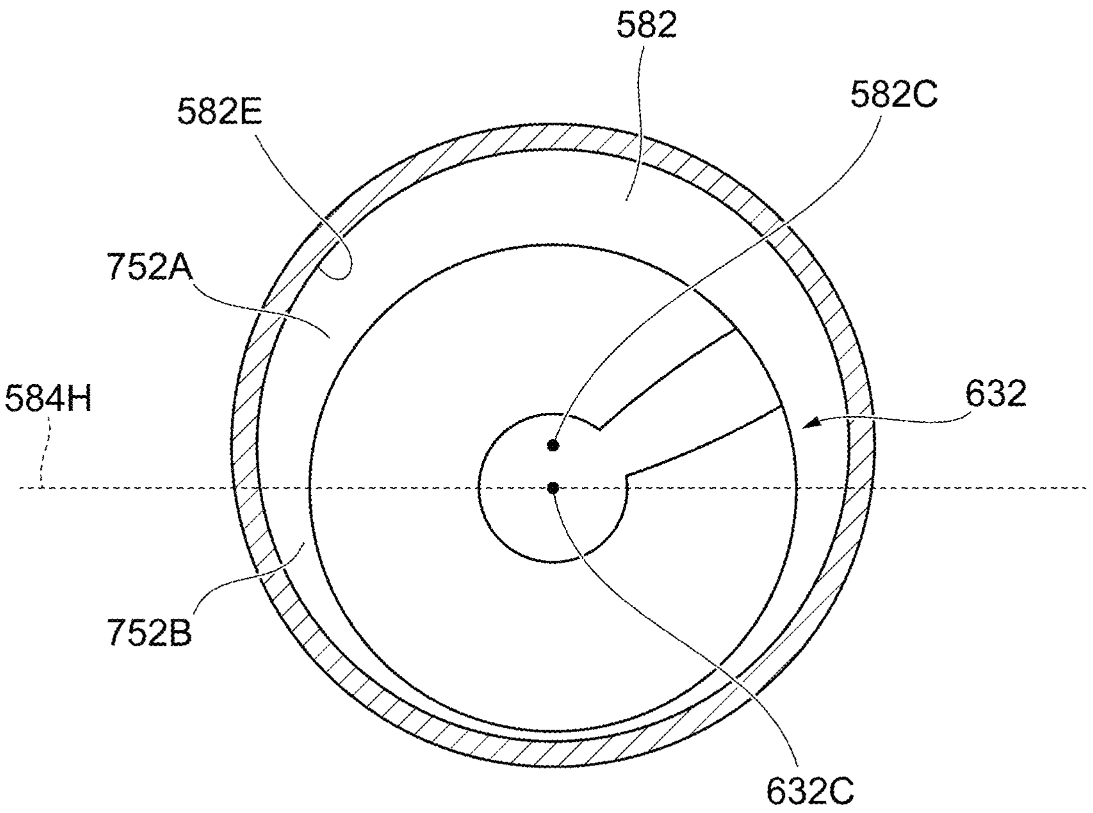
FIG. 25 illustrates another structural example of the lower channel and a lower transport member.

FIG. 25 illustrates another structural example of the lower channel 582 and the lower transport member 632.

In this structural example, the diameter of the inner peripheral surface 582E is larger than the diameter of the inner peripheral surface 582E illustrated in FIG. 22.

In this structural example, the rotational center 632C of the lower transport member 632 is positioned below a center 582C. In this structural example, the center 582C and the rotational center 632C are not coaxial with each other.

The "center 582C" refers to the center of the inner peripheral surface 582E in the radial direction.

In this structural example, the area of the upper portion 752A is larger than the area of the lower portion 752B similarly to the above.

In this structural example, the developer located on the lower side in the lower channel 582 is transported downstream by the lower transport member 632. A space through which gas passes is provided on the upper side in the lower channel 582.

FIGS. 18A, 18B, and 24 illustrate the structural examples in which the shape of the inner peripheral surface 582E is devised. FIG. 25 illustrates the structural example in which the positional relationship between the inner peripheral surface 582E and the lower transport member 632 is devised.

The space through which gas passes may be secured by devising the lower transport member 632.

Figure 26:
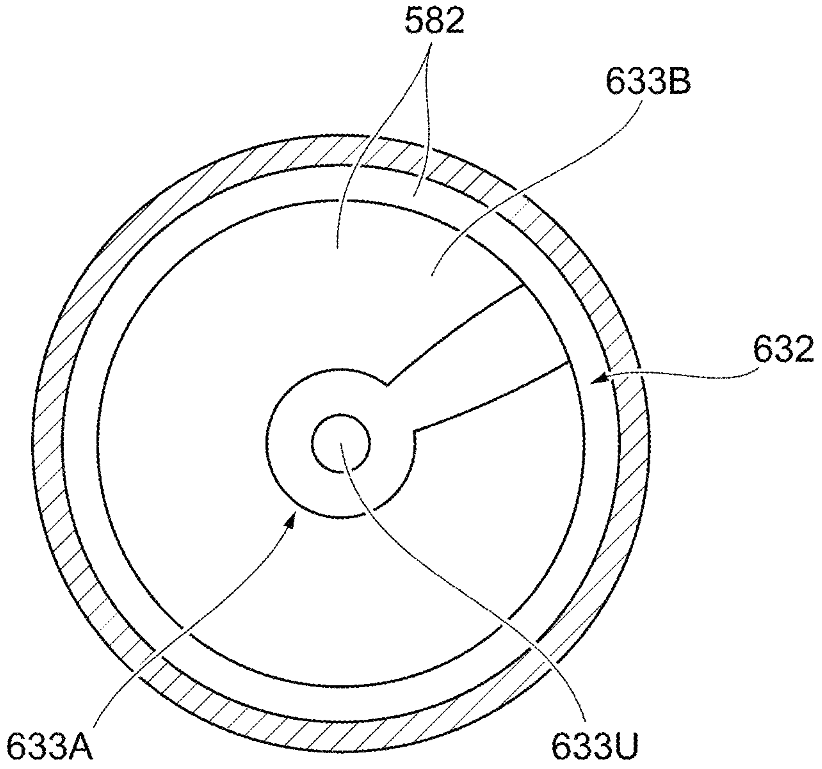
FIG. 26 illustrates another structural example of the lower transport member.

FIG. 26 illustrates another structural example of the lower transport member 632.

In this structural example, the lower transport member 632 has a channel 633U through which gas passes. The channel 633U is provided at the center of the rotation shaft 633A of the lower transport member 632 in the radial direction. The channel 633U extends along the axial direction of the rotation shaft 633A.

In this structural example, the gas from the developing device 14 moves through the channel 633U in the rotation shaft 633A. The gas moves upstream in the developer transport direction through the channel 633U.

The protrusions 633B of the lower transport member 632 may have through holes or cutouts. More specifically, the protrusions 633B may have through holes or cutouts that connect the front and back sides.

In this case, the gas moves upstream in the developer transport direction through the through holes or cutouts.

Figure 19:
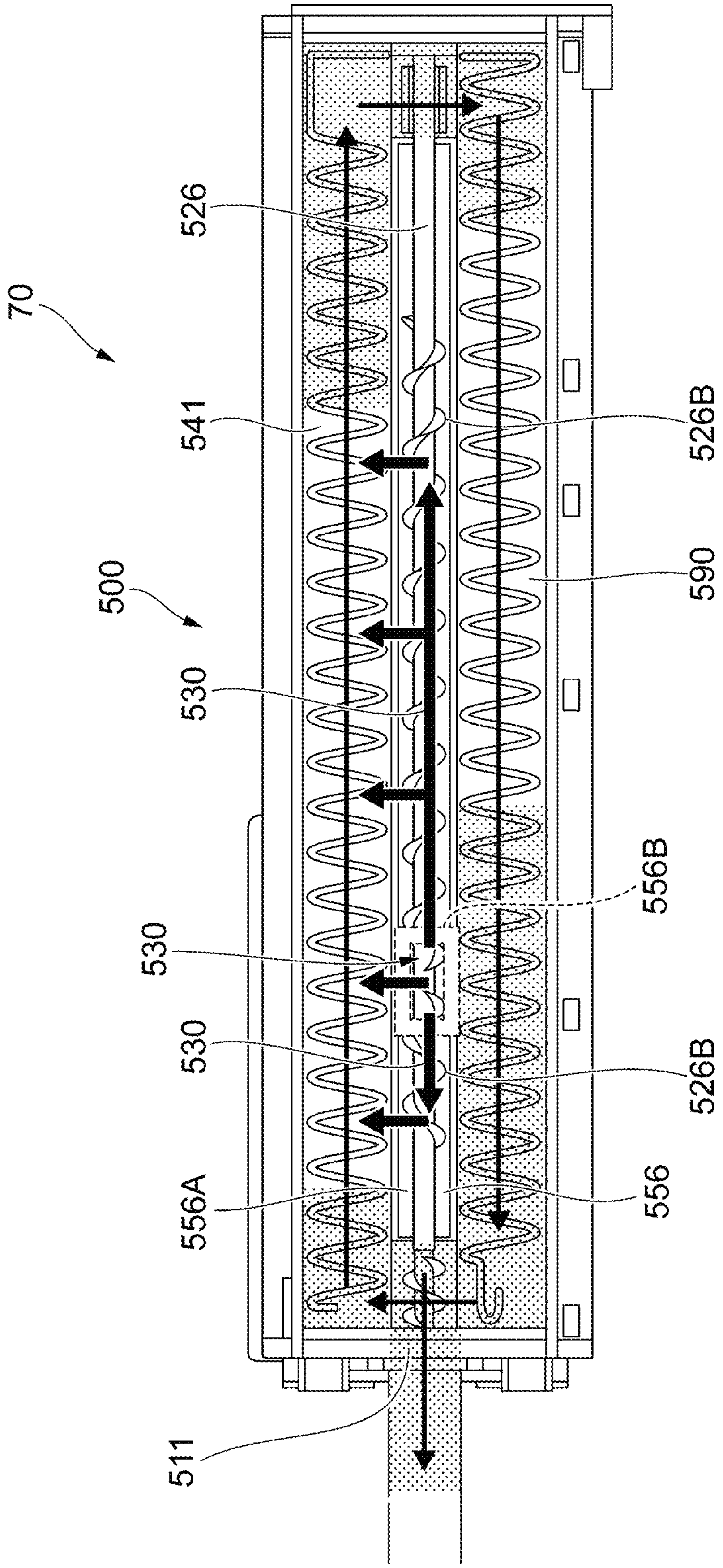
FIG. 19 is a top view of a developer accumulator of the second exemplary embodiment.

FIG. 19 is a top view of the developer accumulator 500 of the second exemplary embodiment.

In the second exemplary embodiment, the gas channel 530 extends to the intra-wall space 556 from below the intra-wall space 556. The gas channel 530 is connected to a bottom 556A of the intra-wall space 556.

The bottom 556A has an opening 556B through which the gas channel 530 extends.

The gas channel 530 extends into the intra-wall space 556 from the bottom 556A of the intra-wall space 556. Specifically, the gas channel 530 extends into the intra-wall space 556 through the opening 556B. The gas channel 530 extends in the longitudinal direction of the intra-wall space 556.

The gas enters the intra-wall space 556 through the gas channel 530. The gas enters the intra-wall space 556 from the bottom 556A of the intra-wall space 556. The gas enters the intra-wall space 556 through the opening 556B.

The gas moves along the longitudinal direction of the intra-wall space 556.

Then, the gas passes above the first-direction channel 541 and moves to the internal space of the protrusion 76 (not illustrated in FIG. 19) similarly to the above.

The gas passes through the internal space and is discharged to the outside of the supply device 70 from the opening 505 at the side of the protrusion 76.

As described above, the gas channel 530 that extends to the intra-wall space 556 from below the intra-wall space 556 extends through the opening 556B. The gas channel 530 extends to the opening 556B from below the opening 556B, and extends through the opening 556B.

The gas channel 530 extends into the intra-wall space 556 from the bottom 556A of the intra-wall space 556.

The gas channel 530 extends to the right and left in FIG. 19 through the opening 556B. The portions of the gas channel 530 that extend to the right and left extend through the intra-wall space 556.

The developer gradually stays in the portions of the gas channel 530 that extend through the intra-wall space 556. The developer moves away from the opening 556B by the central transport member 526 that is an example of the movement member.

In the structural example illustrated in FIG. 19, the developer staying on the right side of the opening 556B in FIG. 19 moves rightward in FIG. 19. The developer staying on the left side of the opening 556B in FIG. 19 moves leftward in FIG. 19.

The central transport member 526 includes two types of protrusions 526B with different turning directions.

The first type of protrusions 526B out of the two types of protrusions 526B are provided on the left side of the opening 556B in FIG. 19. The second type of protrusions 526B are provided on the right side of the opening 556B in FIG. 19.

Therefore, the developer located on the right side of the opening 556B in FIG. 19 and the developer located on the left side of the opening 556B in FIG. 19 move in opposite directions.

In this structural example, the developer located on the right side of the opening 556B in FIG. 19 moves rightward in FIG. 19. The developer located on the left side of the opening 556B in FIG. 19 oppositely moves leftward in FIG. 19.

The developer moving rightward in FIG. 19 moves to the outside of the intra-wall space 556. Specifically, the developer moving rightward in FIG. 19 moves to the circulation channel 590.

The developer moving leftward in FIG. 19 also moves to the outside of the intra-wall space 556. Specifically, the developer moving leftward in FIG. 19 also moves to the circulation channel 590.

In this exemplary embodiment, the central transport member 526 is positioned to face the opening 556B. Thus, the developer staying at the opening 556B moves rightward and leftward from the opening 556B.

Figure 20:
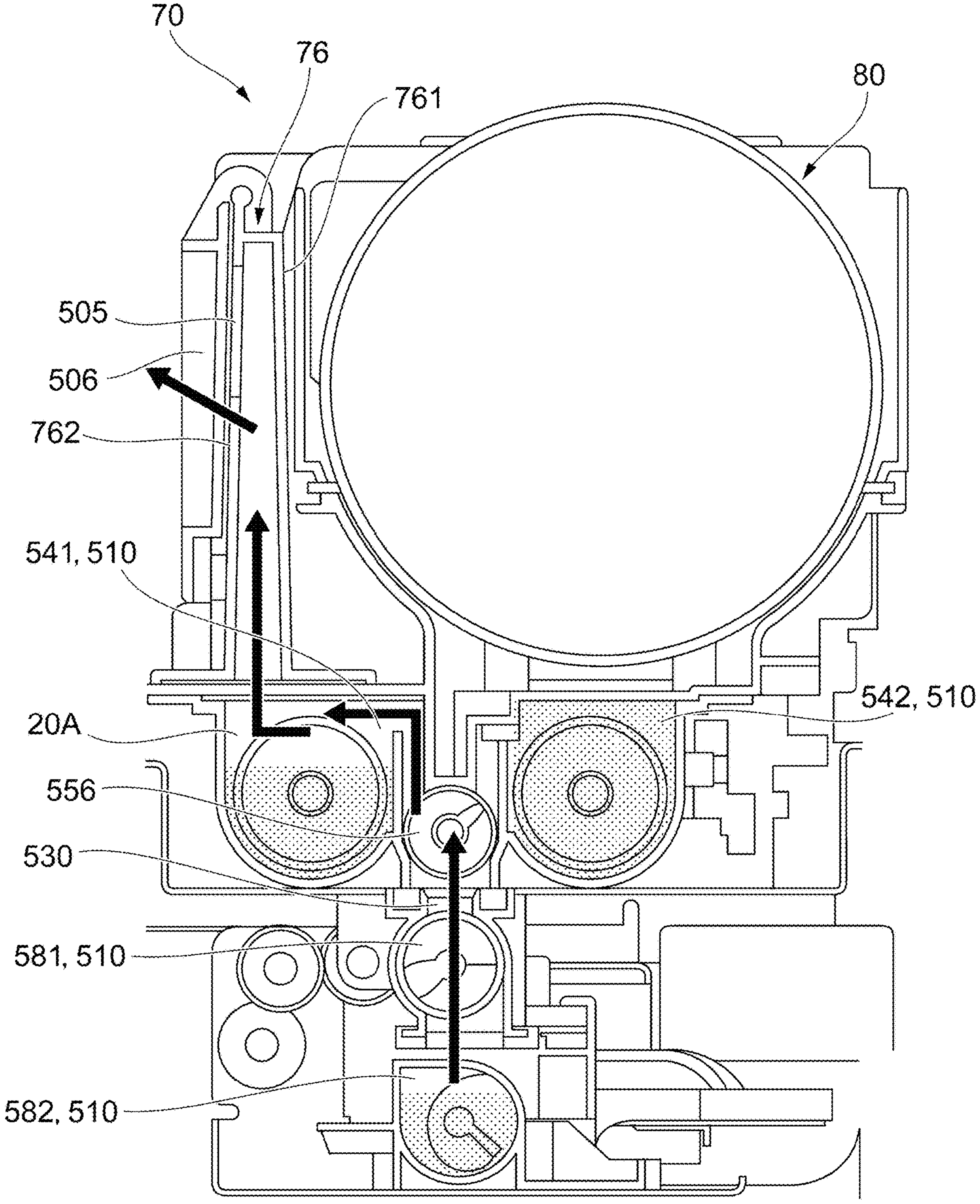
FIG. 20 is a sectional view of the supply device taken along the line XX-XX in FIG. 17.

FIG. 20 is a sectional view of the supply device 70 taken along the line XX-XX in FIG. 17. FIG. 20 illustrates the supply device 70 that is viewed from the first end 71 of the supply device 70 (see FIG. 17).

Also in the second exemplary embodiment, the developer channel 510 is provided below the developer container 80. The developer from the developer container 80 passes through the developer channel 510.

In the second exemplary embodiment, part of the developer channel 510 is positioned outside the region immediately below the developer container 80. Specifically, a part 20A of the first-direction channel 541 is outside the region immediately below the developer container 80.

In this structural example, the protrusion 76 extending upward is provided above the first-direction channel 541.

The internal space of the protrusion 76 illustrated in FIG. 20 is connected to the first-direction channel 541 similarly to the first exemplary embodiment illustrated in FIGS. 7 to 16.

In the second exemplary embodiment, part of the developer channel 510 is positioned outside the region immediately below the developer container 80. In the second exemplary embodiment, the protrusion 76 extending upward is provided above this part.

This part is a part of the first-direction channel 541 that is outside the region immediately below the developer container 80.

The protrusion 76 is hollow similarly to the above. The protrusion 76 has a space through which gas passes.

The gas having reached a part above the first-direction channel 541 passes through the internal space of the protrusion 76. The gas moves to the opening 505 at the side of the protrusion 76. The gas is discharged to the outside of the supply device 70 from the opening 505 for discharging the gas.

In this exemplary embodiment, the gas channel 530 finally reaches the opening 505. The gas having passed through the gas channel 530 is finally discharged from the opening 505.

The opening 505 in the protrusion 76 is provided in the opposite surface 762 similarly to the above.

The protrusion 76 has the facing surface 761 that faces the developer container 80, and the opposite surface 762 positioned opposite to the facing surface 761. The opening 505 is provided in the opposite surface 762 of the protrusion 76.

The opening 505 is provided above the intra-wall space 556 that is an example of the non-channel portion.

The supply device 70 has the opening 505 for discharging the gas supplied into the intra-wall space 556 through the gas channel 530. In this exemplary embodiment, the gas is discharged to the outside of the supply device 70 through the opening 505.

Figure 27:
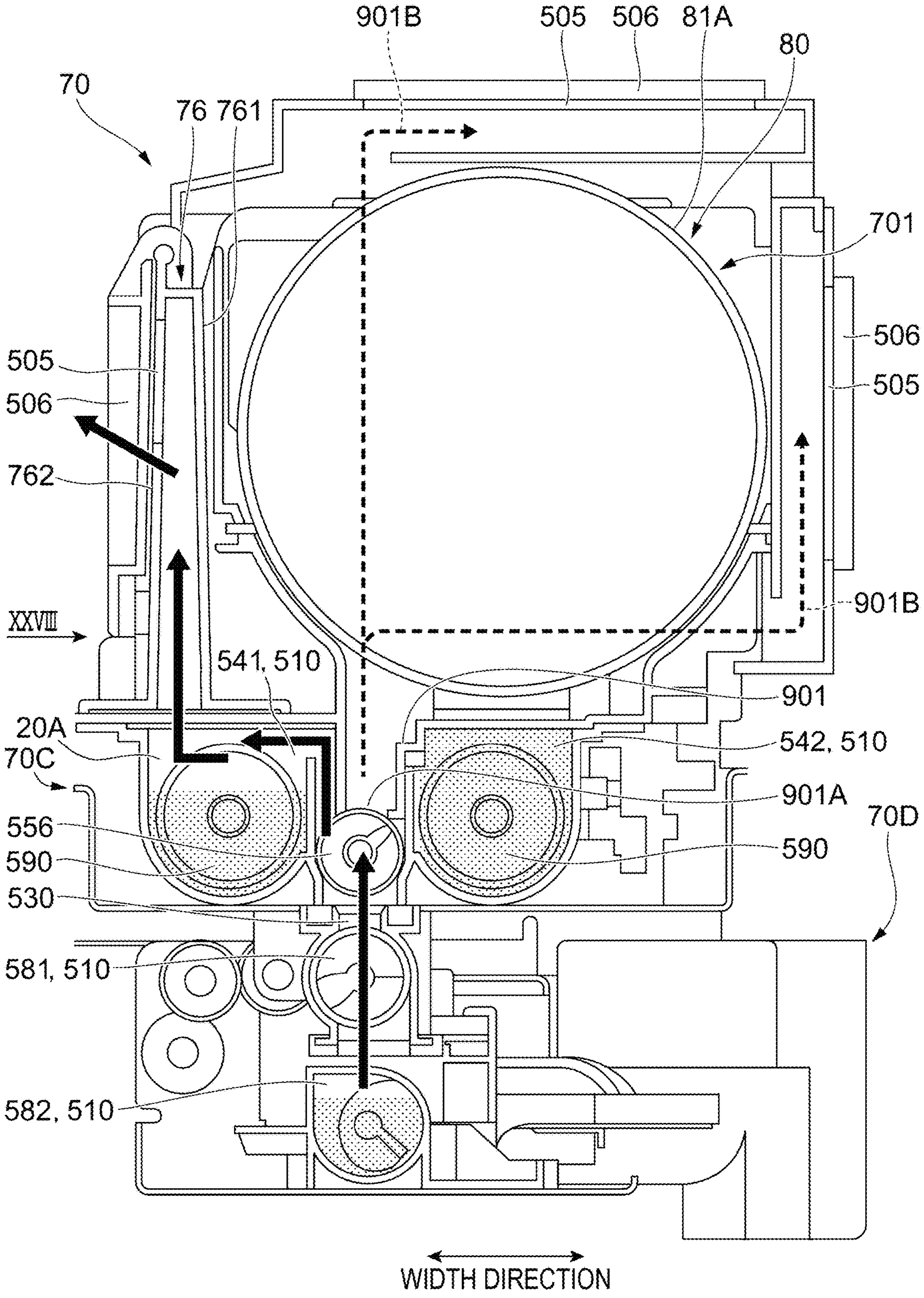
FIG. 27 illustrates another structural example of the supply device.
Figure 28:
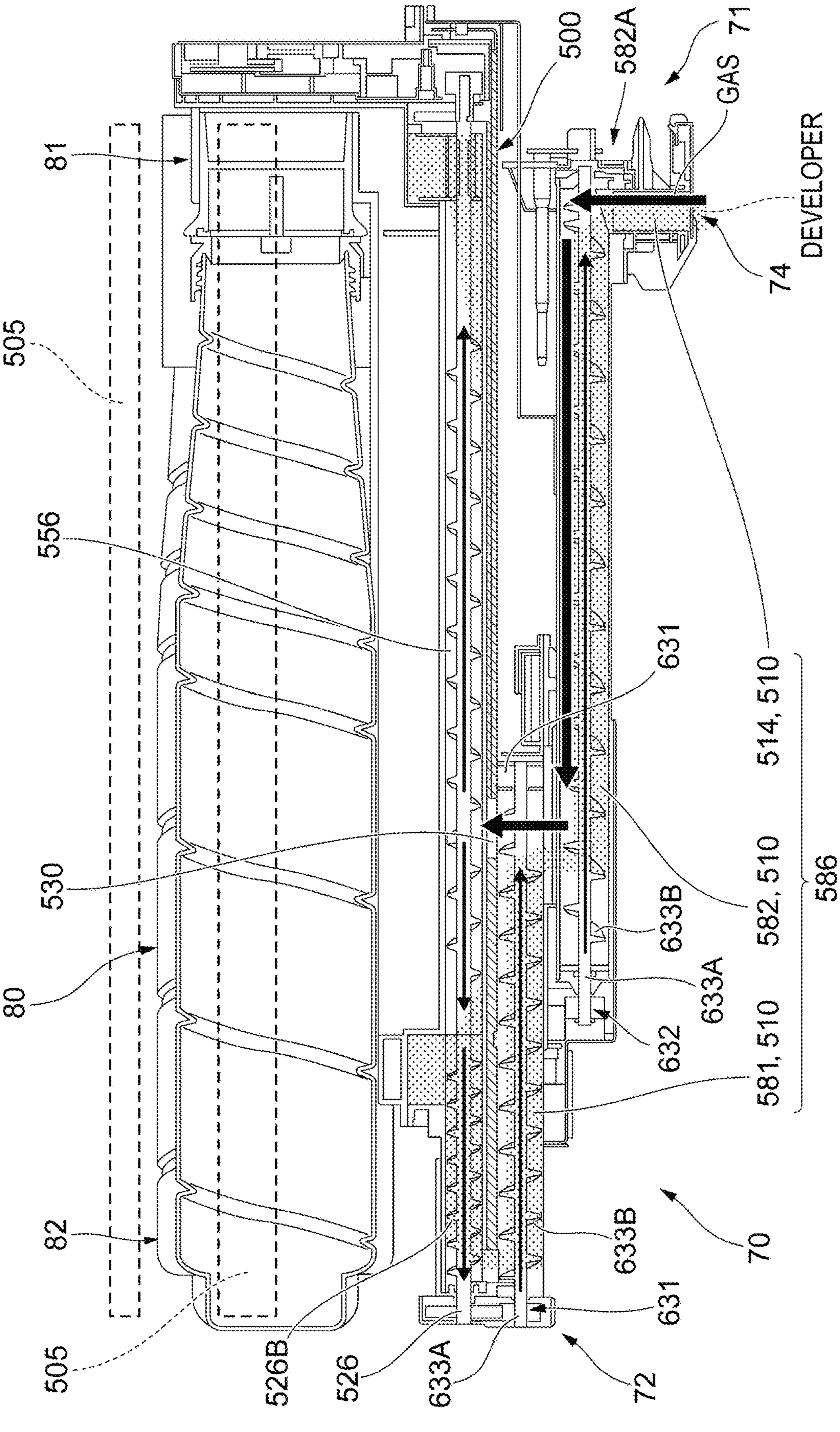
FIG. 28 illustrates the other structural example of the supply device.

FIGS. 27 and 28 illustrate another structural example of the supply device 70. FIG. 28 illustrates the supply device 70 that is viewed in an arrow XXVIII direction in FIG. 27.

In this structural example, a plurality of openings 505 is provided as illustrated in FIG. 27.

The plurality of openings 505 is positioned to face the outer peripheral surface 81A of the developer container 80 mounted on the mounting portion 701 similarly to the above.

The plurality of openings 505 is provided at different positions in the circumferential direction of the developer container 80.

As illustrated in FIG. 28, the plurality of openings 505 extends in the axial direction of the developer container 80.

As illustrated in FIG. 28, each opening 505 is provided from a position where it faces the first end 81 to a position where it faces the second end 82.

The first end 81 refers to the first end of the developer container 80 in the axial direction. The second end 82 refers to the second end of the developer container 80 in the axial direction.

In this case, the area of the opening 505 is larger than in the case where the length of the opening 505 is smaller than the distance between the first end 81 and the second end 82.

Part of the plurality of openings 505 may be provided from the position where it faces the first end 81 to the position where it faces the second end 82. The lengths of the other openings 505 may be smaller than the length of the part of the openings 505.

As illustrated in FIG. 27, each opening 505 is oriented opposite to the side where the developer container 80 is mounted similarly to the above. The filter 506 is provided at each opening 505.

All the plurality of openings 505 need not be oriented opposite to the side where the developer container 80 is mounted.

For example, part of the plurality of openings 505 may be oriented opposite to the side where the developer container 80 is mounted. The other openings 505 may be oriented to the side where the developer container 80 is mounted.

The number of openings 505 is not limited to three, and may be one, two, four, or more.

In this exemplary embodiment, as described above, the opening 505 is disposed as follows: "the opening 505 is provided from the position where it faces the first end 81 to the position where it faces the second end 82."

This disposition includes disposition of a plurality of openings 505 arranged from the position where one of them faces the first end 81 to the position where one of them faces the second end 82.

The single opening 505 need not be provided from the position where it faces the first end 81 to the position where it faces the second end 82.

As illustrated in FIG. 7, the plurality of openings 505 may be arranged along the axial direction of the developer container 80. The plurality of openings 505 arranged in this way may be provided from the position where one of them faces the first end 81 to the position where one of them faces the second end 82.

In the structural example illustrated in FIG. 27, the plurality of openings 505 is provided between a first end 70C and a second end 70D.

The supply device 70 has the first end 70C and the second end 70D. The first end 70C and the second end 70D positionally differ from each other in the width direction of the supply device 70.

The positions in the width direction of the supply device 70 are compared. In the structural example illustrated in FIG. 27, the plurality of openings 505 is positioned closer to the second end 70D than is the first end 70C. The plurality of openings 505 is positioned closer to the first end 70C than is the second end 70D.

In the structural example illustrated in FIG. 27, all the openings 505 are positioned closer to the second end 70D than is the first end 70C. All the openings 505 are positioned closer to the first end 70C than is the second end 70D.

The first end 70C refers to a portion farthest from the second end 70D in the width direction of the supply device 70. The second end 70D refers to a portion farthest from the first end 70C in the width direction of the supply device 70.

The width direction of the supply device 70 is a direction orthogonal to the axial direction of the developer container 80 and is a direction along the horizontal direction.

As illustrated in FIG. 27, a lid member 901 is provided above the intra-wall space 556 that is an example of the enclosed space. The lid member 901 has an opening 901A.

Channels 901B are connected to the opening 901A.

The channel 901B is connected to the opening 505 positioned above the developer container 80. The channel 901B is connected to the opening 505 positioned on the right side of the developer container 80.

The channels 901B extend through positions where they face an end surface 89A of the developer container 80 (see FIG. 17).

The opening 505 positioned above the developer container 80 (see FIG. 27) is hereinafter referred to as "upper opening 505." The opening 505 positioned on the right side of the developer container 80 is hereinafter referred to as "right opening 505." The opening 505 positioned on the left side of the developer container 80 is hereinafter referred to as "left opening 505."

In the structural example illustrated in FIG. 27, the gas moves from the intra-wall space 556 to the outside of the intra-wall space 556 through the opening 901A.

The gas having moved to the outside of the intra-wall space 556 moves to the upper opening 505 and the right opening 505 through the channels 901B.

The gas moves to the upper opening 505 without intermediation of the circulation channel 590. The gas moves to the right opening 505 without intermediation of the circulation channel 590.

Then, the gas is discharged to the outside of the supply device 70 through the upper opening 505 and the right opening 505.

The gas moves from the intra-wall space 556 to the left opening 505 through a path similar to the path described above. That is, the gas moves to the left opening 505 through a part above the channel constituting the circulation channel 590.

Figure 29:
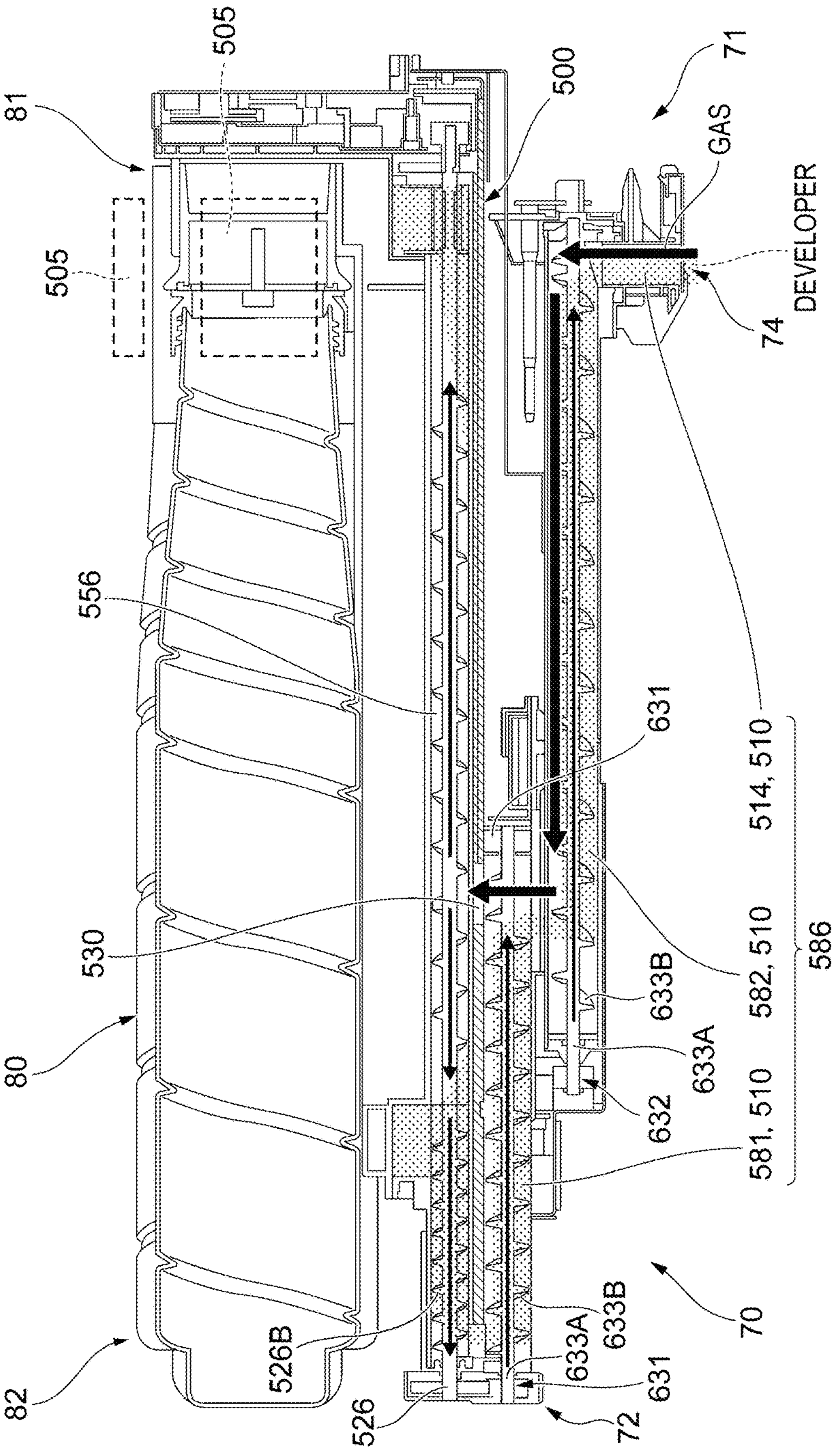
FIG. 29 illustrates another structural example of the supply device.

FIG. 29 illustrates another structural example of the supply device 70.

In this structural example, a plurality of openings 505 is positioned to face a small-diameter portion of the developer container 80. The first end 81 of the developer container 80 has a smaller diameter than the second end 82.

In the structural example illustrated in FIG. 29, the plurality of openings 505 is positioned to face the first end 81 that is the small-diameter portion of the developer container 80.

When the opening 505 is positioned to face the first end 81 that is the small-diameter portion, the position of the opening 505 is made closer to the axis of the developer container 80.

When the plurality of openings 505 is provided, all the openings 505 may be positioned to face the first end 81 that is the small-diameter portion.

Part of the plurality of openings 505 may be positioned to face the first end 81. As described above, the other openings 505 may be provided, for example, from the position where they face the first end 81 to the position where they face the second end 82. The other openings may be positioned to face, for example, the second end 82 that is the large-diameter portion.

Figure 30:
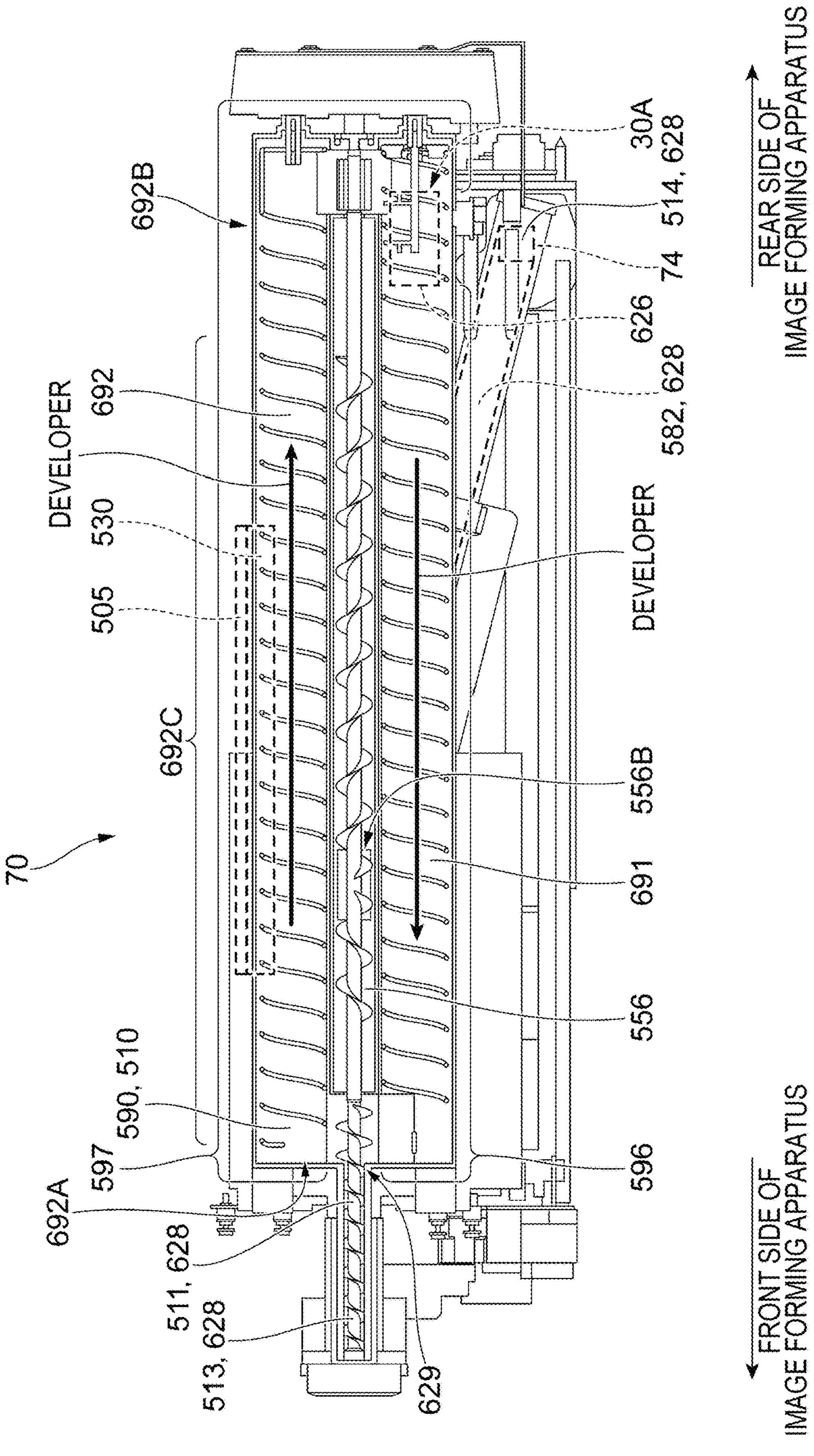
FIG. 30 illustrates another structural example of the supply device.

FIG. 30 illustrates another structural example of the supply device 70.

FIG. 30 illustrates the state of the cross section of the supply device 70 in a horizontal plane. More specifically, FIG. 30 illustrates the state of the cross section of the supply device 70 in a horizontal plane that crosses the intra-wall space 556.

The supply device 70 illustrated in FIG. 30 also has the discharge port 74 to be used for discharging the developer.

The circulation channel 590 that constitutes the developer channel 510 is provided similarly to the above. Also in this structural example, the developer circulates along the circulation channel 590.

In this structural example, a part 30A of the circulation channel 590 is a supply portion 626. A reception port (not illustrated) that receives the developer from the developer container 80 is provided above the supply portion 626.

A new developer from the developer container 80 is supplied to the supply portion 626 of the circulation channel 590.

In the structural example illustrated in FIG. 30, the position of the supply portion 626 differs from the position in the above exemplary embodiment.

In the above exemplary embodiment, for example, a part 10X in FIG. 10 is the supply portion 626.

In the exemplary embodiment illustrated in FIG. 10, the supply portion 626 is provided in the left channel in FIG. 10.

When viewed from the front side of the image forming apparatus 100 (see FIG. 1), the supply portion 626 is provided in the left channel in FIG. 10. Specifically, the supply portion 626 is provided in the second-direction channel 542 positioned on the left side.

In the structural example illustrated in FIG. 30, the supply portion 626 is provided in the channel positioned on the right side. When viewed from the front side of the image forming apparatus 10, the supply portion 626 is provided in the channel positioned on the right side.

The position of the supply portion 626 is not particularly limited. The supply portion 626 may be provided in the channel positioned on the left side or in the channel positioned on the right side.

In the structural example illustrated in FIG. 30, a connection channel 628 is connected to the circulation channel 590.

The connection channel 628 is connected to the circulation channel 590 at a connection point 629.

The connection channel 628 extends to the discharge port 74 from the connection point 629 for connection to the circulation channel 590.

The connection channel 628 includes the filled portion 511, the lateral channel 513, and the intermediate channel 581 (not illustrated in FIG. 30). The connection channel 628 also includes the lower channel 582 and the up-down channel 514.

The developer in the circulation channel 590 moves to the discharge port 74 through the connection channel 628.

The opening 505 to be used for discharging the gas in the supply device 70 is provided similarly to the above. The opening 505 is connected to the circulation channel 590 similarly to the above.

The circulation channel 590 includes a first portion 596 where the amount of the transported developer is large. The circulation channel 590 includes a second portion 597 where the amount of the transported developer is small.

The first portion 596 is positioned on the downstream side of the supply portion 626 and on the upstream side of the connection point 629 in the developer movement direction.

The second portion 597 is positioned on the upstream side of the supply portion 626 and on the downstream side of the connection point 629 in the developer movement direction.

The "developer movement direction" refers to the developer movement direction in the circulation channel 590.

The developer supplied to the supply portion 626 passes through the first portion 596. Part of the developer having passed through the first portion 596 moves to the connection channel 628. The remaining developer that has not moved to the connection channel 628 is supplied to the second portion 597.

In this case, the amount of the transported developer is large in the first portion 596. In the second portion 597, the amount of the transported developer is smaller than that in the first portion 596.

The opening 505 is connected to the second portion 597 of the circulation channel 590. The opening 505 is connected to the second portion 597 of the circulation channel 590 where the amount of the transported developer is small.

In this exemplary embodiment, the gas having entered the second portion 597 through the opening 556B moves to the opening 505 without intermediation of the first portion 596.

The description "the opening 505 is connected to the second portion 597" may indicate that the gas in the second portion 597 moves to the opening 505 without intermediation of the first portion 596.

The circulation channel 590 includes a first straight portion 691 having a straight shape. The developer passes through the first straight portion 691 toward the connection point 629.

The circulation channel 590 includes a second straight portion 692 having a straight shape. The developer passes through the second straight portion 692 away from the connection point 629.

The supply portion 626 is provided in the first straight portion 691. The opening 505 is connected to the second straight portion 692.

The second straight portion 692 constitutes the second portion 597.

The second straight portion 692 has a first end 692A positioned near the connection point 629. The second straight portion 692 has a second end 692B positioned opposite to the connection point 629.

The opening 505 is connected to a part of the second straight portion 692 other than the second end 692B.

The developer movement direction of the developer passing through the second straight portion 692 is assumed.

The second straight portion 692 includes an upstream portion 692C positioned on the upstream side of the second end 692B in the developer movement direction.

The opening 505 is connected to the upstream portion 692C of the second straight portion 692. In this exemplary embodiment, the gas channel 530 extends toward the opening 505 from the upstream portion 692C.

The developer is likely to stay at the second end 692B of the second straight portion 692. The height of the upper surface of the developer is likely to increase at the second end 692B of the second straight portion 692.

The developer hardly stays in the upstream portion 692C of the second straight portion 692.

The opening 505 is connected to the upstream portion 692C of the second straight portion 692 where the developer hardly stays.

In the structural example illustrated in FIG. 30, the opening 505 is provided above the circulation channel 590 similarly to the structural example illustrated in FIG. 10.

In the structural example illustrated in FIG. 30, the protrusion 76 is provided similarly to the above. In the structural example illustrated in FIG. 30, the protrusion 76 is provided similarly to the structural example illustrated in FIG. 14.

Also in the structural example illustrated in FIG. 30, the gas channel 530 extends through the protrusion 76.

The gas moves from the circulation channel 590 to the opening 505 through the gas channel 530. The gas moves from the upstream portion 692C to the opening 505 through the gas channel 530.

Also in this structural example, the gas channel 530 reaches the opening 505. The gas channel 530 extends upward from the upstream portion 692C and is connected to the opening 505.

Figure 31:
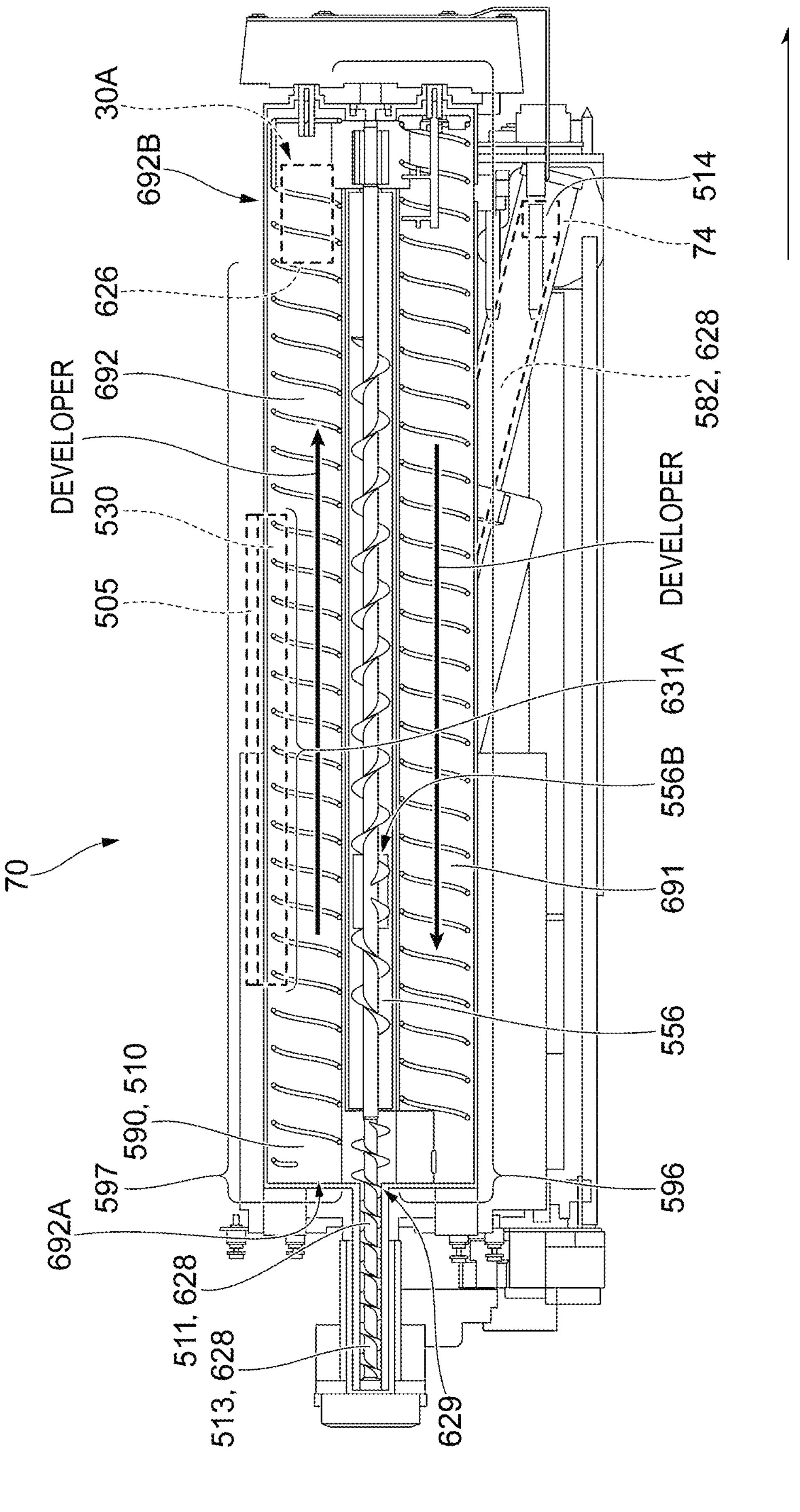
FIG. 31 illustrates another structural example of the supply device.

FIG. 31 illustrates another structural example of the supply device 70.

In the structural example illustrated in FIG. 31, the supply portion 626 is provided in the second straight portion 692 that is a single straight portion. In this structural example, the opening 505 is connected to the second straight portion 692 that is the single straight portion.

In this structural example, the supply portion 626 is provided in and the opening 505 is connected to the same straight portion.

In this structural example, the opening 505 is connected to the second straight portion 692 of the circulation channel 590 similarly to the above. In this structural example, the supply portion 626 is provided in the second straight portion 692.

The portion of the second straight portion 692 where the opening 505 is connected is hereinafter referred to as "opening connection portion 631A."

In this structural example, the supply portion 626 is positioned on the downstream side of the opening connection portion 631A in the developer movement direction. The "developer movement direction" refers to the developer movement direction in the second straight portion 692.

In this structural example, the opening 505 is connected to the second portion 597 of the circulation channel 590 where the amount of the transported developer is small similarly to the above. In this structural example, the amount of the developer to the opening 505 is small similarly to the above.

Figure 32:
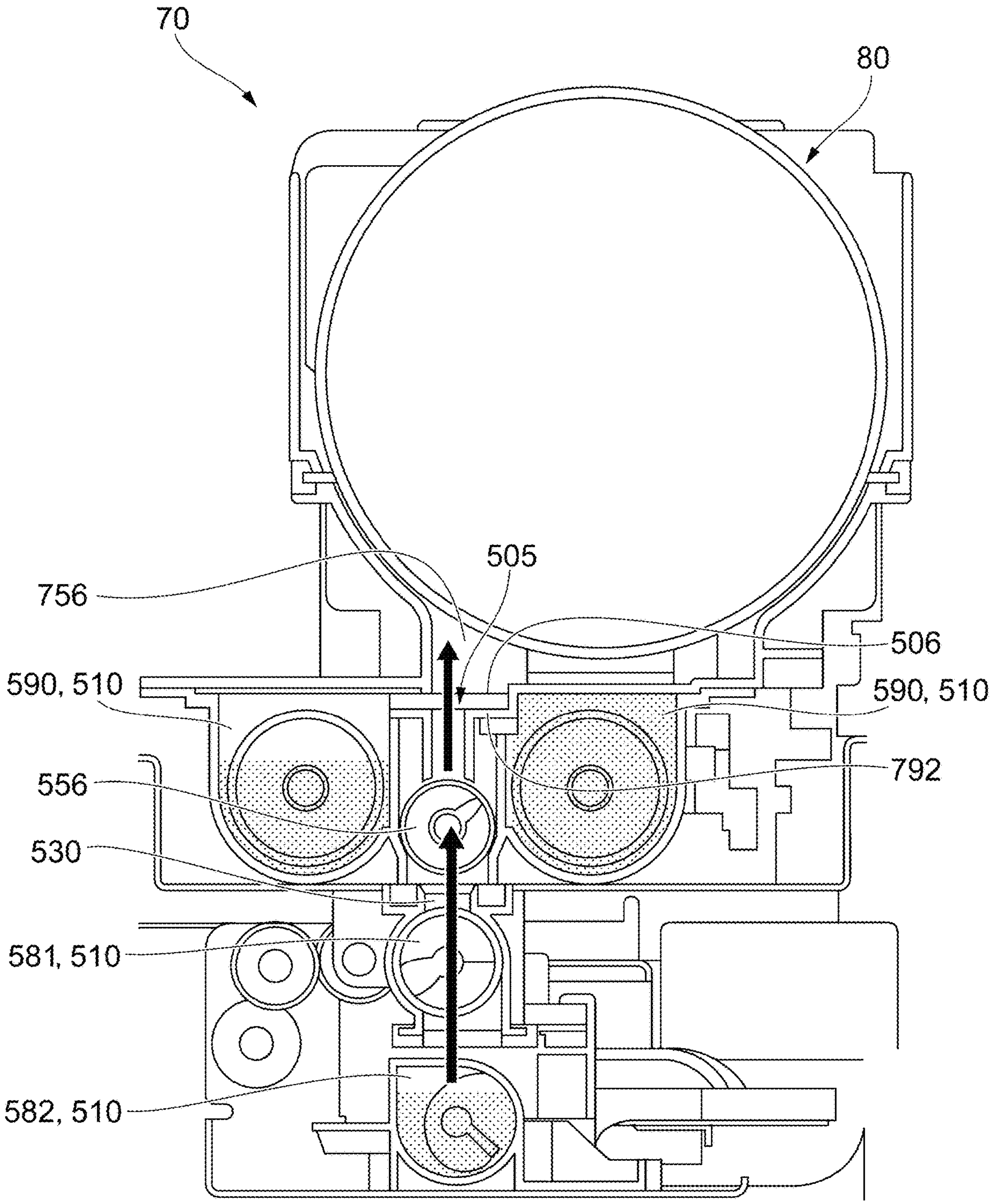
FIG. 32 illustrates another structural example of the supply device.

FIG. 32 illustrates another structural example of the supply device 70.

In this structural example, the basic structure is similar to the structure illustrated in FIG. 20 except for the position of the opening 505.

In this structural example, the gas sent from the developing device 14 is supplied to the intra-wall space 556 that is an example of a supply space similarly to the above.

In this structural example, the opening 505 is provided above the intra-wall space 556. The opening 505 is provided in a wall 792 that defines the intra-wall space 556. The filter 506 is provided at the opening 505.

The gas supplied to the intra-wall space 556 is discharged to the outside of the supply device 70 through the opening 505.

The opening 505 connects the inside and outside of the supply device 70 similarly to the above. The gas supplied to the intra-wall space 556 moves to the outside of the supply device 70 through the opening 505.

The opening 505 is provided along the longitudinal direction of the intra-wall space 556.

In this structural example, the gas in the intra-wall space 556 moves to the opening 505 without intermediation of the circulation channel 590. In other words, the gas in the intra-wall space 556 moves to the opening 505 without passing through the circulation channel 590.

The gas is discharged to the outside of the supply device 70 through the opening 505. The gas in the intra-wall space 556 is discharged to the outside of the supply device 70 without intermediation of the circulation channel 590.

The gas in the intra-wall space 556 does not pass through the circulation channel 590.

When the gas in the intra-wall space 556 exits the opening 505, the gas enters a clearance 756 between the wall 792 and the developer container 80. The gas moves in the axial direction of the developer container 80 through the clearance 756.

The end of the clearance 756 in the axial direction of the developer container 80 is open. The gas moves through the clearance 756 to the end of the clearance 756.

In this structural example, the gas flowing from the developing device 14 is supplied to the intra-wall space 556 similarly to the above.

In this structural example, the circulation channel 590 through which the developer circulates is provided around the intra-wall space 556 similarly to the above.

In this structural example, the gas in the intra-wall space 556 moves to the opening 505 without intermediation of the circulation channel 590 positioned around the intra-wall space 556.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An image forming apparatus comprising:

an image carrier;

a developing device configured to cause a developer to adhere to the image carrier; and a supply device having a developer channel through which the developer passes, and configured to supply the developer to the developing device, the developer channel comprising a filled portion that is filled with the developer over an entire cross section of the developer channel, and a falling portion where the developer falls downward, the falling portion being positioned on a downstream side of the filled portion in a developer movement direction, wherein:

gas flowing from the developing device to the supply device moves upstream in the developer movement direction through the developer channel, and a sectional area of the falling portion is larger than a sectional area of the filled portion.

(((2)))

The image forming apparatus according to (((1))), wherein:

the filled portion comprises an upstream transporter configured to transport the developer toward the falling portion, a downstream transporter configured to transport the developer having passed through the filled portion toward the falling portion is provided on the downstream side of the filled portion, and a developer transport ability of the downstream transporter is higher than a developer transport ability of the upstream transporter.

(((3)))

The image forming apparatus according to (((2))), wherein:

each of the upstream transporter and the downstream transporter is configured to transport the developer by pushing the developer using helical pushers provided around a rotation shaft along the developer channel, and an arrangement pitch of the pushers of the downstream transporter is larger than an arrangement pitch of the pushers of the upstream transporter.

(((4)))

The image forming apparatus according to (((1))), wherein:

the filled portion comprises a transporter configured to transport the developer by pushing the developer using helical pushers provided around a rotation shaft along the developer channel, and a dimension of an inlet of the falling portion in the developer movement direction when the developer from the filled portion reaches the inlet is larger than an arrangement pitch of the pushers of the transporter of the filled portion.

(((5)))

The image forming apparatus according to (((4))), wherein the dimension of the inlet is 1.1 times or more as large as the arrangement pitch of the pushers of the transporter of the filled portion.

(((6)))

The image forming apparatus according to any one of (((1)) to (((5))), wherein:

the filled portion and the falling portion are disposed at different positions in an intersecting direction that intersects a vertical direction, a space through which both the developer moving from the filled portion toward the falling portion and the gas moving from the falling portion toward the filled portion pass is present between the filled portion and the falling portion, and a sectional area of the space in a plane along the vertical direction is larger than the sectional area of the filled portion and the sectional area of the falling portion.

What is claimed is:

1. An image forming apparatus comprising:

an image carrier;

a developing device configured to cause a developer to adhere to the image carrier; and a supply device having a developer channel through which the developer passes, and configured to supply the developer to the developing device, the developer channel comprising a filled portion that is filled with the developer over an entire cross section of the developer channel, and a falling portion where the developer falls downward, the falling portion being positioned on a downstream side of the filled portion in a developer movement direction, the developer channel moving developer from the filled portion to the falling portion, the developer channel configured to allow the developer to move only one way from the filled portion to the falling portion, wherein:

gas flowing from the developing device to the supply device moves upstream in the developer movement direction through the developer channel, and a sectional area of the falling portion is larger than a sectional area of the filled portion.

2. The image forming apparatus according to claim 1, wherein:

the filled portion comprises an upstream transporter configured to transport the developer toward the falling portion, a downstream transporter configured to transport the developer having passed through the filled portion toward the falling portion is provided on the downstream side of the filled portion, and a developer transport ability of the downstream transporter is higher than a developer transport ability of the upstream transporter.

3. The image forming apparatus according to claim 2, wherein:

each of the upstream transporter and the downstream transporter is configured to transport the developer by pushing the developer using helical pushers provided around a rotation shaft along the developer channel, and an arrangement pitch of the pushers of the downstream transporter is larger than an arrangement pitch of the pushers of the upstream transporter.

4. The image forming apparatus according to claim 1, wherein:

the filled portion comprises a transporter configured to transport the developer by pushing the developer using helical pushers provided around a rotation shaft along the developer channel, and a dimension of an inlet of the falling portion in the developer movement direction when the developer from the filled portion reaches the inlet is larger than an arrangement pitch of the pushers of the transporter of the filled portion.

5. The image forming apparatus according to claim 4, wherein the dimension of the inlet is 1.1 times or more as large as the arrangement pitch of the pushers of the transporter of the filled portion.

6. The image forming apparatus according to claim 1, wherein:

the filled portion and the falling portion are disposed at different positions in an intersecting direction that intersects a vertical direction, a space through which both the developer moving from the filled portion toward the falling portion and the gas moving from the falling portion toward the filled portion pass is present between the filled portion and the falling portion, and a sectional area of the space in a plane along the vertical direction is larger than the sectional area of the filled portion and the sectional area of the falling portion.

7. An image forming apparatus comprising:

image carrying means;

developing means for causing a developer to adhere to the image carrying means; and supply means having a developer channel through which the developer passes, for supplying the developer to the developing means, the developer channel comprising a filled portion that is filled with the developer over an entire cross section of the developer channel, and a falling portion where the developer falls downward, the falling portion being positioned on a downstream side of the filled portion in a developer movement direction, the developer channel moving developer from the filled portion to the falling portion, the developer channel configured to allow the developer to move only one way from the filled portion to the falling portion, wherein:

gas flowing from the developing means to the supply means moves upstream in the developer movement direction through the developer channel, and a sectional area of the falling portion is larger than a sectional area of the filled portion.

* * * * *